March 18, 1941. J. WICKS 2,235,346
CENTRALIZED TRAFFIC CONTROLLING SYSTEM
Filed May 29, 1936  15 Sheets-Sheet 1

INVENTOR.
JOHN WICKS
BY
ATTORNEY.

March 18, 1941.   J. WICKS   2,235,346
CENTRALIZED TRAFFIC CONTROLLING SYSTEM
Filed May 29, 1936   15 Sheets-Sheet 2

INVENTOR.
JOHN WICKS
BY
ATTORNEY.

March 18, 1941. J. WICKS 2,235,346
CENTRALIZED TRAFFIC CONTROLLING SYSTEM
Filed May 29, 1936 15 Sheets-Sheet 3
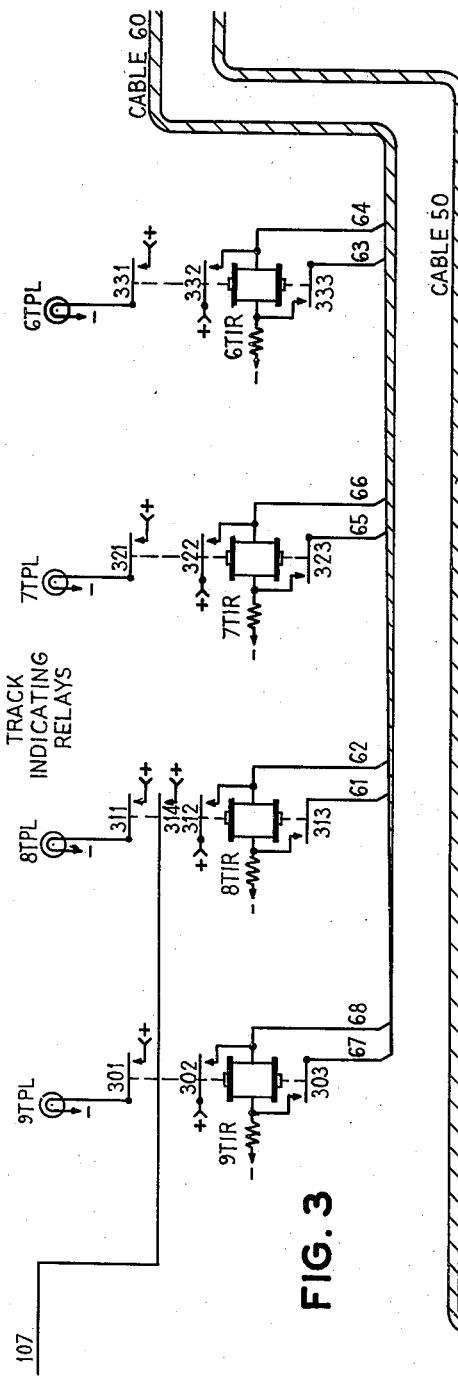
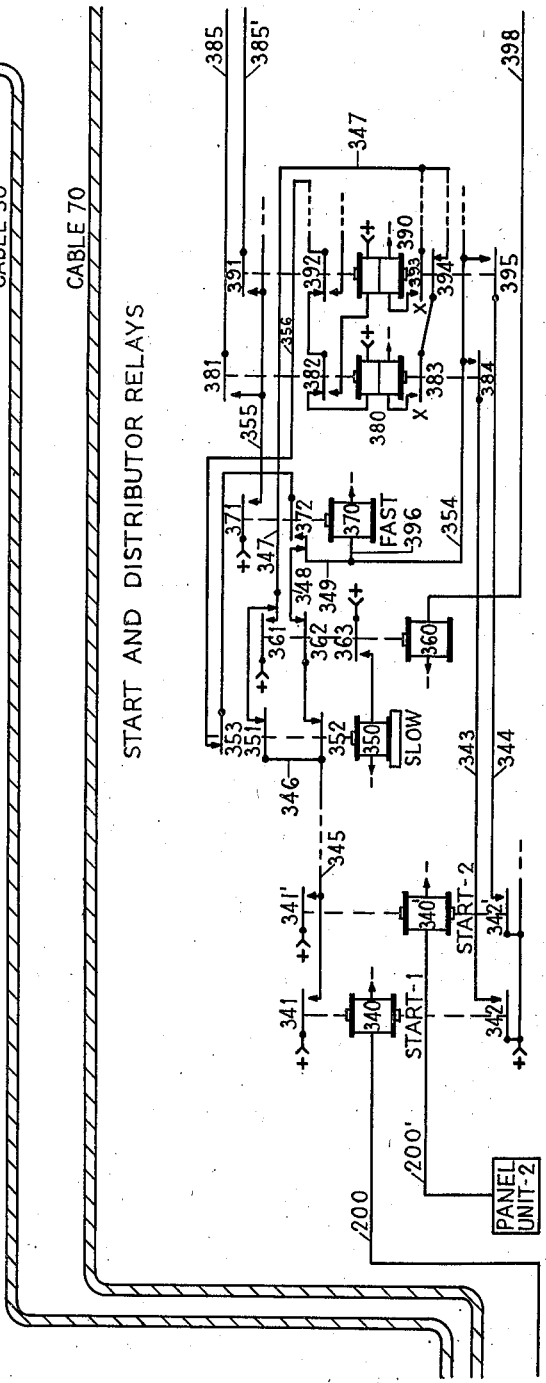
FIG. 3
INVENTOR.
JOHN WICKS
BY
ATTORNEY.

March 18, 1941.   J. WICKS   2,235,346
CENTRALIZED TRAFFIC CONTROLLING SYSTEM
Filed May 29, 1936   15 Sheets-Sheet 5

FIG. 5

INVENTOR.
JOHN WICKS
BY
ATTORNEY.

March 18, 1941. J. WICKS 2,235,346
CENTRALIZED TRAFFIC CONTROLLING SYSTEM
Filed May 29, 1936 15 Sheets-Sheet 8

INVENTOR.
JOHN WICKS
BY
ATTORNEY.

March 18, 1941.  J. WICKS  2,235,346
CENTRALIZED TRAFFIC CONTROLLING SYSTEM
Filed May 29, 1936  15 Sheets-Sheet 12

INVENTOR.
JOHN WICKS
BY
ATTORNEY.

March 18, 1941.  J. WICKS  2,235,346

CENTRALIZED TRAFFIC CONTROLLING SYSTEM

Filed May 29, 1936   15 Sheets-Sheet 14

INVENTOR.
JOHN WICKS
BY
ATTORNEY.

March 18, 1941.　　　　J. WICKS　　　　2,235,346
CENTRALIZED TRAFFIC CONTROLLING SYSTEM
Filed May 29, 1936　　　15 Sheets-Sheet 15
DISPATCHERS PANEL
FIG. 15
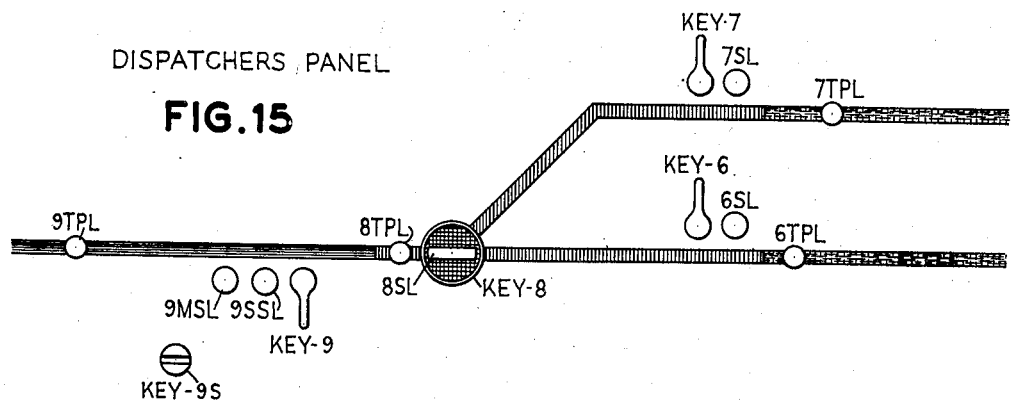
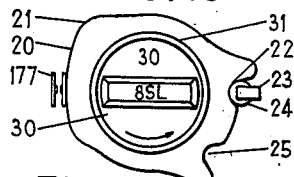
FIG. 16
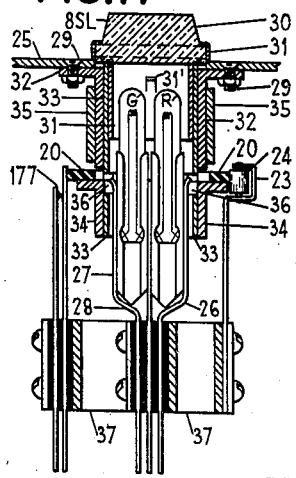
FIG. 17
FIG. 18
DRAWING LAYOUT
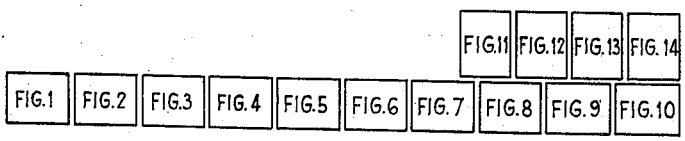
INVENTOR.
JOHN WICKS
BY
*Chas. T. Candy*
ATTORNEY.

Patented Mar. 18, 1941

2,235,346

UNITED STATES PATENT OFFICE 2,235,346

CENTRALIZED TRAFFIC CONTROLLING SYSTEM

John Wicks, Oak Park, Ill., assignor to Associated Electric Laboratories, Inc., Chicago, Ill., a corporation of Delaware Application May 29, 1936, Serial No. 82,568

4 Claims. (Cl. 246—3)

This invention relates to centralized traffic controlling systems for railroads, and more particularly to a system for remotely controlling track switches and signals at a plurality of field stations from a centralized dispatcher's station having a track layout panel with symbols which are set in accordance with the actual track and signal conditions in the field.

In the provision of centralized traffic controlling apparatus, not only is it necessary to remotely control distant track switches and signals, but it is essential to indicate in the dispatcher's office train progress along the railway track, and, further, it is also essential to indicate to the dispatcher the actual positions or conditions of the track switches and signals when such switches and signals are operated under his control.

In accordance with the present invention, the centralized traffic controlling system comprises a plurality of field stations along the railroad track and a centralized dispatcher's station. Coding apparatus is provided at the dispatcher's station and at each field station for transmitting and receiving codes over a two-conductor line connecting the dispatcher's station to all the field stations.

Each code transmitted from the dispatcher's station to the field stations, first, selects the desired field station and then causes the desired operation of the track signal or track switch in the selected field station. The coding apparatus in the field stations transmit codes to the dispatcher's station in response to and in accordance with the operations of the track signals and switches and in accordance with train travel over the track sections. The codes transmitted to the dispatcher's station from the field stations cause corresponding indications to be displayed on the dispatcher's panel.

Each field station corresponds to a plurality of track sections and their associated track switches and signals. The dispatcher's station is provided with a panel having a miniature track layout thereon corresponding to the railway track associated with the field station. This panel is divided into units or sections corresponding to the field stations and has train progress lamps, and symbols or lamps corresponding to the track switches and signals of each field station. The panel is also provided with a key for each distant track switch or signal to enable the dispatcher to control the associated panel control relays in accordance with the position such key is actuated to. The panel control relays control the operation of the dispatcher's coding apparatus to transmit a code corresponding to the actuated key. These panel control relays are also operated in accordance with the codes received from the field stations to operate the panel symbols or lamps.

The dispatcher's coding unit is common to all of the unit panels and transmits outgoing codes, comprising three digits, in accordance with the particular panel unit connected with and in accordance with the particular key and panel control relay which is operated. The dispatcher's coding unit also receives incoming codes from the various field stations and operates a step-by-step switch in accordance therewith to operate the proper train-progress lamps and the proper track or signal symbols on the panel.

Each field station is provided with the usual and well-known track interlock relays for controlling the track signals in accordance with the train traffic over the corresponding track sections. These interlock relays and circuits are not part of this invention, and are shown and described briefly to enable the invention to be fully understood. Associated with the interlock relays at each field station are position control relays which operate the track switches and signals through the interlock relays in response to the certain codes received from the dispatcher's station. These position control relays are provided for each track signal or signal, and control the field station coding apparatus to transmit codes to the dispatcher's station in accordance with and in response to the operation of such track switches and signals.

A pair of track-signal relays are associated with each track section and are operated in accordance with track occupancy to control the field station coding apparatus to transmit codes in accordance with such occupancy.

Each field station coding unit transmits outgoing codes comprising three digits, the first two in accordance with the field station which is transmitting and the third in accordance with the particular position-control or track-signal relay which is operated. The field station coding unit also receives incoming codes to operate the proper position control relays in accordance with the codes transmitted from the dispatcher's station. All the field station coding units respond to incoming codes from the dispatcher's station but only one group of position-control relays at a particular field station is selected for operation due to cross-connections of the code marking relays which are operated by the first two digits.

The first impulse of the first digit in the codes transmitted from the dispatcher's station is a prolonged impulse to give the dispatcher preference over transmission from the field stations and to condition the field station coding units to receive the transmitted codes. The field station coding units respond to incoming codes only in case the first impulse is a prolonged pulse and, therefore, since the field stations do not transmit this prolonged pulse other field stations do not respond when a field station is transmitting to the dispatcher's station. Each field station is prevented from transmitting a code to the dispatcher's station when another field station is transmitting or the dispatcher's station is transmitting.

The main object of the invention is the provision of new and novel circuit arrangements in a centralized traffic controlling system of the above described type which are efficient and reliable in operation.

Another object of the invention is the provision of an improved coding arrangement which is quicker in operation than those now in use by reducing the code-transmission time for a large system of this type.

Other objects and features of the invention relate to the new and novel circuit arrangements which will be apparent from the following detailed description of the drawings.

Referring now to the drawings comprising Figs. 1 to 18, inclusive:

Figs. 1 and 2 show the dispatcher's panel-control relays, keys, and signals corresponding to the field station signals shown in Figs. 11, 12, 13 and 14.

Fig. 3, in the upper portion, shows the dispatcher's track indicating relays and in the lower portion shows the start and distributor relays for the dispatcher's coding apparatus.

Fig. 4, in its upper portion, diagrammatically illustrates a vertical and rotary step-by-step switch and associated controlling relays and magnets; while in the lower portion one of the sets of dispatcher's code-marking relays are shown.

Figs. 5 and 6 show the common dispatcher's coding-unit relays.

Figure 1:
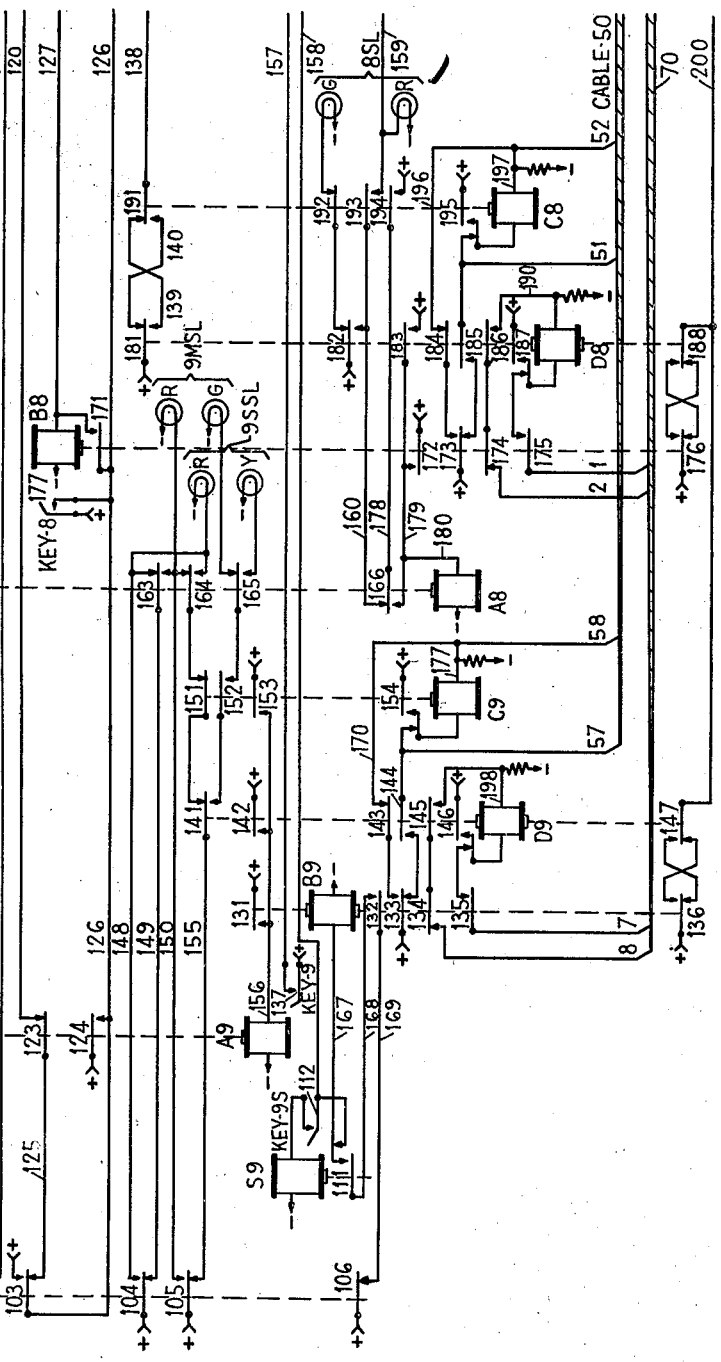

Figs. 11, 12, 13, and 14 show the track layout and the well known train interlock relays, the position control relays, and the track-signal relays associated with this field station.

Fig. 15 illustrates a portion of the dispatcher's panel corresponding to the field station shown in Figs. 11, 12, 13, and 14.

Fig. 16 shows a detail of the combined key and signal 8SL.

Fig. 17 shows a cross section of the mechanical construction of the combined key and signal 8SL.

Fig. 18 shows the manner in which the different figures of the drawings should be placed in alignment.

Throughout the drawings similar reference characters indicate similar apparatus or equipment. Also throughout the drawings the negative and positive battery symbols have been used to simplify the drawings, and it will be understood that where these symbols are used in the dispatcher's station all such symbols are connected to a common battery. The negative and positive battery symbols are also used in the circuits disclosed in the field station to simplify the drawings. It will be understood that a separate battery is used for the track-interlock relays in accordance with the usual practice and another battery is connected to the position-control relays, the track-signal relays, the coding-unit relays, the code-marking relays, and the start and distributor relays.

Figure 11:
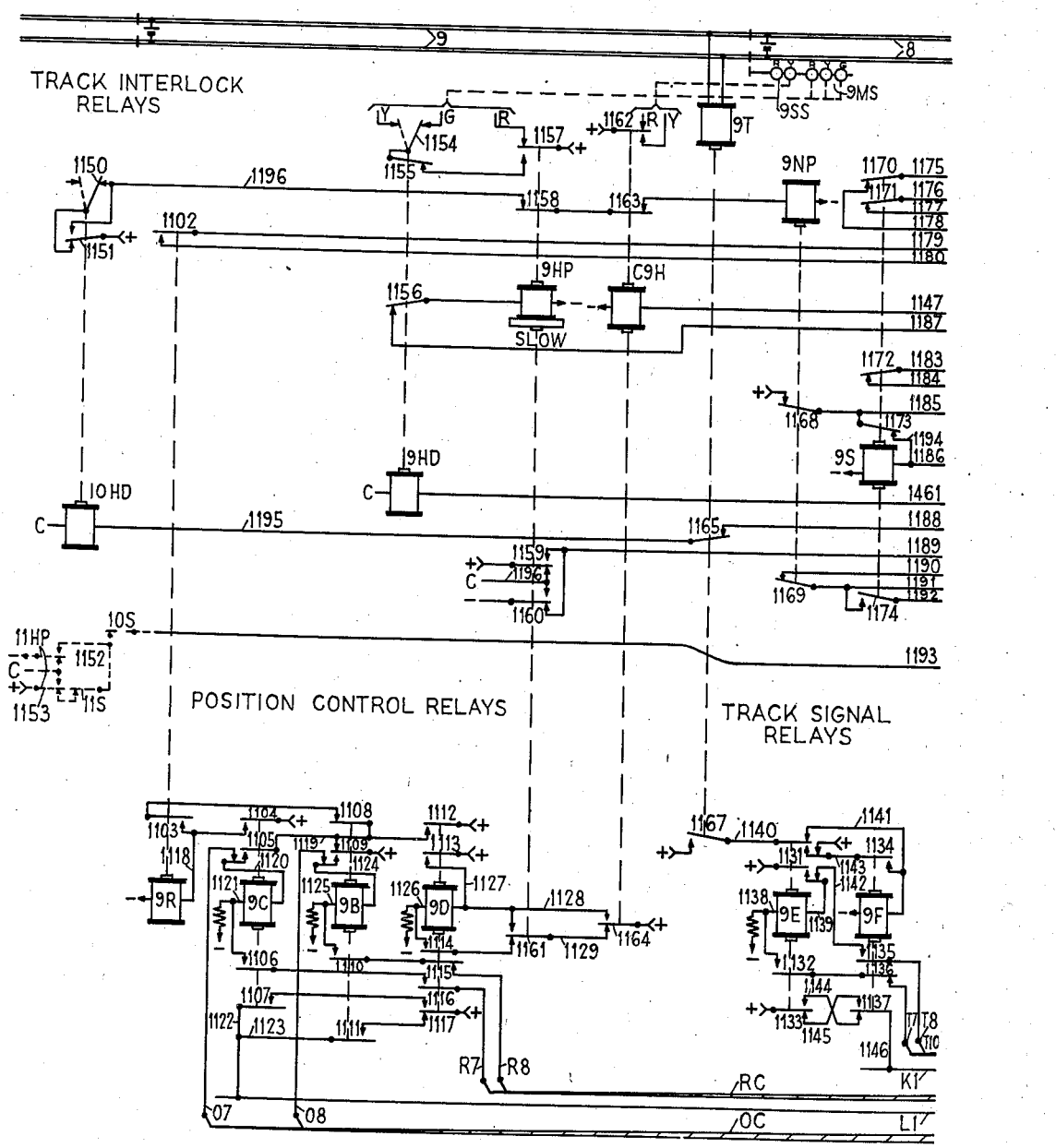

Referring now to that portion of the dispatcher's panel illustrated in Fig. 15, it will be seen that the illustrated track sections are each of a different color; that is, the section corresponding to track section 9 of Fig. 11 is blue, the section corresponding to section 8 is red, and the sections corresponding to sections 6 and 7 are yellow. Each such illustrated section has a round track symbol, such as 9TPL, 8TPL, 7TPL, and 6TPL. These symbols are round glass transparent caps suitably mounted on the panel and are known as the track-pilot symbols for indicating to the dispatcher the location of trains. Similar round transparent symbols 9MSL, 9SSL, 7SL, and 6SL are also suitably mounted on the panel. These symbols correspond, respectively, to the track signals 9MS, 9SS, 7S, and 6S in the corresponding field station and are positioned on the panel in accordance with the location of the distant track signals. A lever, or key—9, is associated with the symbols 9MSL and 9SSL on the panel and is operable by the dispatcher to control the operation of the distant track signals 9MS and 9SS. A similar lever, or key—7, is associated with the symbol 7SL for controlling the distant track signal 7S. In a like manner the key—6 is associated with symbol 6SL for controlling its corresponding distant track signal 6SL. The stick key—9S is a turn key which is operated by the dispatcher when the dispatcher wants only one train to pass over section 9.

The key—8 is a combined key and signal for both controlling the operation of the corresponding track switch TS in the field station (Fig. 12) and for indicating to the dispatcher the operated position of the same. The mechanical construction of this combined key and symbol is more fully disclosed in Figs. 16 and 17. The upper portion of this key-symbol, as seen in Fig. 17, comprises a raised rectangular transparent glass portion indicated as 8SL. This raised portion is provided to enable the dispatcher to turn the same and is made transparent so that different colored lights may be visible through it. A single lamp is mounted directly behind each symbol 9TPL, 8TPL, 7TPL, and 6TPL, in any suitable manner. These lamps are shown in Fig. 3 and have corresponding reference characters.

Figure 2:
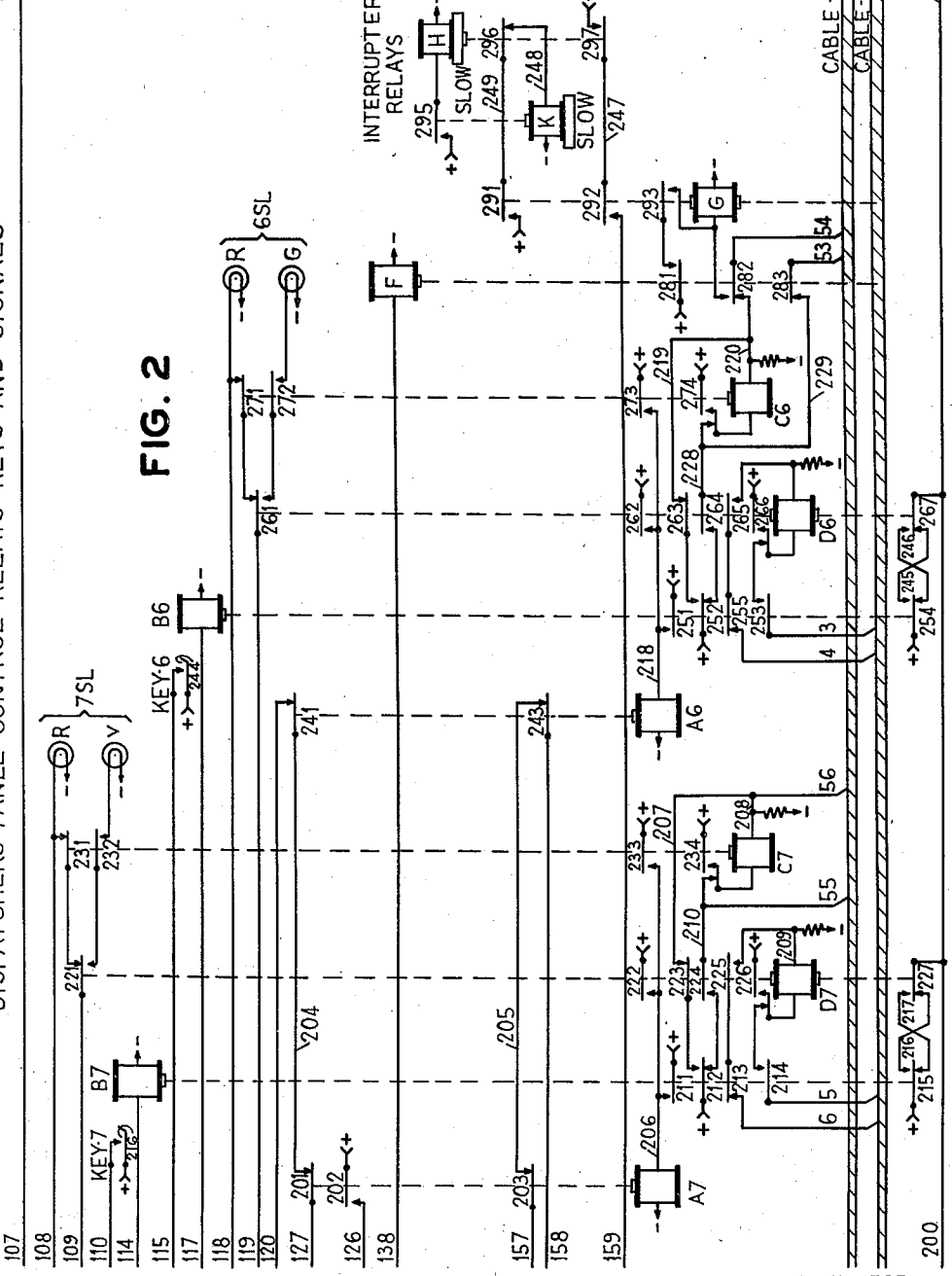

A red and a green lamp are suitably mounted behind the symbol 9MSL on the panel for visibly indicating to the dispatcher a red or a green indication. These lamps are shown in Fig. 1 and are correspondingly labeled 9MSL. In a similar manner the red and yellow lamps marked 9SSL, Fig. 1, are mounted behind the symbol 9SSL on the panel, the red and yellow lamps marked 7SL, Fig. 2, are mounted behind the symbol 7SL on the panel, and the red and green lamps marked 6SL, Fig. 2, are mounted behind the symbol 6SL on the panel. The red and green lamps marked 8SL, Fig. 1, are mounted behind the symbol 8SL on the panel as shown in Fig. 17. Each key on the panel controls a pair of springs as indicated at keys 9, 9S, 7, and 6 in Figs. 1 and 2.

The conductors of cable 50 extend from the fifth level of the vertical and rotary step-by-step switch in the dispatcher's station to the panel-control relays for controlling the operation and the release of the relays prefixed with the letter C. The conductors of cable 70 extend from the panel-control relays to contacts of one of the code-marking relays which operatively connect these conductors to the conductors of cable 80 extending to contacts of the digit-counting relays in the dispatcher's coding unit.

The cable 60 includes the conductors for operating and releasing the track indicating relays shown in Fig. 3 and these conductors terminate in the sixth level of the vertical and rotary step-by-step switch. The panel-control relays shown in Figs. 1 and 2 control an individual start relay shown in Fig. 3. A second start relay 340' is also shown in Fig. 3 which will be operated from the control relays of a second panel unit.

While only two start relays and one panel unit are shown, it will be understood that additional panel units and start relays may be added. The distributor relays shown in Fig. 3 automatically select the proper group of code-marking relays in accordance with the particular start relay operated.

Figure 4:
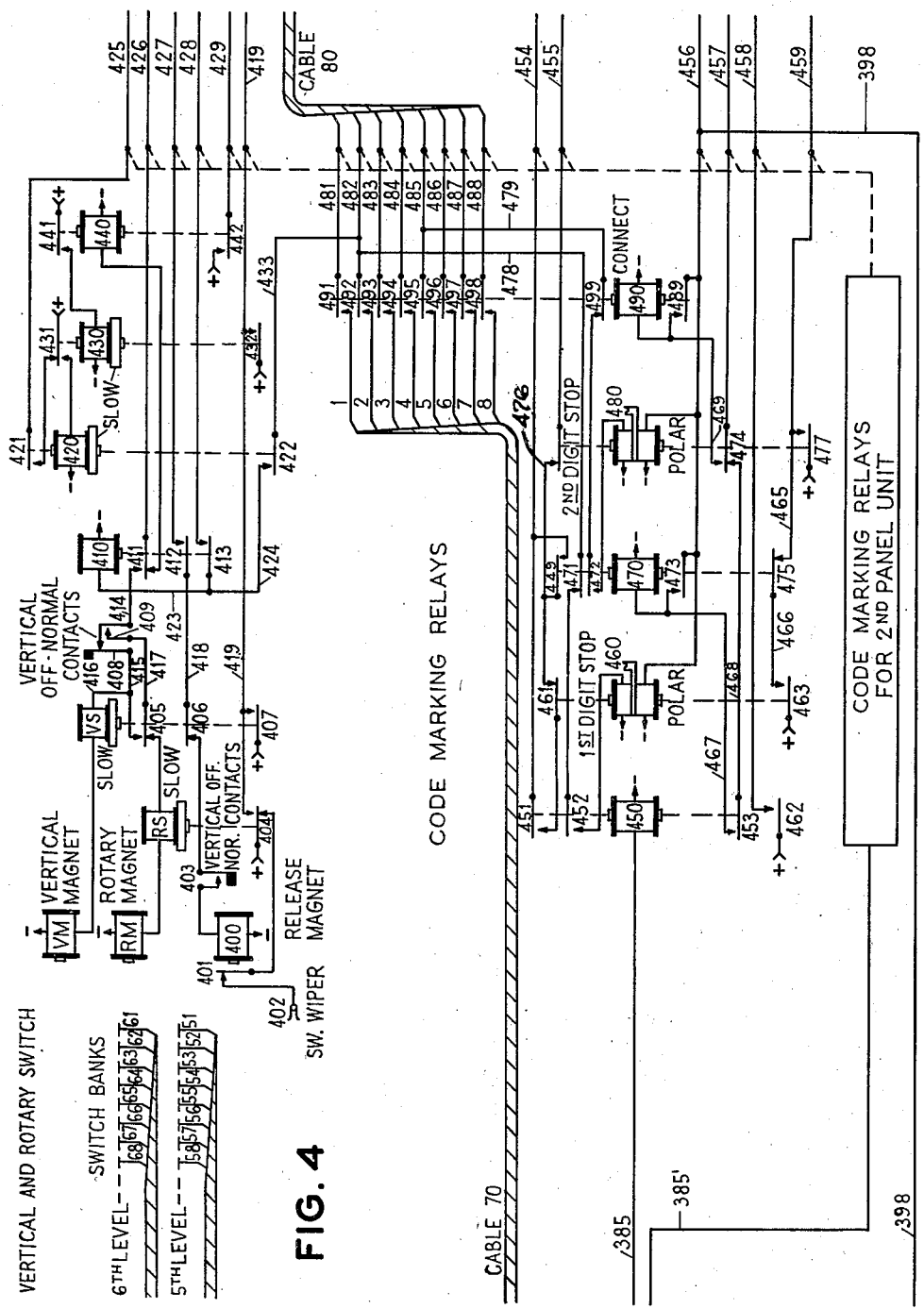

Certain of the code-marking relays are cross-connected by conductors such as 478 and 479, in accordance with the particular numerical designations of the corresponding group of panel-control relays. A separate group of code-marking relays similar to that disclosed in Fig. 4 will be provided for each panel unit. The vertical and rotary step-by-step switch disclosed in the upper portion of Fig. 4 has one-hundred bank contacts accessible to wiper 492. The one-hundred bank contacts of this switch are divided into ten levels of ten bank contacts each. This type of switch is of the well-known type of Strowger switch used in automatic telephone systems. The switch-controlling relays and magnets, and the code-marking relays are connected to the dispatcher's coding unit shown in Figs. 5 and 6.

Figure 6:
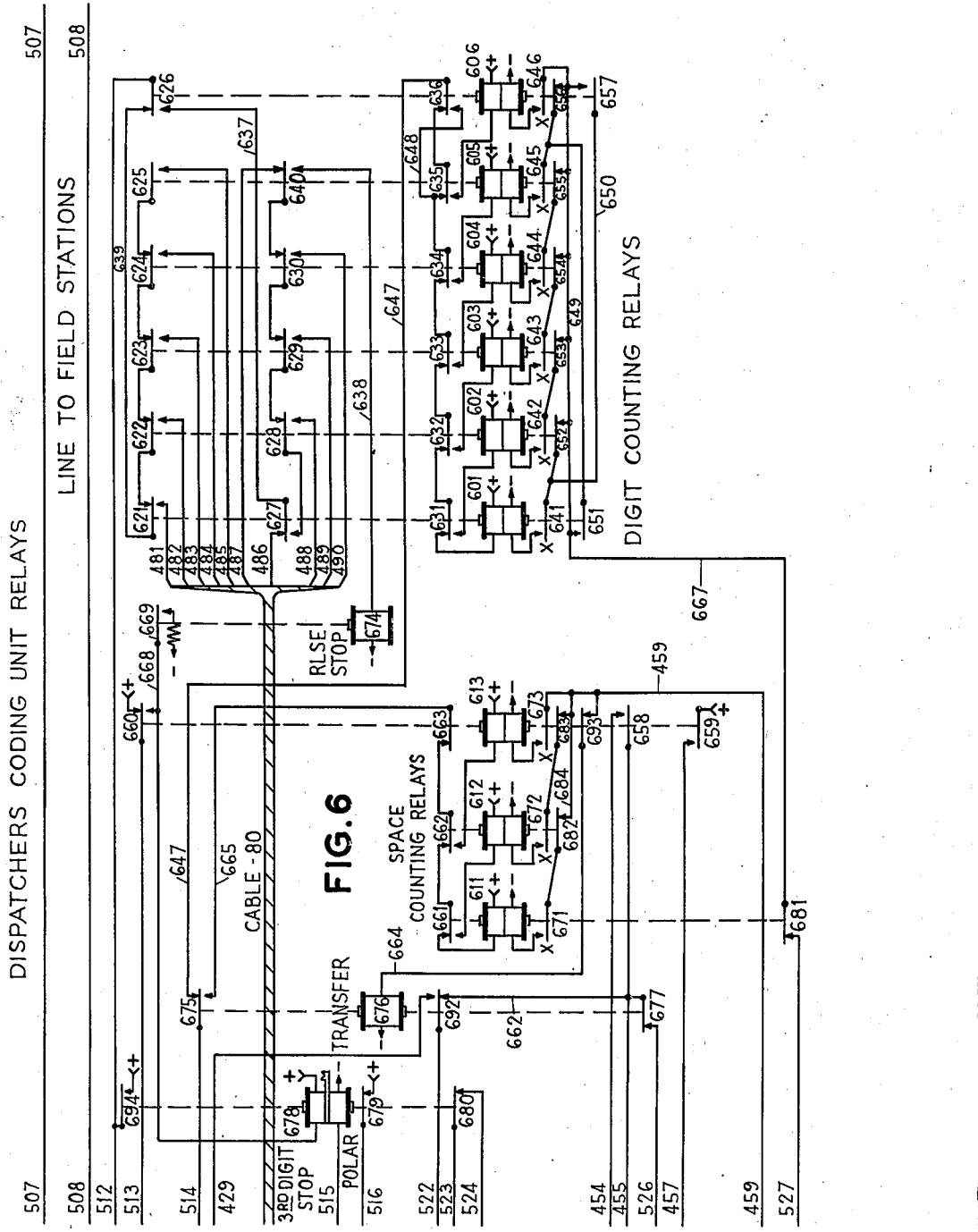
Figure 9:
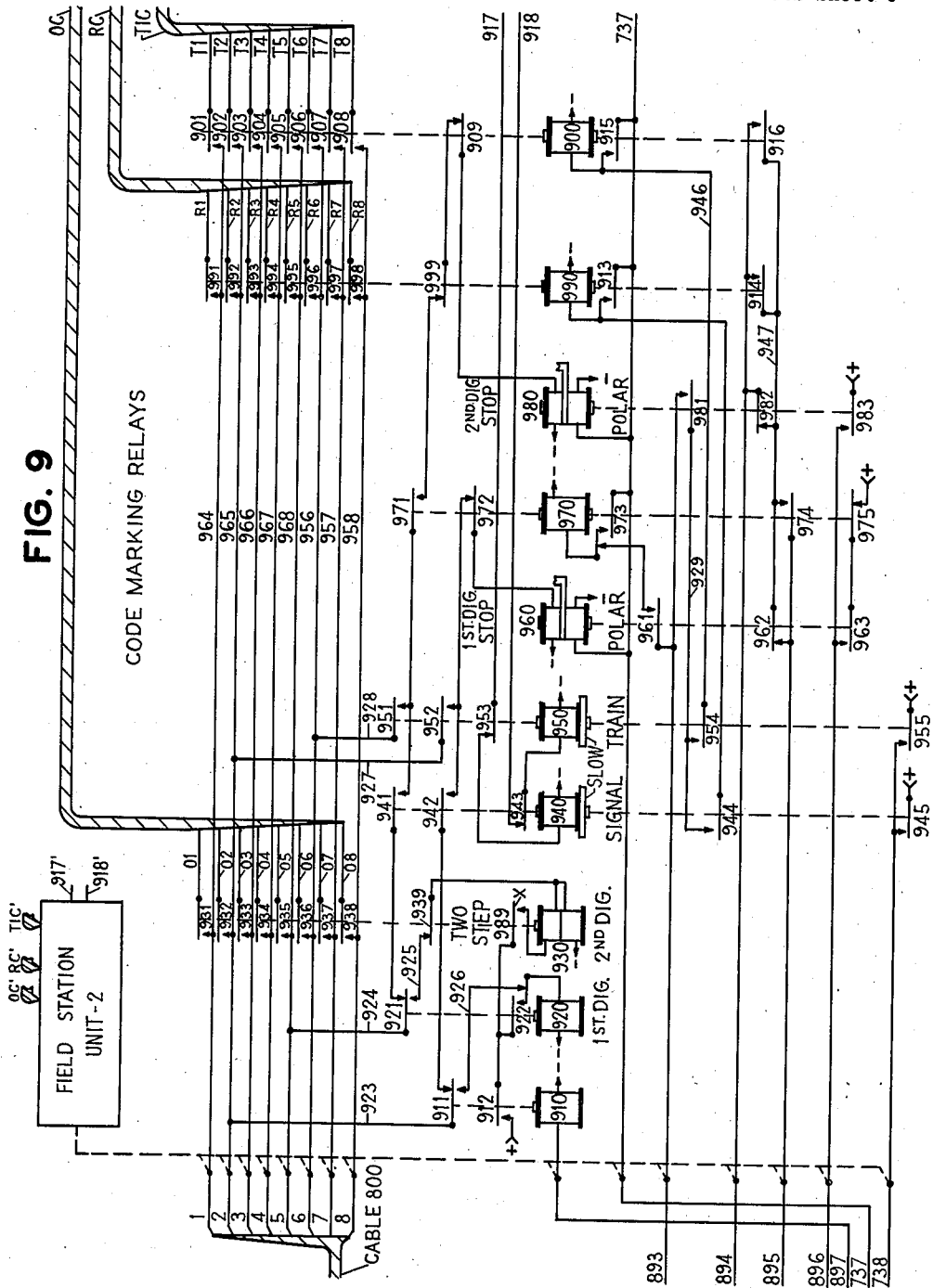
Fig. 9 shows the code-marking relays for this particular field station.

A pulse generating relay 552 is shown in Fig. 5 having a weighted vibratory armature for controlling the generation of impulses which are counted on the digit-counting relays and the space-counting relays shown in Fig. 6. The conductors 507 and 508 extend from the dispatcher's station through all of the field stations in series. The dispatcher's coding unit has a line relay 503 which responds to both incoming and outgoing pulses over line conductors 507 and 508. Each field station is provided with a similar line relay which also responds to both incoming and outgoing pulses over these two line conductors. Each field station coding unit is similar to the dispatcher's coding unit and has a pulse generating relay and counting relays. The field station code-marking relays shown in Fig. 9 operatively connect the field station coding unit to its associated position-control or track-signal relays over the conductors shown in the operate cable OC, the release cable RC, and the track indicating cable TIC.

Figure 10:
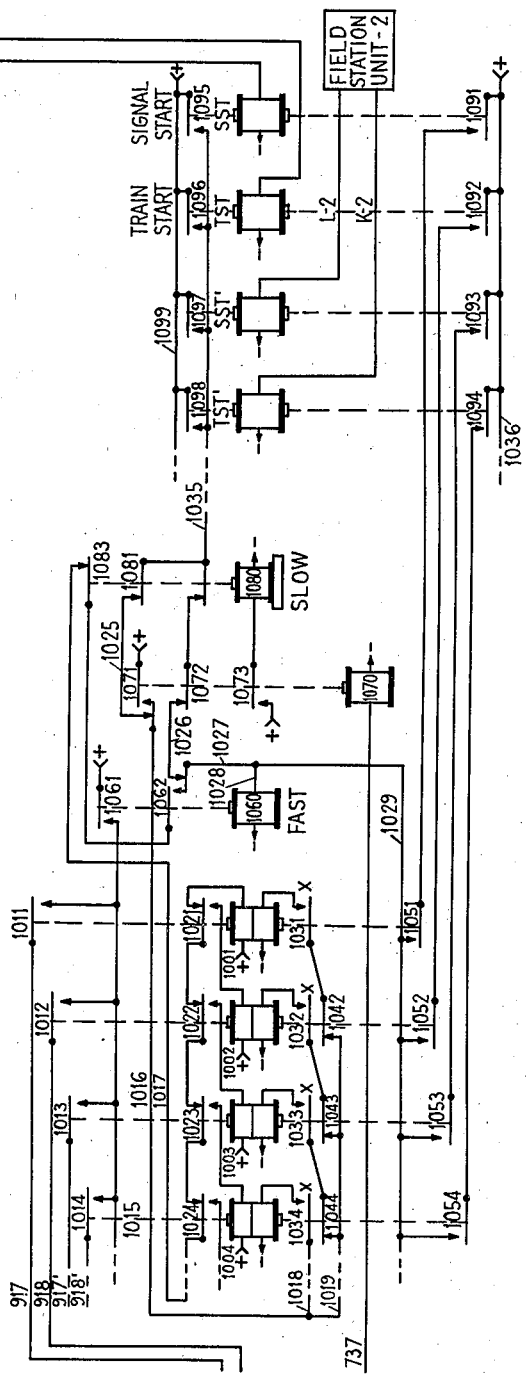
Fig. 10 shows the start and distributor relays at this field station.

Each field station unit has a signal-start relay controlled from the position-control relays and a train-start relay controlled from the track signal relays. The associated distributor relays in Fig. 10 cause the operation of the proper code-marking relays so that the track-signal relays or the position-control relays are connected to the field station coding unit. In case this particular field station has a number of traffic governing devices in excess of five to control, then a separate start relay and a separate code-marking relay group are provided for each five traffic governing devices. Such a field station is then divided into units of five traffic governing devices each, and each such unit has separate start and code-marking relays. As an illustration, in the lower right-hand corner of Fig. 10 is shown a rectangle, labeled field station unit 2, which is similar to the field station units shown in Figs. 10, 11, 12, 13, and 14.

Figs. 11, 12, 13, and 14 show a plurality of track sections numbered 9, 8, 7, and 6. The take-siding signal 9SS and the main track signal 9MS are for routing trains from left to right over the track switch TS to section 7 or over the track switch TS to section 6. Signal 7S is for controlling train travel over the track switch TS from the siding, while signal 6S is for controlling train travel from right to left over the main line section and the track-switch TS. The track switch TS is operated in the well-known manner by the motor SM which in turn is controlled by the polar relay 8WR. The switch contacts 1276 and 1277 are contacts which are operated by the track switch TS and which are only operated to circuit-closing positions when the track switch is in either one of its operated positions. The track-interlock relays and associated circuits are not part of this invention and are disclosed to enable the invention to be more fully understood. The position-control relays and the track-signal relays are grouped in accordance with their corresponding signals and sections of tracks. These latter relays are connected by conductors included in the operate cable OC, the release cable RC, and the track-indicating cable TIC, to the code-marking relays.

Fig. 15 shows one panel unit of the dispatcher's panel which corresponds to the field station shown in Figs. 11, 12, 13, and 14, and the different symbols of this panel are controlled in the manner shown in the circuit drawings in Figs. 1, 2, and 3. The combined key and signal 8SL is mounted on the panel 25 by means of machine screws 29 extending through a flanged sleeve 32, Fig. 17. Semi-circular clamps 35 are clamped around the sleeve 32 and have extensions (not shown) extending down to the brackets 37 upon which the springs 177, the springs 26, 27, and 28, and the spring 23 of the detent 24 is mounted. The red and green lamps are mounted in the lamp springs 26, 27, and 28 in the well known manner. An elongated sleeve 33 is rotatably mounted within the sleeve 32. The sleeve 33 is secured to the flanged sleeve 34 by means of a set screw (not shown), while the fiber disc 20 is secured to the flange of sleeve 34. Inside of rotatable sleeve 33 is inserted the sleeve 31 holding the glass portion 30 by the crimped edges of sleeve 31, as shown. A slot 31' keys the sleeve 31 to the sleeve 33. 30 is a circular glass piece having a raised rectangular portion 8SL. The raised rectangular glass portion 8SL is transparent. The lower part of the glass piece 30 is glazed black as shown in Fig. 15. The raised portion 8SL is rotated by the dispatcher, in the direction indicated by the arrow, to cause the sleeves 31 and 33 to rotate the sleeve 34 and fiber disc 20 so as to close springs 177 by the cam portion 21 of disc 20. In this movement the detent 24 disengages from the curved portion 22 and rests in a similar curved portion 25 of the fiber disc 20 when the combined key and signal 8SL is operated to a position corresponding to the take-siding position. The raised transparent portion 8SL of glass 30 permits this symbol to be used both as a key and as a signal for indicating the operated or non-operated condition of the track switch by illumination of either the red lamp R or the green lamp G.

In Fig. 5 relay 503 is normally energized over a circuit including battery B, winding of relay 503, conductor 506, contacts 571, and conductors 508 and 507 over a bridged loop including all of the field stations in series. Slow-to-release relay 550 is normally energized by way of contacts 565. The pulse generating relay 552 is normally energized from positive battery, over 551, 544 and 559, through the winding of relay 552 to negative battery.

Figure 7:
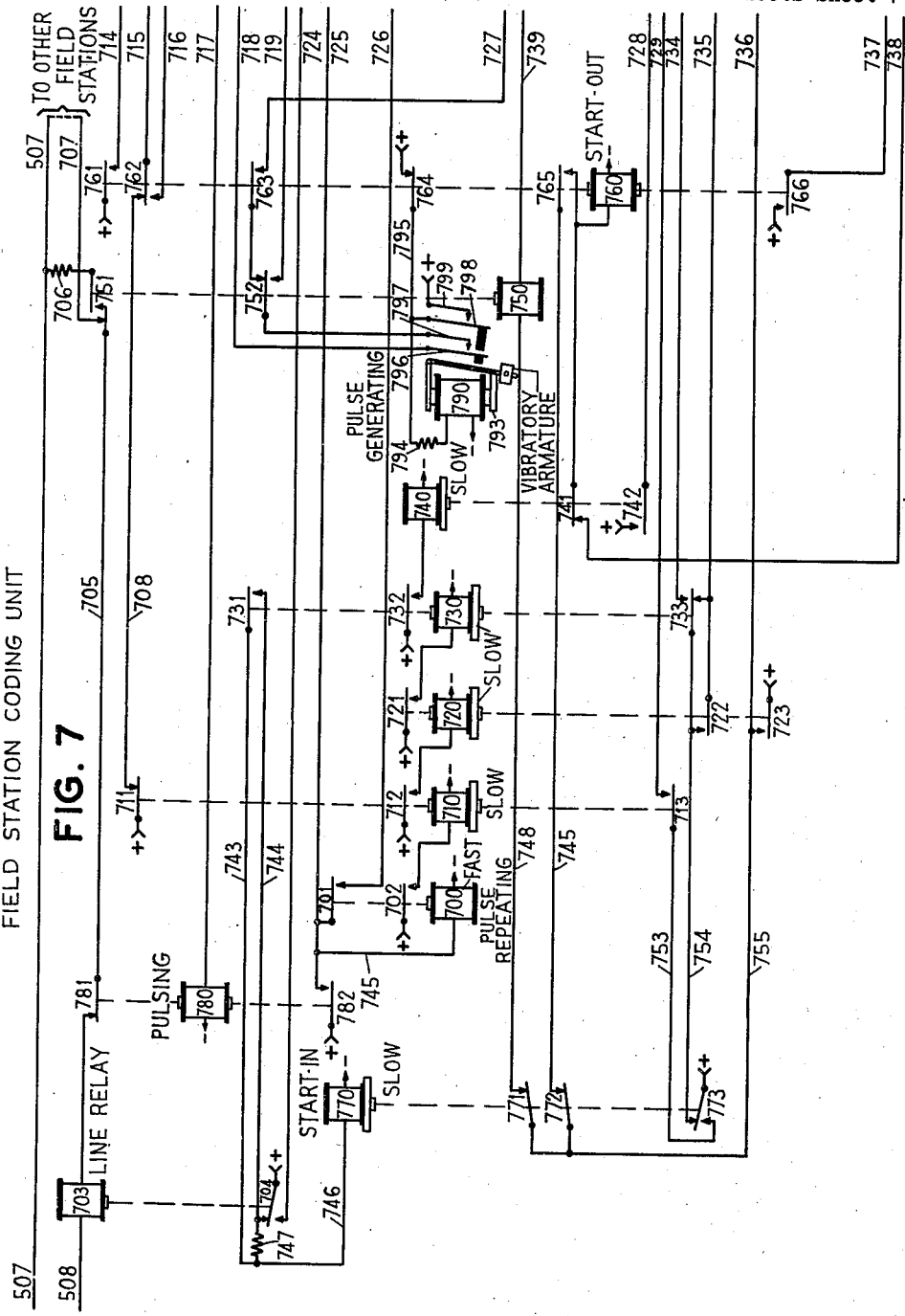
Figs. 7 and 8 show one of the field station coding units.
Figure 8:
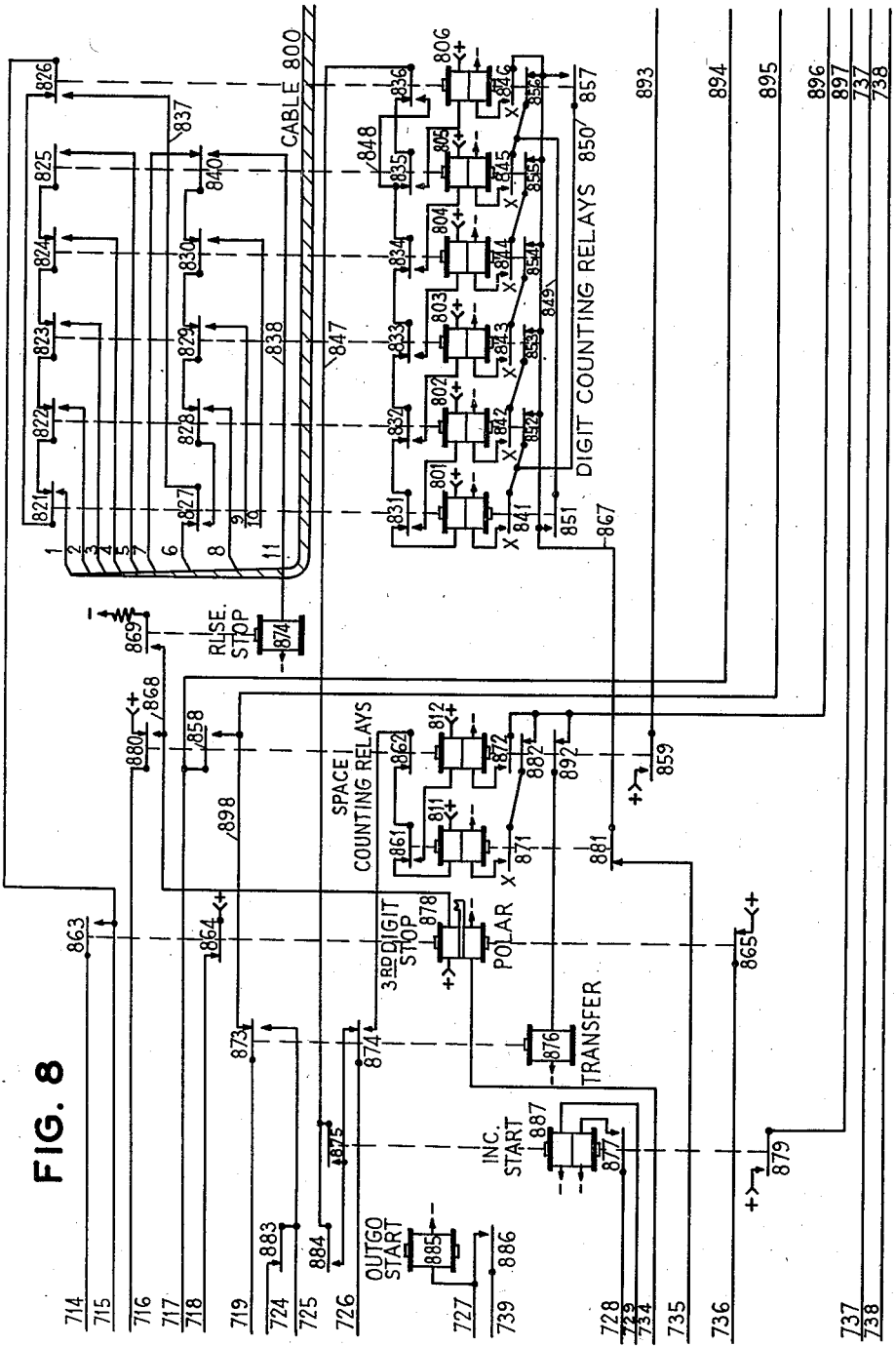

In each of the field stations the line relays such as line relay 703, Fig. 7, are energized over a loop circuit including conductors 507 and 508 extending to the dispatcher's station. This loop circuit includes contacts 781, conductor 706, normally closed springs controlled by contact 751, and conductor 707 at each field station. At the last connected field station conductor 707 is connected to conductor 507, thereby completing the loop circuit. Start-in relay 770 is normally energized from positive battery, back contact 704, resistance 747, conductor 746, winding of relay 770 to negative battery. Pulse-generating relay 790 is normally energized from positive battery, contact 764, conductor 795, resistance 794, to negative battery.

In accordance with the usual practice the track relays 9T, 8T, 7T, and 6T are normally energized over their respective track sections. Polar-neutral relay 10HD is energized from negative battery, back contacts 1160, 1189, 1453, 1364, 1249, 1188, 1165, 1195, to the common battery point C of the battery associated with the interlock relays. Relay 9HD is normally energized over the following circuit: from negative battery, back contact 1465, 1468, 1461, over intervening contacts (not shown), and through the winding of relay 9HD to the common point of battery C. Relay 9NP is normally energized from positive battery, front contact 1151, polar contact 1150, 1160, 1158 and 1163, through the winding of relay 9NP to negative battery. Relay 9S is maintained energized over the following locking circuit: positive battery, contacts 1168, 1173, and conductor 1194.

Figure 12:
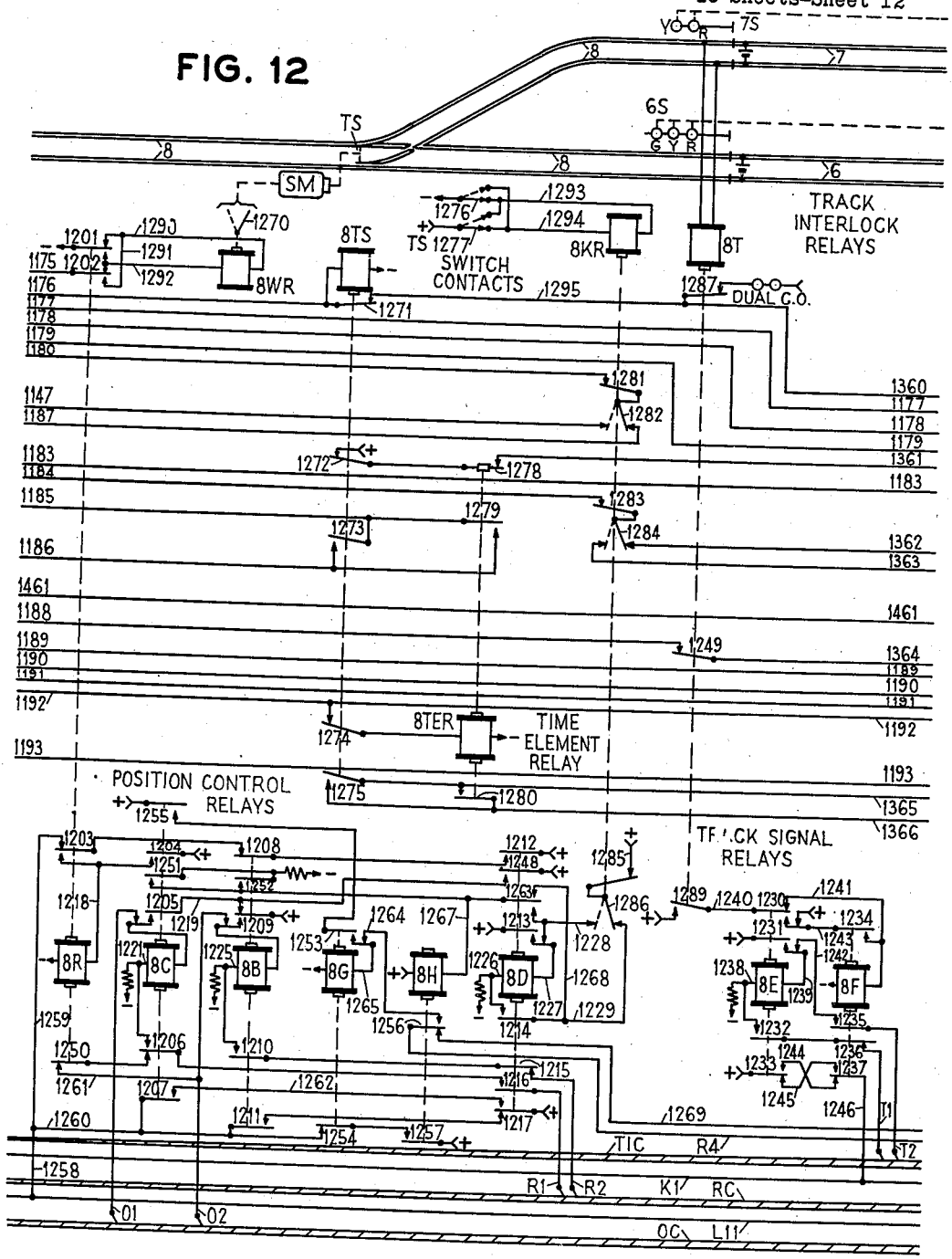

Relay 8TS in Fig. 12 is maintained energized over the following circuit: from positive battery to the dual control DUAL C. O., contacts 1287, 1295, 1271, and through the winding of relay 8TS to negative battery. Polar relay 8WR is normally energized over the following circuit: from positive battery, contacts 1272 of relay 8TS, contacts 1278 of the time element relay 8TER, 1361, 1451, 1178, 1170, 1175, back contact 1202, 1292, relay 8WR, 1290, back contact 1201 to negative battery.

Figure 13:
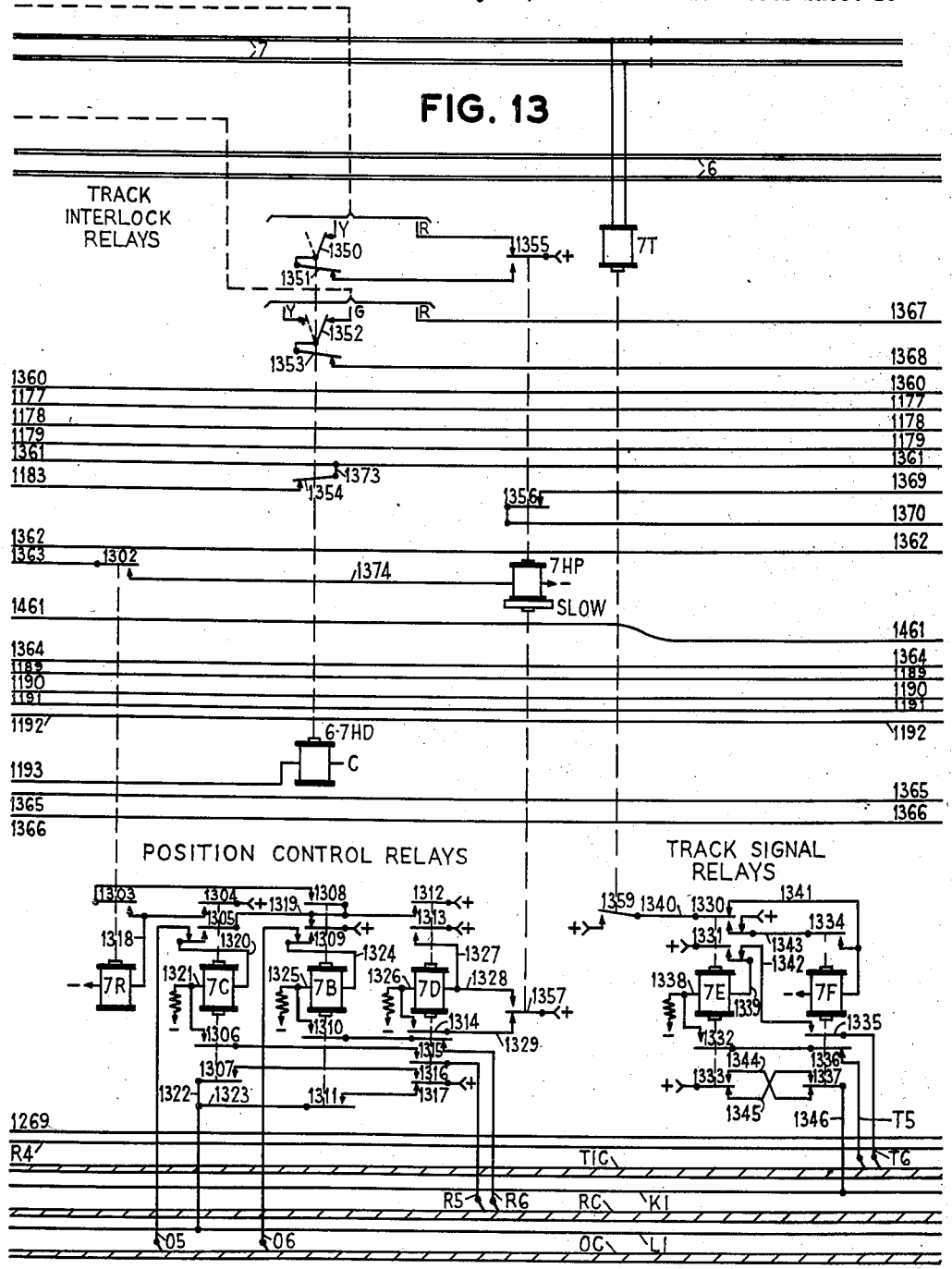
Figure 14:
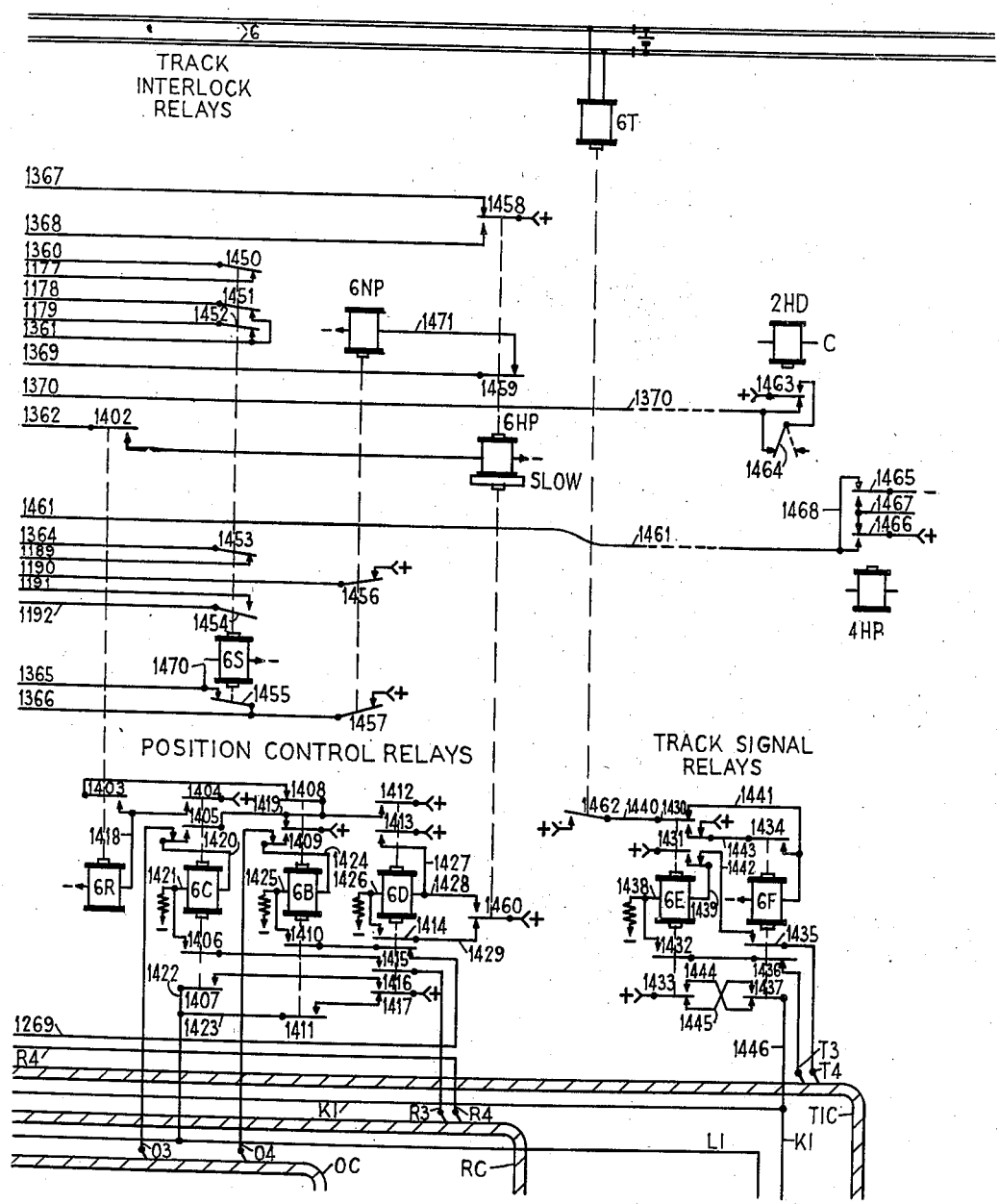

Relay 6—7HP, Fig. 13, is normally energized over the following circuit: from positive battery by way of contacts 1153, 11S and 10S associated with a distant field station, conductor 1193, and through the winding of relay 6—7HP to common point of battery. Relay 6S in Fig. 14 is maintained in operated position by way of contacts 1457 and 1455. Relay 6NP is normally energized over a circuit extending from a distant field station by way of positive battery, back contacts 1463 of relay 2HD, conductor 1370 and intervening contacts (not shown), 1356, 1369, 1459, 1471, and through the winding of relay 6NP to the negative battery. The normal condition of the track signals in the field are all set at stop position in which position their respective red lamps are illuminated in the well-known manner.

The signals on the dispatcher's panel are set in corresponding positions with the red lamps illuminated. For example, the signal 9MSL of Fig. 1, corresponding to the track signal 9MS of Fig. 11, has its red lamp illuminated over the following circuit: from positive battery, back contact 105, 155, back contact 141, 151, back contact 164, and through the filament of the red lamp R to negative battery. The take-siding signal 9SSL, corresponding to the signal 9SS of Fig. 11, has its red lamp illuminated over the following circuit: from positive battery, back contact 104, 149, back contact 163, and through the filament of the red lamp R to negative battery. The green lamp of the combined key and track switch signal 8SL is normally illuminated over contacts 182 and 192 to indicate that the track switch TS in Fig. 12 is set in position to route trains over the main track section. The red lamp of signal 7SL, corresponding to the signal 7S of Fig. 13, is normally illuminated over a circuit from positive battery, back contact 101, 109, back contact 221, 231, and through the filament of the red lamp to negative battery. The red lamp of signal 6SL, corresponding to the signal 6S of Fig. 13, is illuminated over the following circuit: from positive battery, back contact 102, 119, back contact 261, 271, and through the filament of the red lamp to negative battery.

*Operation of Key—9*

It will now be assumed that the dispatcher desires to set the track signal 9MS, Fig. 11, to proceed position to permit a train traveling from left to right to pass over track sections 9, 8, and 6. In order to set track signal 9MS to proceed position the dispatcher will operate the key—9 on the panel. In response to the operation of key—9, relay B9 is energized over the following circuit: from positive battery, contacts 137 of key—9, 157, 203, 205, 243, 158, normally closed springs controlled by contact 111, 167, and through the winding of relay B9 to negative battery. At contact 131 relay B9 completes an obvious circuit by way of conductor 156 for energizing relay A9, at contact 132 prepares a point in the locking circuit for itself in case the stick relay S9 is operated, at contacts 135 marks the stop conductor 7 of cable 70 and prepares a circuit for operating relay D9; and at front contacts 136 connects positive battery by way of back contact 147 to conductor 200, thereby completing an energizing circuit for start relay 340. At contacts 121 relay A9, upon energizing, opens a point in the circuit to relay B7 thereby rendering the operation of key—7 ineffective at this time. At contacts 122 the circuit extending to relay B6 is likewise opened to prevent its operation in case key—6 should be operated at this time. In a similar manner, relay A9 at contacts 123 opens the circuit to relay B8 to prevent its energization at this time.

Start relay 340, upon energizing, at contacts 341, completes a circuit for energizing the fast relay 370 by way of 345, 352, 362, 348, 349, and 396. Start relay 340 in addition at contacts 342 connects the positive pole of battery to stop conductor 343 to maintain relay 370 in operated position when the proper selecting relay is operated. Relay 370 operates very quickly when its circuit is completed and also when its circuit is opened, and at contacts 371 prepares a circuit for relay 450. At contact 372 relay 370 opens its original energizing circuit, but this relay is now held in operated position in series with the upper winding of selecting relay 380 as follows: from positive battery through the upper winding of relay 380, back contacts 382 and 392, 356, 353, front contact 372, conductors 349 and 396 to relay 370 and negative battery. Relay 370 is maintained energized over this circuit while the relay 380, due to the high resistance winding of relay 370, operates only its "X" contacts 383 to complete a circuit for its lower winding. This circuit may be traced from positive battery, contact 341, 345, 346, 351, normally closed springs controlled by contact 361, 347, 394, 343, and through the lower winding of selecting relay 380 to negative battery. Relay 380 completely energizes over the above-traced circuit to operate its remaining contacts and at contact 381 prepares a further point in the circuit to relay 450. At back contacts 382 relay 380 opens the holding circuit of fast relay 370 whereupon the relay 370 very quickly deenergizes to open its holding circuit at contact 372 before relay 390 can operate when a circuit is prepared for this relay at front contact 382. At contacts 382 relay 380 completes a circuit for relay 370 from positive battery connected to stop conductor 343 at contact 342. Relay 370 at this time is either energized over its original energizing circuit, as previously traced, or over the circuit extending from positive battery, contact 342, conductor 343, contact 382, conductors 354 and 396. Selecting relay 390 is not operated at this time in response to the operation of fast relay 370 because the upper winding of selecting relay 390 is short circuited as follows: from positive battery, contact 342 over the circuit traced for relay 370 and thence by way of conductor 349, contacts 372, 353, conductor 356, back contacts 392, front contacts 382, and through the upper winding of relay 390 to positive battery. In response to the operation of start relay 340 the selecting relay 380 is operated to complete a circuit for relay 450 as follows: positive battery, contacts 371, 355, 381, 385, and through the winding of relay 450 to negative battery. From the foregoing it will be seen that start relay 340 associated with the first panel unit at contact 342 has marked the stop conductor 343 so that only the first selecting relay 380 is operated to select the proper group of code-marking relays.

At this time it may be advisable to explain how other groups of code-marking relays associated with other panel units are selected. For example, it will be assumed that the dispatcher has operated some key in the second panel unit and has therefore caused the operation of start relay 340' over conductor 200' in a manner similar to the operation of start relay 340. At conductor 341' relay 340' completes the circuit for fast relay 370 and at contact 342' connects positive battery to stop conductor 344. Relay 370 operates in the same manner as previously described to cause the operation of the first selecting relay 380 but since the stop conductor 343 is not marked with positive battery potential the second selecting relay 390 is energized over the following circuit in response to the second energization of relay 370: from positive battery through the upper winding of selecting relay 390, front contact 382, back contact 392, conductor 356, contact 353, front contact 372, conductors 349 and 396 and through the winding of relay 370 to negative battery. Selecting relay 390 operates to close only its "X" contacts 393 over the above traced circuit. When "X" contacts 393 are closed the following circuit for fully operating the second selecting relay 390 is completed: from positive battery over the previously traced circuit including 341, 345, 346, 351, 361, 347, X393, and through the lower winding of relay 390 to negative battery. At contact 391, selecting relay 390 prepares a point in the circuit to the relay in the second code-marking panel unit similar to relay 450, at back contact 392 opens the circuit of fast relay 370 to cause its deenergization, at front contact 392 prepares a point in the circuit to the third selecting relay (not shown), at contact 394 opens the circuit of the first selecting relay to cause its deenergization, and at contact 395 connects the stop conductor 344 to the winding of relay 370 to cause the energization of this relay and to place a short circuit across the upper winding of the third selecting relay (not shown). The reenergization of relay 370 then completes the circuit by way of contacts 371 and 391 over conductor 385' for operating the relay in the code-marking relays associated with the second panel unit. A separate start relay, such as start relays 340 and 340' is provided for each panel unit of the dispatcher's panel and likewise a selecting relay such as relays 380 and 390 are provided for each panel unit to enable the proper group of code-marking relays to be selected, in a manner which will be apparent from the foregoing description.

Returning now to the time when code-marking relay 450 energizes as a result of the energization of the first selecting relay 380. Relay 450, upon energizing, at contacts 451 closes a bridge across conductors 454 and 455 at contacts 452 connects the first digit stop relay 460 to the stop conductor 478, at contacts 453 prepares a point in the circuit to relay 470, and at 462 completes a circuit for energizing relay 560 from positive battery, contact 462, 458, 522, 529, 545, through the winding of relay 560 to negative battery. Relay 560 is the outgoing start relay in the dispatcher's coding unit which prepares the circuits to cause the dispatcher's coding unit to transmit outgoing impulses to the field stations. Outgoing start relay 560, upon energizing, at armature 561 connects positive battery to the contacts of the digit-counting relays in order to successively connect positive battery to the conductors 481 to 490, inclusive, of cable 80 in order to complete a circuit for energizing the first digit-stop relay in the connected code-marking relays. At 562 relay 560 opens a point in the pulsing circuit to the vertical and rotary switch relays to prevent the operation of this switch during the transmission of outgoing codes. At 563 relay 560 completes a locking circuit for itself over conductor 516 and contacts 679 to positive pole of battery. At 564 relay 560 prepares a point in the circuit to relay 580, at 565 opens the circuit to slow-to-release relay 550, and at 566 completes a circuit for energizing the pulsing relay 570 as follows: from positive battery by way of 566, 528, 592, 526, 677, 455, 476, 461, 451, 454, and through the winding of pulsing relay 570 to negative battery.

Pulsing relay 570, upon energizing, at contacts 571 opens the loop circuit extending through all of the distant field stations to transmit the first pulse of the first digit. The line relays 703 in all of the field stations and the line relay 503 in the dispatcher's coding unit deenergize in response to each pulse. Line relay 503, although it follows the outgoing impulses, is ineffective at this time since its impulsing circuit is now open at contacts 562. At contacts 572 pulsing relay 570 completes a circuit for energizing the pulse-repeating relay 500 by way of conductor 429. The pulse-repeating relay 500 is a very fast relay which very quickly operates its contacts and likewise very quickly releases its contacts when its circuit is closed and opened. Pulse-repeating relay 500, upon energizing, at contacts 501 prepares a circuit for the first digit-counting relay 601, but this relay does not energize at this time since the upper winding of counting relay 601 is short circuited by contact 572 of the operated pulsing relay 570. This short circuit may be traced as follows: from positive pole of battery by way of 572, 429, 501, 514, 675, 647, and through the back contacts 636, 635, 634, 633, 632, and 631, through the upper winding of relay 601 to positive battery. At contact 502 relay 500 completes an obvious circuit for operating relay 510 and the latter relay at contacts 511 completes the circuit for energizing relay 530. Relay 530, upon energizing, at contact 532 completes an obvious circuit for energizing relay 520 and completes a circuit through the lower polarizing winding of polar relay 678 by way of conductor 515. This polar relay 678 does not energize at this time and only energizes at a time when the current through its upper winding is in the proper direction. At contact 541 relay 530 completes the locking circuit of the outgoing start relay 560 through its contact 563, and at contact 533 completes the circuit for relay 540. Relay 520, upon energizing, at contacts 522 opens the original energizing circuit of the outgoing start relay 560, but this relay is now locked in energized position through contacts 563 and 641. Relay 540, upon energizing, at armature 542 completes a circuit for energizing relay 360 and at contact 543 prepares a point in the circuit for fully operating the digit-counting relays through their "X" contacts. The circuit for energizing relay 360 may be traced as follows: from positive battery by way of 542, 456, 398, and through the winding of relay 360 to negative battery. A branch of this circuit extends through the lower windings of polar relays 460 and 480, to polarize these relays without causing the same to operate their contacts. These polar relays such as relays 460, 480, and 678, are similar in construction and operation to the relay disclosed in the H. C. Pye Patent No. 1,673,884, issued June 19, 1928.

Relay 360, upon energizing, at contact 361 completes a new circuit for holding the operated selecting relay 380 in its energized position from positive battery by way of 361, 347, 394, and 383. At contacts 362 relay 360 opens a point in the original energizing circuit of relay 370 and at contact 363 causes the operation of relay 350 over an obvious circuit. Relay 350, upon energizing, at 353 opens a point in the operating circuit to the selecting relays, and at 352 opens a further point in the original energizing circuit of relay 370. In response to the operation of relays 360 and 350 the operation of any further start relays such as 340' are ineffective until such time as the dispatcher's apparatus is released.

A predetermined time after the operation of the outgoing start relay 560 slow-to-release relay 550 deenergizes, and at contact 551 opens the circuit to the pulse generating relay 552. Relay 552 accordingly deenergizes and releases its weighted armature which swings to the right and at contact 556 completes a circuit for reenergizing itself, while at contacts 557 a circuit is completed for energizing relay 580. This circuit may be traced as follows: from positive battery, contacts 557, 524, 680, 523, back contact 591, 519, 564, 518, and through the winding of relay 580 to negative battery. At 581 relay 580 prepares a point in the circuit for energizing relay 590, but this relay will not operate at this time since its winding is short circuited by way of positive battery, contact 541, 516, 517, 590, 581, and thence over the energizing circuit of relay 580 to contacts 557 and positive battery. Pulse generating relay 552 reenergizes by way of its contacts 556 and conductors 558 and 559. When relay 552 is fully energized and the armature is attracted to its pole piece 555, contacts 556 open the circuit of relay 552 with the result that this relay again deenergizes. This operation of relay 552 continues until such time as relay 552 is held in operated position over its normally closed circuit. The first time contacts 557 open, the short circuit around relay 590 is removed with the result that this relay now energizes in series with relay 580 as follows: from positive battery, by way of 541, 516, 517, relay 590, 581, and relay 580 to negative battery. Relay 580 is maintained energized and relay 590, upon energizing, at contacts 592 opens the previously traced circuit for pulsing relay 570. From the foregoing description it will be seen that the pulsing relay 570 was held energized for a predetermined length of time in order to produce a long first pulse in the code to be transmitted to the field stations.

Pulsing relay 570, upon deenergizing, at contacts 571 recloses the loop extending to the field stations, at contacts 572 opens the previously traced short circuit around the upper winding of digit-counting relay 601, whereupon this counting relay is energized in series with the fast pulse-repeating relay 500 to close only its "X" contacts 641. Relay 500 is maintained in operated position in series with the upper winding of counting relay 601, and the latter relay, upon closing its "X" contacts 641, completes a circuit through its lower winding for fully operating its remaining contacts. This circuit may be traced from positive battery by way of 543, 527, 681, 667, 652, and "X" contacts 641 to the lower winding of relay 601 to negative battery. Counting relay 601 is fully operated over this circuit, and at contacts 621 connects positive battery potential to conductor 481 of cable 80 as follows: from positive battery, back contact 660, by way of 513, front contact 561, back contact 626, 639, front contact 621, to conductor 481. In this case, since the code-marking relays of Fig. 4 have not prepared a circuit to a stop relay by connecting the same to conductor 481, the first digit is not terminated after the first pulse. At back contact 631 counting relay 601 opens the circuit of relay 500 which very quickly deenergizes and opens contact 501 to prevent the second counting relay 602 from operating. At front contact 631 counting relay 601 prepares the circuit for the second counting relay 602. Relay 500 therefore falls back very quickly and opens its contact 501 before the second counting relay 602 can energize, and at contact 502 temporarily opens the circuit to slow relay 510, which, however, is maintained in operated position during the pulsing period.

Pulse-generating relay 552 due to its mechanical construction and circuit arrangement causes the weighted armature to operate at a predetermined rate of speed. Therefore, shortly after the previously described operations have taken place, the pulse generating relay deenergizes because, upon energization, it opened its own circuit at contact 556. Upon release of its weighted armature, relay 552 again closes its self-operating contacts 556 and at impulsing contacts 557 transmits an impulse to pulsing relay 570 as follows: from positive battery, pulsing contacts 557 of relay 552, and thence by way of 524, 630, 523, front contact 591, 522, back contact 692, 666, 455, 476, 461, 451, 454, and through the winding of pulsing relay 570 to the negative battery. Relay 570 again energizes and at contact 571 opens the loop circuit extending to the field stations to transmit the second pulse of the first digit. At contact 572 relay 570 again operates the pulse repeating relay 500. At contact 502 relay 500 reenergizes relay 510 in order to maintain this relay in operated position and at contacts 501 prepares the circuit for the second counting relay 602 which at this time is short circuited through its upper winding over a circuit similar to that previously traced for counting relay 601 but in this case including the front contact 631. When the weighted armature of the pulse-generating relay 522 opens the pulsing contacts 557 relay 570 deenergizes, and at contact 571 closes the loop extending to the field stations. At contact 572 pulsing relay 570 opens the short circuit around the upper winding of the second digit-counting relay 602, whereupon this latter relay is energized in series with relay 500 to close only its "X" contact 642. The circuit for operating relay 602 extends from positive battery through its upper winding, front contact 631, and thence over the previously traced circuit through the winding of fast relay 500 to the negative battery. Relay 602 by closing its "X" contacts 602 completes a circuit for fully operating its remaining contacts from positive battery by way of 543, 527, 681, 667, 653, and 642, through its lower winding to negative battery. At front contact 622 relay 602, upon fully operating, prepares a circuit for connecting positive battery to conductor 482 of cable 80, at back contact 632 opens the circuit to fast relay 500, and at front contact 632 prepares a circuit for the third counting relay 603. At contact 652 relay 602 opens the circuit extending through the lower winding of the first counting relay 601, whereupon this relay deenergizes. As previously described, relay 500 very quickly releases its armature 501 to prevent the operation of the next counting relay. The deenergization of the first counting relay 601 at back contact 621 completes a circuit for connecting positive battery to conductor 482 and in this case completes a circuit for operating the first digit stop relay 460 of the code-marking relays in Fig. 4 over the following circuit: from positive battery, back contact 660, 513, front contact 561, 512, back contact 626, 639, back contact 621, front contact 622, conductor 482 of cable 80, over the cross-connecting conductor 478, 471, 452, and through the upper operating winding of the polar first digit-stop relay 460 to negative battery. The direction of current flow in the upper operating winding of relay 460 is in the proper direction to assist the lower polarizing winding with the result that this first digit-stop relay 460 now energizes.

Before proceeding with the description as a result of the operation of the first digit-stop relay it is believed advisable to describe the operations of the digit-counting relays more fully. For this purpose it will be assumed that no circuit is completed for a digit-stop relay with the result that the pulse-generating relay 552, the pulse-repeating relay 500, and the pulsing relay 570 continue to operate in the same manner as previously described. Each operation of pulsing relay 570 and pulse repeating relay 500 prepares an energizing circuit for the succeeding digit-counting relay which is completed in series with the pulse-repeating relay 500 when the pulsing relay 570 deenergizes. Therefore, in response to the third operation of pulsing relay 570 and pulse repeating relay 500 positive battery potential is connected to conductor 647 as before. The third digit-counting relay 603 has its upper winding short circuited and therefore does not operate until such time as contact 572 removes this short circuit. The third counting relay 603 is energized to operate only its "X" contacts 643 in series with pulse-repeating relay 500. In a manner similar to that previously described, "X" contact 643 completes a circuit through the lower winding of the third counting relay 603 over conductor 667 to positive battery. The third counting relay 603 thereupon fully operates its remaining contacts, and at contact 623 prepares a circuit for connecting positive battery to conductor 483 of cable 80 when the second counting relay 602 deenergizes. At back contact 633 the third counting relay 603 opens the circuit of the fast pulse-repeating relay 500, which accordingly deenergizes. In a manner similar to that just described, the remaining counting relays 604, 605, and 606 are operated in response to the fourth, fifth, and sixth pulses generated by the pulse generating relay.

These digit-counting relays are of the so-called reflex type in that some of these relays are operated a second time dependent upon the number of impulses counted. Relay 606 is maintained energized through its lower winding and does not deenergize when a succeeding counting relay is energized since the contact 646 is connected directly to conductor 667. Relay 606 at its front contact 626 connects positive battery to conductor 486 of cable 80 by way of front contact 627. At front contact 636 relay 606 prepares a new circuit including the conductor 648 for reoperating counting relay 601 on the next or seventh impulse.

In response to the seventh pulse, counting relay 601 is reenergized over front contact 636, conductor 648, and thence over back contacts 634, 633, 632, and 631, through the upper winding of counting relay 601 in a manner similar to that previously described. At front contact 627 relay 601, upon its second operation in this digit, connects positive battery by way of front contacts 626 and 627, and back contacts 628, 629, 630, and 640 to conductor 487. At contact 651 relay 601 prepares a locking circuit for the lower winding of counting relay 605 in case this latter counting relay is energized a second time. In response to the eighth pulse, counting relay 602 is operated over a circuit similar to that previously described and at front contact 628 connects the position battery to conductor 588. In this case the second operation of counting relay 602 does not open the locking circuit of counting relay 601 because the latter relay is maintained energized over the following circuit: from positive battery connected to conductor 667, contact 657 of operated relay 606, "X" contact 641 through its lower winding. Counting relay 601 is therefore maintained in operated position after its second operation in order to provide a circuit for connecting positive battery to the remaining conductors of cable 80. In the same manner as previously described the remaining counting relays are operated one for each impulse until counting relay 605 is energized in response to the eleventh impulse. Relay 605 is maintained in operated position by way of its lower winding and contacts 645 and 651. Relay 605, therefore upon its second operation, at front contact 640 completes a circuit for energizing the release stop relay 674 as follows: from positive battery by way of back contact 660, 513, 561, 512, front contact 626, front contact 627, back contacts 628, 629, and 630, and front contact 640, 638, to relay 674 and negative battery. Release stop relay, upon energizing, at contact 669 completes a circuit for energizing the upper operating winding of the third digit stop relay 678 to cause this relay to operate and release the dispatcher's coding apparatus in a manner to be described more fully hereinafter.

Returning now to the end of the second pulse at which time digit-counting relay 602 is first operated to cause the operation of the first digit-stop relay 460 as previously described. Relay 460 at contact 461 opens the impulsing circuit to pulsing relay 570 to maintain this relay in deenergized position, and at contacts 463 completes a circuit for operating the transfer relay 676 as follows: from positive battery by way of contact 463, 466, 475, 465, 459, 693, 664, and through the winding of transfer relay 676 to negative battery. Transfer relay 676 energizes over the above-traced circuit and at contacts 675 transfers the pulsing circuit from the digit-counting relays to the space-counting relays. At contacts 692, transfer relay 676 transfers the pulsing circuit of the pulse generating springs 557 from pulsing relay 570 direct to pulse-repeating relay 500.

On the next closure of springs 557 by pulse-generating relay 552 the following circuit is completed for operating pulse-repeating relay 500: from positive battery, 557, 524, 580, 523, 591, 522, front contact 692, 429, and through the winding of relay 500 to negative battery. Relay 500 operates its contact 501 to close a short circuit around the upper winding of space-counting relay 611 as follows: from positive battery through the upper winding of relay 611, back contacts 661, 662, 663, 665, front contact 675, 514, 501, 429, and thence over the previously traced circuit for relay 500 to positive battery at pulsing springs 557.

When the pulse-generating relay attracts its weighted armature springs 557 open the previously traced short circuit around the upper winding of relay 611, whereupon the latter relay is operated in series with relay 500 to close its "X" contact 671. The operation of the "X" contact 671 completes the circuit to cause relay 611 to operate its remaining contacts as follows: from positive battery by way of 463, 466, 475, 465, 459, 684, 682, and "X" contact 671 through the lower winding of relay 611 to negative battery. At contact 681 counting relay 611 disconnects the positive battery from conductor 667 to cause the operated digit-counting relays to release. At back contact 661 the circuit to fast relay 500 is opened, whereupon the latter relay very quickly deenergizes. At front contact 661 relay 611 prepares a circuit for the second space-counting relay 612. Pulse-repeating relay 500 very quickly deenergizes and opens contact 501 before the second counting relay 612 can operate.

On the next deenergization of pulse generating relay 552 relay 500 is energized as before to prepare the circuit for the second counting relay 612, which, however, is short circuited as long as springs 557 are closed. When springs 557 open on the energization of relay 552 the short circuit around the upper winding of the second counting relay 612 is opened with the result that this relay now energizes in series with relay 500. Counting relay 612 energizes in series with relay 500 to close only its X contact 672, whereupon a circuit is completed through the lower winding of relay 612 for operating its remaining contacts. This circuit may be traced from conductor 459 having positive battery potential connected thereto, and thence by way of contacts 683 and 672 through the lower winding of relay 612. At contact 682 the circuit through the lower winding of the first counting relay 611 is opened, whereupon this latter relay deenergizes. At the break contact 662 the circuit to relay 500 is opened whereupon the latter relay deenergizes, while at the front contact 662 the circuit for the third space-counting relay 613 is prepared. Pulse-repeating relay 500 very quickly deenergizes and opens its contact 501 before the third counting relay can operate.

On the next deenergization of pulse-generating relay 552 relay 500 again energizes and contact 501 maintains the upper winding of the third counting relay 613 short circuited until such time as the pulsing springs 557 are opened on the next energization of relay 552. When relay 552 opens the pulsing contact 557 the short circuit from around the upper winding of relay 613 is opened and the latter relay is energized to close its "X" contact 673. In response to the closure of X contact 673 the circuit through the lower winding of relay 613 is completed, whereupon this relay operates its remaining armatures. At contact 660 relay 613, upon fully operating, prepares a point in the circuit for the third digit stop relay 678, at contact 663 opens the circuit to the pulse repeating relay 500 which deenergizes, at contacts 683 opens the circuit through the lower winding of the second counting relay 612 which deenergizes, at contacts 693 opens the circuit to the transfer relay 676 whereupon this relay deenergizes, at contact 658 prepares the circuit for reenergizing the pulsing relay 570, and at contact 659 completes a circuit for energizing the code-marking relay 470. This latter circuit may be traced as follows: from positive battery by way of 659, 457, 474, 468, 453, 467, and through the winding of relay 470 to negative battery.

Relay 470, upon energizing, at contact 449 bridges the conductors 454 and 455 to prepare the circuit for pulsing relay 570, at contact 471 opens the circuit extending through the upper operating winding of the first digit-start relay 460, which is now maintained in operated position through its lower polarizing winding alone, at contact 472 connects the second digit-stop relay 480 to conductor 485 by way of contact 499 and cross-connecting conductor 479. At armature 473 relay 470 completes a locking circuit for itself from conductor 456 connected to positive battery at contact 542, and at contacts 475 disconnects positive battery from conductor 459 to release the third counting relay 613.

Transfer relay 676, upon deenergizing, transfers the pulsing circuit back to the digit-counting relays and to the pulsing relay 570 at contacts 675 and 692. On the next deenergization of pulse-generating relay 552 the pulsing relay 570 is operated over either one of two circuits dependent upon whether relay 613 is in deenergized position at this time or not. The first of these circuits extends from positive battery 557, 524, 680, 523, 591, 522, 692, 666, 658, 454, to relay 570, and the second of these circuits extends over a similar path to conductor 455 and thence by way of 476, 449, and conductor 454 to relay 570.

From the foregoing description it will be seen that the first digit-stop relay 460 in the code-marking relays is operated to terminate the first digit in accordance with the conductor of cable 80 it is connected to, and at the same time causes the operation of a transfer relay 676 to stop further operation of the pulsing relay 570, thereby terminating the transmission of the first digit over the conductors extending to the field station. The pulse-generating circuit is transferred to the space-counting relays which are operated to introduce a space or pause between transmitted digits after which the transfer relay is released in order to again cause the pulse generating relay to operate the pulsing relay 570 to transmit the second digit.

Pulsing relay 570, upon energizing, at contacts 571 opens the circuit extending to the field stations to transmit the first pulse of the second digit, and at contact 572 closes the circuit for operating relay 500. Pulse generating relay 552, the pulsing relay 570, and relay 500 operate in the same manner as previously described to operate the digit-counting relays until such time as one of the digit-counting relays completes the circuit for the second stop relay 480 of the code-marking relay. In this case, since the second digit-stop relay 480 of the code-marking relays is cross-connected to the conductor 485, five impulses will be transmitted by the pulsing relay 570 at which time the digit-counting relay 605 is energized to complete the circuit for relay 480. This circuit may be traced as follows: from positive battery by way of 660, 513, 561, 512, 626, 639, 621, 622, 623, 624, 625, conductor 485 of cable 80, cross-connecting conductor 479, 499, 472, and through the upper operating winding of second digit-stop relay 480 to negative battery. Second digit-stop relay 480, upon energizing, at contact 476 opens the circuit to pulsing relay 570, at contact 474 prepares the circuit for relay 490, and at contact 477 again completes the circuit for energizing transfer relay 676.

Transfer relay 676, upon energizing, at contacts 675 transfers the counting circuit from the digit-counting relays to the space-counting relays, and at contacts 692 transfers the pulsing circuit from pulsing relay 570 directly to the pulse-repeating relay 500. Pulse-generating relay 552, pulse-repeating relay 500, and the space-counting relays 611, 612, and 613 are operated in the same manner as previously described until relay 613 is energized, at which time a circuit is completed for operating the connecting relay 490 of the code-marking relays as follows: from positive battery by way of 659, 457, 474, 469, and through the winding of connecting relay 490 to negative battery. Relay 613, at contact 660 also prepares the previously mentioned circuit for the third digit-stop relay 678, and at contacts 693 opens the circuit to transfer relay 676.

Connecting relay 490 of the code-marking relays, upon energizing, at its upper contacts 491 to 498, inclusive, connects the conductors of cable 70 to the conductors of cable 80 in order to connect the third digit stop-relay 678 by way of the digit-counting relay contacts to the conductors 1 to 8, inclusive, of cable 70 so that third digit-stop relay 678 will be energized in accordance with the operated panel-control relay. At contact 499 connecting relay 490 opens the circuit extending through the upper operating winding of the second digit-stop relay 480, but this latter relay is now maintained in operated position through its lower polarizing winding alone. At contacts 489 connecting relay 490 completes a locking circuit for itself by way of conductor 456 and contact 542. It will be noted that at the end of the second digit the space-counting relay 613 is maintained in its operated position in order to prepare the circuit for the third digit-stop relay 678.

Transfer relay 676, upon deenergizing in response to the operation of counting relay 613, again transfers the pulsing circuit back to the digit-counting relays and to the pulsing relay 570.

Pulsing relay 570 is now operated over the previously traced circuit including the contact 658. At contact 571 pulsing relay opens the circuit extending to the field stations to transmit the first pulse of the third digit, and at contact 572 again completes the circuit for relay 500. Relays 552, 570, and 500 operate in the same manner as previously described to operate the digit-counting relays until such time as a circuit is completed for the third digit-stop relay 678. Since the relay B9 of Fig. 1 has marked conductor 7 of cable 70, then the third digit-stop relay 678 is not operated until seven impulses have been transmitted over the line, at which time digit-counting relay 601 will be operated. The circuit for energizing the third digit-stop relay 678 may be traced as follows: from positive battery through the upper operating winding of polarized relay 678, front contacts 660, 513, 561, 512, front contacts 626, 637, front contacts 627, back contacts 628, 629, 630, and 649 to conductor 487 in cable 80, contact 497 to conductor 7 in cable 70, contact 135, through the normally closed contact controlled by contact 146, through the winding of relay D9, conductor 198 and the associated resistance to the negative battery.

Polar-stop relay very quickly operates and at contact 694 connects positive battery to conductor 512 and thence over the digit-counting relay contacts and the conductors in the cables 80 and 70 as previously traced, to cause the operation of relay D9. Relay 678 is held in its operated position through its lower polarizing winding alone over conductor 515 connected to positive battery at contact 532. At contact 679 relay 678 disconnects one of the positive battery connections from the conductor 516, and at contact 680 opens the pulsing circuit from the pulse-generating contacts 557, so that no further impulses generated by contacts 557 are effective to cause the operations of relays 570 and 500. Relay 500, therefore, is maintained in deenergized position for a sufficient time to cause the deenergization of the slow-release relay 510.

Relay D9, Fig. 1, energizes and at its back contact 141 opens the circuit to the red lamp of signal 9MSL leaving such signal dark. At front contact 141 relay D9 prepares a point in the circuit for the green lamp of signal 9MSL, at contact 142 holds relay A9 in operated position, at contact 145 prepares a point in its own release circuit, at contact 146 completes its own locking circuit, and at contact 147 opens the circuit of start relay 340. Start relay 340, thereupon deenergizes, and at contact 342 opens the circuit of relay 370. Relay 370 accordingly deenergizes, and at contact 371 opens the circuit of relay 450.

Relay 450 deenergizes and at contact 462 disconnects positive pole of battery from conductor 458.

Slow-to-release relay 510 deenergizes a predetermined time interval after relay 500 deenergizes and at contact 511 opens the circuit to slow-to-release relay 530. Relay 530 deenergizes after an interval and at contact 541 opens the locking circuit of the outgoing start relay 560 and likewise opens the circuit of relays 590 and 580 to cause the deenergization of these relays. At contact 532 relay 530 opens the circuit of slow-to-release relay 520 and the circuit through the lower polarizing winding of stop relay 678, and at contact 533 opens the circuit through relay 540. Relay 580, upon deenergizing, at contact 581 opens a further point in the circuit of relay 590. Relay 590 deenergizes and at back contact 591 prepares a point in the initial energizing circuit of relay 580 and at contact 592 prepares a point in the circuit for initially energizing the pulsing relay 570. Outgoing start relay 560, upon deenergizing, at contact 561 opens a point in the operating circuit of the third digit-stop relay 678, at contacts 563 opens a point in its own locking circuit, at contact 564 opens a point in the circuit of relay 580, at contact 566 opens a further point in the initial energizing circuit of pulsing relay 570, and at contact 565 completes the circuit for energizing relay 550. Relay 550, upon energizing, at contact 551 completes the circuit for energizing the pulse-generating relay 552 in order to hold this relay in operated position. Relay 678, upon deenergizing, at contact 694 opens the previously traced circuit for relay D9 which relay is now maintained in operated position over its own locking circuit, and at contact 680 prepares a point in the pulsing circuit from the pulse generating springs 557. Relay 540 deenergizes when its circuit is opened at contact 533, and at contact 543 opens the locking circuit of digit-counting relays 601 and 606 to cause these latter relays to deenergize. At contact 542 relay 540 disconnects positive battery potential from conductor 456 to cause the release of relays 460, 470, 480, 490, and 360.

First digit polar stop relay 460 deenergizes when positive battery potential is disconnected from conductor 456 and at contact 461 prepares a point in the initial energizing circuit of the pulsing relay 570. Relay 470 likewise deenergizes when positive potential is removed from conductor 456 and this relay at contact 471 prepares a point in the circuit to the first digit-stop relay 460. The second digit-stop relay 480 likewise deenergizes and at contact 477 disconnects positive battery potential from conductor 459 to cause the release of space-counting relay 613. Connect relay 490 also deenergizes, and at its upper contacts 491 and 498, inclusive, disconnects the conductors of cable 80 from the conductors of cable 70. Counting relay 613 deenergizes as a result of the release of relay 480, whereupon the dispatcher's coding unit is now fully released. All of the relays at the dispatcher's station are returned to their normal positions except relays A9, B9, and D9.

From the foregoing description it will be seen that in response to the operation of key—9 at the dispatcher's panel, the dispatcher's coding unit has transmitted a code of three series of impulses comprising digits 2—5—7— over the conductors 507 and 508 extending to the various field stations. It will also be seen that the first digit-stop relay 460 terminated the first digit, that the second digit-stop relay 480 terminated the second digit in accordance with the connections of these relays to the conductors of cable 80 extending to the digit-counting relays, and that the third digit is terminated by the operation of the third digit-stop relay 678 which energizes in series with the relay prepared in the panel-control relays in response to the operation of a particular panel key.

*Field stations receive code 257*

In response to the first digit 2, which comprises one long and one short pulse, the line relays, such as relays 703 in each field station, deenergize twice. Line relay 703 of the field station shown in Fig. 7 deenergizes in response to the first prolonged impulse and at front contact 704 opens the circuit for the start-in relay 770. Start-in relay 770 is of the slow-to-release type and therefore does not immediately deenergize. At back contact 704 relay 703 completes a circuit for operating pulse-repeating relay 700 as follows: from positive battery, back contact 704, by way of 724, 883, 725, relay 700, to negative battery. At contact 702 relay 700 completes an obvious circuit for operating relay 710 and the latter relay at contact 712 closes the circuit for relay 720. Relay 720, upon energizing, at contact 721 completes the circuit for operating relay 730 and the latter relay at contact 731 short circuits the resistance 747 to improve impulsing. At contact 732 relay 730 completes an obvious circuit for energizing relay 740 and at contact 733 completes a circuit for energizing the polarizing winding of polar relay 878 by way of 773, 754, 733, 734, to the lower polarizing winding. Relay 878 does not operate over this circuit and will only do so when current through its upper operating winding is in the proper direction. Relay 740, upon energizing, at contact 741 opens a point in the circuit of the start-out relay 760 to prevent its energization at this time, and at contact 742 prepares a point in the locking circuit of the incoming start relay 887.

Since the first pulse transmitted from the dispatcher's station is a prolonged pulse, then line relay 703 is maintained deenergized for a period of time which is sufficient to cause the deenergization of slow-to-release start-in relay 770. Since relay 770 deenergizes only in response to a prolonged pulse, it will be seen that the field station equipment responds only to codes transmitted from the dispatcher's station, and not from other field stations, because the field stations do not send a prolonged pulse and therefore relay 770 would not be deenergized when a field station is transmitting. This prolonged start pulse also gives the dispatcher preference over transmission from the field stations. Slow-to-release relay 770 therefore deenergizes in response to the prolonged impulse and at back contact 773 completes the circuit for energizing the incoming start relay 887 by way of 773, 753, 713, 729, and through the upper winding of incoming start relay 887. Relay 887, upon energizing, at contact 875 prepares a point in the circuit to the first digit-counting relay 801 but this relay does not operate at this time because the same is short-circuited as follows: from positive battery by way of back contact 704, conductor 724, 883, 725, 701, 726, 874, 875, 847, 836, 835, 834, 833, 832, 831, and through the upper winding of relay 881 to positive battery. At contact 877 relay 887 completes a locking circuit for itself by way of 742 and 728, and at contact 879 completes a circuit for energizing relay 910. This latter circuit may be traced as follows: from positive battery by way of 879, 897, the winding of relay 910 to negative battery. Relay 910, upon energizing, at front contact 911 connects the first digit relay 920 to its cross-connecting conductor 923, and at contact 912 prepares the locking circuit for the first and second digit relays 920 and 930.

The above described operations have taken place at all of the field stations in response to the first or prolonged start pulse transmitted from the dispatcher's station.

No field station coding apparatus can now be seized for transmitting a code to the dispatcher because the circuits to all the outgoing start relays 760 are opened at contacts 741 in each field station.

At the end of this first pulse line relay 703 energizes over the loop circuit extending back to the dispatcher's station. Line relay 703, upon energizing, at front contact 704 completes the circuit for reenergizing relay 770 as follows: from positive battery, front contact 704, conductor 744, contact 731, conductor 743, conductor 745, and through the winding of relay 770 to negative battery. The energization of line relay 703 also at back contact 704 opens the original energizing circuit of relay 700 and also removes the short circuit from around the upper winding of digit-counting relay 801. Relay 801 is now energized in series with relay 700 over the following circuit: from positive battery through the upper winding of digit-counting relay 801, and thence by way of 831, 832, 833, 834, 835, 836, 847, 875, 874, 726, 701, through the winding of pulse-repeating relay 700 to negative battery. Relay 700 is maintained in operated position over this circuit, while digit-counting relay 801 is energized over its upper winding to close only its "X" contact 841. The closing of "X" contact 841 completes a circuit through the lower winding of digit-counting relay 801 to cause this relay to fully operate its remaining contacts. This circuit may be traced as follows: from positive battery, contact 773, conductor 754, contact 722, conductor 735, contact 861, conductor 867, contact 852, "X" contact 841, and through the lower winding of relay 801 to negative battery. Digit-counting relay 801, upon energizing in its second step, at front contact 821 prepares a point in the circuit for operating a first-digit relay in case one is connected to the No. 1 conductor of cable 800, and at back contact 831 opens the circuit of relay 700, which very quickly deenergizes and opens its contacts 701 before the second counting relay 802 can be operated.

As will be noted the digit-counting relays 801 to 806, inclusive, are practically identical to the digit-counting relays 601 to 606, previously described, and also that the pulse-repeating relay 700 is very fast to operate and release in the same manner as described before for relay 500. Since the cooperation between the fast pulse-repeating relay 700 and the digit-counting relays 801 to 806, inclusive, is very similar to that previously described for the dispatcher's coding unit, only a brief detailed description will therefore be given of the field station counting relays. In this case, however, since the impulses are incoming to the field station, the line relay 703 directly controls the pulse-repeating relay 700. Pulse repeating relay 700, therefore, very quickly deenergizes and at contact 701 opens the circuit to the second digit-counting relay 802 before the same can operate, and at contact 702 temporarily opens the circuit to slow-to-release relay 710, but this latter relay is not deenergized between pulses of a transmitted digit. Start-in relay 770, upon energizing, at front contact 773 completes the previously traced circuit for causing the second step operation of digit-counting relay 801.

In response to the second pulse of the first digit line relay 703 deenergizes to cause the reoperation of pulse-repeating relay 700, and to temporarily open the circuit of slow-to-release relay 770, which at this time does not deenergize because the second pulse is not a prolonged pulse. The reoperation of pulse-repeating relay 700 at contact 702 maintains the slow-to-release relay 710 in operated position and at contact 701 prepares a circuit for the second counting relay as well as short circuiting the upper winding of such relay. At the end of the second pulse line relay 703 reenergizes, and at contact 704 maintains the start-in relay 770 in operated position and removes the short circuit from around the upper winding of digit-counting relay 802, whereupon this latter relay energizes in series with relay 700 in a manner similar to that previously described. Digit-counting relay 802 closes its "X" contact 842 thereby completing the circuit through its lower winding to cause its remaining contacts to be operated. Contact 832 of relay 802 opens the circuit of pulse-repeating relay 700 and contact 852 opens the circuit through the lower winding of the first digit-counting relay 801, whereupon this relay deenergizes. At contact 822 relay 802 prepares a circuit for the first digit relay 920, which is completed when counting relay 801 deenergizes and when slow-to-release relay 710 deenergizes. Pulse-repeating relay 700 deenergizes in response to the operation of the second digit-counting relay, and at contact 702 opens the circuit to the slow-to-release relay 710.

In this case, since the first transmitted digit comprises only two pulses, line relay 703 is now maintained energized for a predetermined length of time before the next digit is transmitted. This period of time is sufficient to cause the deenergization of slow relay 710 and later 720, but not the remaining slow relays 730 and 740. Relay 710 thereupon deenergizes, after an interval, to open the circuit to slow-release relay 720 at contact 712, and at contact 711 completes the circuit for energizing the first digit relay 920. This circuit may be traced as follows: from positive battery by way of 711, 708, 762, 715, 826, 821, 822, conductor 2 of cable 800, cross-connecting conductor 923, 911, 926, through the normally closed springs controlled by contact 922 and the winding of first digit relay 920 to negative battery. First digit relay 920 at contact 921 prepares the circuit for operating the second digit relay 930 and at contact 922 locks to contact 912.

A short time after relay 710 deenergizes relay 720 likewise deenergizes and at contact 722 opens the locking circuit of any of the operated digit-counting relays to cause in this case, relay 802 to deenergize. Although the circuit to slow-to-release relay 730 is opened at contact 721 by the deenergization of relay 720, relay 730 does not release because the time interval between the transmission of digits is too short since both relays 710 and 720 will be reoperated at the start of the next digit.

In response to the transmission of the second digit from the dispatcher's station comprising five pulses, line relay 703 is deenergized five times. Each deenergization of line relay 703 causes the energization of pulse-repeating relay 700 as previously described. Each energization of relay 700 prepares a circuit for the next succeeding digit counting relay which energizes in series with relay 700 when the line relay 703 reenergizes at the end of each pulse. Each digit-counting relay on fully operating its armatures opens the circuit of the immediately preceding counting relay and causes the deenergization of relay 700 before the next succeeding counting relay can energize. In response to the first operation of relay 700 relay 710 reenergizes and in turn causes the reoperation of relay 720 before slow-to-release relay 730 has had sufficient time to deenergize. In response to the fifth pulse of the second digit, digit-counting relay 805 is operated and digit-counting relay 804 deenergizes.

After transmission of this second digit line relay 703 is again maintained energized for a predetermined time interval to maintain relay 700 in deenergized position which causes the release of slow relays 710 and 720 as previously described. The second digit relay 930 is energized responsive to the deenergization of relay 710 over the following circuit: from positive battery by way of 711, 708, 762, 715, 826, 821, 822, 823, 824, 825, conductor 5 of cable 800, over the cross-connecting conductor 924, contacts 921, 925, 939, and through the lower winding of the second digit relay 930 to negative battery. Relay 720 deenergizes after an interval and at contact 722 opens the circuit of digit-counting relay 805 to cause the latter relay to deenergize. The second digit relay 930 is a two-step relay and operates only its "X" contact 989 in response to the previously traced circuit through its lower winding. At contact 989 relay 930 closes a short circuit around its upper winding from positive battery connected to contact 912 to positive battery connected to conductor 924 by the release of relay 710. Relay 930 will not operate in its second and step until such time as relay 710 is reenergized to remove the short circuit at contact 711.

In response to the final or third digit, in this case digit 7, comprising seven pulses, line relay 703 deenergizes seven times. Pulse-repeating relay 700 energizes once for each deenergization of line relay 703 and each energization of relay 700 prepares a circuit for the next succeeding digit-counting relay which energizes in series with relay 700 when the line relay 703 energizes to terminate the pulse. Each digit-counting relay on fully operating opens the circuit of the preceding counting relay and causes the deenergization of relay 700 before a succeeding counting relay can be operated, as previously described. Slow-to-release relays 710 and 720 are again reenergized in response to the operation of relay 700. At contact 711 relay 710, upon energizing, removes the short circuit from around the upper winding of relay 930 to allow this relay to operate its remaining contacts in its second step operation. Relay 720 again energizes to prevent the release of relay 730. When the short circuit around the upper winding of relay 930 is opened this relay is operated in its second step operation over the following circuit: from positive battery by way of contacts 912, "X" contact 989, and through the upper and lower windings of relay 930 to negative battery. At its upper contacts 931 to 938, inclusive, the conductors 1 to 8, inclusive, of cable 800 are connected to the conductors 01 to 08, inclusive, of the operate cable OC extending to the position control relay in Figs. 11 to 14, inclusive.

As previously mentioned, the digit-counting relays 801 to 806, inclusive, are practically identical with the digit-counting relays 601 to 606, inclusive, and therefore counting relay 806 is maintained in operated position after the sixth pulse. Counting relay 801 is maintained in operated position after the seventh pulse, while relays 802, 803, 804, and 805 operate in response to the seventh, eighth, ninth, tenth, and eleventh pulses if the same are transmitted. Relay 805 completes the circuit for the release-stop relay 874 in a manner similar to that described for the release-stop relay of the counting relays of Fig. 6. Release-stop relay 874 is energized due to trouble or fault. At contact 869 relay 874 completes the circuit for energizing the third-digit stop relay 878 by way of conductor 868 to cause the release of the field station coding unit in a manner to be apparent from the following description.

Since in this case only seven pulses are transmitted in the third digit, then digit-counting relays 806 and 801 are energized at the end of this transmitting period. Line relay 703 is now maintained in operated position with the result that relays 700 and 710 release in the same manner as previously described. Relay 710, upon deenergizing, at contact 711 completes a circuit for energizing the position control relay 9C, Fig. 11, as follows: from positive battery by way of 711, 708, 762, 826, 837, 827, 828, 829, 830, 840, conductor 7 of cable 800, contact 937 to conductor 07 of operate cable OC, and thence by way of the normally closed springs controlled by contact 1105 (Fig. 11) conductor 1120, through the winding of relay 9C, conductor 1121 and associated resistance to negative battery.

Slow-to-release relay 720 deenergizes shortly after the deenergization of relay 710, and at contacts 721 opens the circuit to slow-to-release relay 730. At contact 722 relay 720 opens the holding circuits of relay 801 and 806, which now deenergize. Since no further series of impulses are transmitted after the third digit slow-to-release relay 730 deenergizes after a predetermined time. At contacts 732 relay 730 opens the circuit of relay 740, and the latter relay deenergizes after an interval to open the locking circuit of incoming start relay 887 at contact 742. Relay 887, upon deenergizing, at armature 875 opens a point in the pulsing circuit to the counting relays and at contact 879 opens the circuit to relay 910. Relay 910, upon deenergizing, at armature 912 opens the circuits of relays 920 and 930 to cause the release of these latter relays. Relay 930, upon deenergizing, disconnects the conductors of operate cable OC from the conductors of cable 800.

From the foregoing description it will be seen that in response to the operation of key 9 at the dispatcher's panel, Fig. 1, three digits, 2, 5, and 7, have been transmitted over the line loop to the various field stations. The first two transmitted digits 2 and 5 have selected the desired field station by the operation of relays 920 and 930 which are connected at the proper time to certain conductors of cable 800. The first and second digit relays in the other field stations corresponding to relays 920 and 930 are cross-connected to the conductors of a cable similar to cable 800 in a manner different from that shown in the field station of Fig. 9. In the other field stations the cross-connecting conductors, such as 923 and 924, are connected to conductors of the cable corresponding to cable 800 in accordance with the digits necessary to select that particular field station. After the operation of the second digit relay in the selected field station, the conductors of cable 800 are connected to the operate cable OC and the last digit transmitted operates the position-control relay corresponding to the actuated dispatcher's key, in this case relay 9C since key—9 was operated.

Relay 9C, upon operating over the previously described circuit, at contacts 1105 completes a locking circuit for itself by way of positive battery, back contact 1109, conductor 1119, contact 1105, conductor 1120, through the winding of relay 9C, conductor 1121, and associated resistance to negative battery. At the contacts 1104 relay 9C completes an obvious circuit by way of conductor 1118 for operating relay 9R. Relay 9R at contact 1103 completes a locking circuit for itself from positive battery by way of back contact 1109, contact 1108, 1103, conductor 1118 to relay 9R and negative battery. At contact 1102 relay 9R completes the circuit for operating relay 9HP provided there are no conflicting track conditions at this time. This circuit may be traced as follows: from positive battery by way of contact 1272, contact 1278 of the time-element relay, conductor 1361, contact 1452, conductor 1179, contact 1102, conductor 1189, neutral and polar contacts 1281 and 1282, conductor 1197, contact 1156, and through the winding of relay 9HP to negative battery. Relay 9HP, upon energizing, at back contact 1157 extinguishes the red lamp of signal 9MS and at front contact 1157 completes the circuit for lighting the green lamp of signal 9MS as follows: from positive battery by way of front contact 1157, neutral and polar contacts 1155 and 1154 of relay 9HD, and through the green lamp of signal 9MS to negative battery. At contact 1158 relay 9HP opens the circuit of relay 9NP and at contacts 1159 and 1160 reverses the battery connections to the polar-neutral relay 10HD to cause this latter relay to move its polar contact 1150 to the dotted position. Polar-neutral relay 10HD is operated to this position over the following circuit: from positive pole of battery, front contact 1159, conductor 1189, contact 1453, conductor 1364, contact 1249, conductor 1188, contact 1165, conductor 1195, and through the winding of the polar-neutral relay 10HD to the common point of battery C. Relay 9HP in addition at contact 1161 completes a circuit for energizing relay 9D as follows: from positive battery by way of back contact 1164, conductor 1129, front contact 1161, winding of relay 9D, conductor 1126, through the associated resistance to negative battery. Relay 9NP deenergizes in response to the operation of the relay 9HP and at contact 1168 opens the locking circuit of stick relay 9S. Stick relay 9S thereupon deenergizes, and at contact 1170 opens the circuit to the track switch controlling relay 8WR to prevent operation of this relay so that the track switch motor SM cannot be operated. At contact 1171 relay 9S opens a point in the original energizing circuit of relay 8TS, which, however, is maintained energized over its locking circuit, and at contact 1172 opens points in the circuits to relays 6HP and 7HP to prevent their operation at this time.

Relay 9D, upon energizing over the above-traced circuit, at contact 1113 completes an obvious locking circuit for itself and at contact 1112 maintains relay 9C in operated position independent of contact 1109 of relay 9B. At contact 1116 relay 9D prepares a point in the circuit for releasing relay 9C and at contact 1117 relay 9D connects positive battery to the start lead L1 to operate the signal-start relay SST of Fig. 10 over the following circuit: from positive battery by way of front contact 1117, contact 1107, conductor 1122, common start conductor L1, and through the winding of signal-start relay SST (Fig. 10) to negative battery.

Signal-start relay SST, upon energizing, at contact 1095 completes the circuit for energizing relay 1060 as follows: from positive battery by way of 1095, 1035, 1082, 1072, 1062, 1027, and 1028, through the winding of relay 1060 to negative battery. Relay 1060 energizes over this circuit and at contact 1061 prepares a point in the circuit for energizing either the signal or train relay 940 or 950 in the code-marking relays. At contact 1062 relay 1060 opens a point in its original energizing circuit, but this relay is now held in operated position through the upper winding of distributor relay 1001 as follows: from positive battery through the upper winding of relay 1001, back contacts 1021, 1022, 1023, 1024, conductor 1017, contact 1083, 1062, conductors 1027 and 1028, through the winding of relay 1060 to negative battery. The first distributor relay 1001 is energized over this circuit to close only its "X" contact 1031, whereupon a circuit is completed through the lower winding of relay 1001 for operating its remaining contacts. This circuit may be traced from positive battery by way of 1095, 1035, 1081, 1025, 1071, 1016, 1019, 1042, and X1031, through the lower winding of relay 1001 to negative battery. At back contact 1021 relay 1001 opens the circuit to relay 1060 (which very quickly deenergizes before the second distributor relay 1002 can operate), at contact 1011 prepares a point in the circuit to signal relay 940 in the code-marking relays, and at contact 1051 completes a circuit for energizing fast relay 1060 in case the first signal-start relay SST is energized.

In order to more fully describe the operation of the distributor relays, it will be assumed for the time being, that the first signal-start relay SST is not energized. In this case, then no circuit is completed for the fast relay 1060 by the operated contact 1091 of the signal-start relay SST and the first distributor relay 1001 and contact 1051. Relay 1060, thereupon, deenergizes and at the normally closed contact controlled by contact 1062 reestablishes its original energizing circuit and upon operation completes the circuit through the upper winding of the second distributor relay 1002 to cause the latter relay to operate its "X" contact 1032. In response to the closure of contact 1032, the circuit is completed through the lower winding of distributor relay 1022 for causing this relay to operate its remaining contacts through their second step. This circuit extends through contacts 1032 and 1043 over the previously traced circuit for operating the first distributor relay 1001 through its second step. At its upper contact 1012, the second distributor relay 1002 prepares a point in the circuit to the train relay 950, and at contact 1052 prepares a point in the circuit to relay 1060, which circuit, however, is only completed in case the train start relay TST is operated. In the same manner as just described the distributor relays operate in succession for each operation of relay 1060 until the distributor relay corresponding to the start relay energized is operated. In this case the relay 1060 is immediately reenergized and short circuits the succeeding distributor relay to prevent its operation in a manner which will be apparent from the following.

Since the first start relay SST has been operated then when first distributor relay 1001 is operated in its second step, relay 1060 is immediately energized over the following circuit: from positive pole of battery by way of contact 1091, contact 1051 and conductors 1029 and 1028, through the winding of relay 1060 to negative battery. The second distributor relay 1002 is prevented from operating at this time because this same positive battery potential continues from conductor 1029 by way of conductor 1027, front contact 1062, contact 1083, conductor 1007, contact 1024, 1023, 1022, and front contact 1021, through the upper winding of the second distributor relay 1002, to positive battery. The upper winding of the second distributor relay 1002 is therefore short circuited, and cannot operate. At 1061 relay 1060 completes the following circuit for operating signal relay 940: positive battery by way of contact 1061, contact 1011, conductor 917, contact 953, and through the winding of signal relay 940 to negative battery.

Signal relay 940, upon energizing over the above circuit, at contact 941 prepares a point in the circuit for the second digit stop polarized relay 980, and at contact 942 partially completes the circuit for the first digit-stop polarized relay 960. At contact 943 relay 940 opens a point in the circuit to the train relay 950 to prevent its operation at this time, and at contact 945 completes a circuit for energizing the start-out relay 760 as follows: from positive battery by way of contact 945, conductor 738, contact 741, and through the winding of start-out relay 760 to negative battery.

In case the dispatcher's station or some other field station is transmitting at this time the circuit to start-out relay 760 cannot be completed because at such a time relay 740 is operated and at contacts 741 has opened the circuit to relay 760. In such a case relay 760 does not operate until after transmission has been completed.

Relay 760, upon operating at contact 762 connects positive battery to the digit-counting relay contacts by way of contact 880, at contact 763 prepares a point in the energizing circuit of outgoing start relay 885, and at contact 764 opens the holding circuit of the pulse-generating relay 790. At contact 765 start-out relay 760 completes a locking circuit for itself from positive battery by way of contact 865, conductor 736, conductor 755, contact 772, and conductor 745. At contact 766 start-out relay 760 connects positive battery to conductor 737 to polarize the lower windings of polar relays 960 and 980, for preparing locking circuits for relays 970, 990, and 930 and for completing the energizing circuit of relay 1070.

Relay 1070, at front contact 1071, connects positive battery to conductors 1016 and 1019 to maintain the first distributor relay in operated position, at 1072 opens the original energizing circuit of relay 1060 now maintained in operated position by the operated signal-start relay SST, and at contact 1073 completes an obvious circuit for relay 1080. Relay 1080 at contact 1083 opens a point in the operating circuit to the distributor relays, and at contact 1082 opens a further point in the original energizing circuit of relay 1060. The operation of relays 1070 and 1080 at this time prevents a second train or signal-start relay, if operated, from interfering with the transmission of the return code.

Pulse-generating relay 790 is similar in operation and mechanical construction to the pulse-generating relay in the dispatcher's coding unit, and will not, therefore, be more fully described, other than to state that this relay energizes and deenergizes over its contacts 798 and 799 to generate impulses by the closure of springs 796 and 797. On the first releasing swing of weighted armature 792, springs 798 and 799 close a circuit through the resistance 794 for reenergizing pulse generating relay 790. At springs 796 and 797 an impulse is transmitted to the outgoing start relay 885 as follows: from positive battery by way of contact 864, conductor 718, pulse-generating springs 796 and 797, back contact 752, contact 763, conductor 727, and through the winding of outgoing start relay 885 to negative battery. Outgoing start relay 885, upon energizing, at contact 883 opens a point in the circuit to relay 700 to prevent its energization at this time, and at contact 884 prepares the counting circuit from the impulse generating springs 796 and 797 for the digit-counting relays 801 to 896, inclusive. At contact 886 relay 885 prepares a circuit for relay 750, which relay at this time, however, is short circuited as follows: positive battery by way of 865, 736, 755, 771, 748, winding of relay 750, 739, contact 886, conductor 727, to positive battery by way of the pulse-generating springs 796 and 797 over a circuit previously traced for energizing relay 885.

On the energizing swing of weighted armature 792, relay 790 at contacts 798 and 799 opens its own circuit, and at the pulse-generating springs 796 and 797 removes the short circuit from around relay 750, whereupon relay 750 is now energized in series with the outgoing start relay 885 over the following circuit: from positive battery by way of 865, 736, 755, 771, 748, winding of relay 750, 739, 886, through the winding of outgoing start relay 885 to negative pole of battery. Relay 750, upon energizing, at contact 751 opens the trunk line circuit extending to the more distant field stations and bridges the resistance 706 across the conductors 705 and 507. At back contact 752 relay 750 opens the original energizing circuit of relay 885 which is now held in operated position in series with relay 750, and at front contact 752 prepares a point in the pulsing circuit to the pulsing relay 780.

On the releasing swing of weighted armature 792 contacts 798 and 799 of the pulse-generating relay 790 recloses its own operating circuit and at the pulse-generating contacts 796 and 797 completes a circuit for energizing the pulsing relay 780. This circuit may be traced as follows: from positive battery by way of 864, 718, 796, 797, 752, 719, 873, 898, 895, 962, 982, 894, 717, and through the winding of pulsing relay 780 to negative battery. Pulsing relay 780, upon energizing, at contact 781 opens the loop circuit extending over conductors 507 and 508 to the dispatcher's station to transmit the first pulse of the return code. This first pulse transmitted by the field station is a short pulse of ordinary duration and therefore relay 703 momentarily deenergizes but does not remain in deenergized position a sufficient length of time to cause the deenergization of slow-to-release start-in relay 770 before the pulsing relay deenergizes and line relay 703 reenergizes. At contact 782 relay 780 closes the circuit for operating pulse-repeating relay 700.

Relay 700, upon energizing, at contact 701 prepares a point in the circuit to the upper winding of the first digit-counting relay 801, but this relay is prevented from operating at this time because its upper winding is short-circuited as follows: from positive battery through the upper winding of digit-counting relay 801, back contacts 831, 832, 833, 834, 835, and 836, 847, 864, 874, 726, 701, and 702 to positive battery. At contact 702 relay 700 operates relay 710, which relay at contact 712 causes the operation of relay 720. Relay 720, upon energizing, at contact 721 operates relay 730, at contact 722 prepares the locking circuit for counting relays 801 to 806, inclusive, and at contact 723 provides a new holding circuit for relays 750, 760, and 785. Relay 730, upon energizing, at contact 732 operates relay 740, and at contact 733 energizes the polarizing lower winding of the third digit-stop relay 878. Relay 740, upon operating, at contact 741 opens the original energizing circuit of start-out relay 760, which relay is now held in operated position over its previously traced locking circuit.

In all of the intermediate field stations between this particular field station which is transmitting and the dispatcher's station, the line relays, such as line relay 703, deenergize to cause the operation of their pulse repeating relays, corresponding to relay 700, over circuits corresponding to the following: back contact 704, conductor 724, contact 883, and conductors 725 and 745. In all these intermediate field stations, the chain of slow-to-release relays, corresponding to relays 710, 720, 730, and 740, now energize. The last of these relays in each intermediate field station opens the circuit to the start-out relay, such as relay 760, at contacts, such as contacts 741, to prevent any one of these intermediate field stations from interfering with the transmission of the return code now being transmitted.

In response to the energizing swing of armature 792 of pulse-generating relay 790, springs 798 and 799 again open the circuit of this relay, and at the pulse-generating springs 796 and 797 the circuit to pulsing relay 780 is opened, with the result that the latter relay now deenergizes to terminate the first pulse of the first digit of the return code being transmitted to the dispatcher's station. Pulsing relay 780, upon deenergizing, at contact 781 recloses the loop circuit to the dispatcher's station and reenergizes line relay 703 before the slow-to-release relay 770 has had sufficient time to restore its contacts. At contact 782 relay 780 opens the short circuit around the upper winding of the first digit-counting relay 801, whereupon this latter relay now energizes in series with relay 700 to close only its "X" contact 841. This circuit may be traced as follows: from positive battery through the upper winding of digit-counting relay 801 and thence over the previously traced short-circuit to contact 701 and thence by way of conductor 745 to the winding of relay 700 to negative battery. In response to the closure of its "X" contacts 841 relay 801 closes a circuit through its lower winding for fully operating its remaining contacts. This circuit may be traced as follows: from positive battery by way of front contact 773, 754, 722, 735, 881, 867, 852, "X" contact 841, and through the lower winding of relay 801 to negative battery. Digit-counting relay 801, upon fully operating, at contact 821 connects positive potential at back contact 880 to conductor 1 of cable 800 in order to search for the first digit-stop relay in case its circuit has been prepared. At back contact 831 relay 801 opens the circuit to relay 700 which very quickly deenergizes and at contact 701 opens the circuit to the second counting relay 802 before this latter relay can operate. Relay 700, upon deenergizing, at contact 702 opens the circuit to relay 710, which, however, does not deenergize to restore its contacts during the pulsing period. As will be noted, the operations just described for operating the digit-counting relays, the pulsing relays, and the pulse-repeating relays are practically identical with that described in connection with the dispatcher's coding unit, and therefore from here on only a brief description will be necessary to explain the operation of these digit-counting relays.

Pulse-generating relay 790, upon releasing its weighted armature, at springs 796 and 797 again causes the operation of pulsing relay 780, which again operates to transmit the second pulse of the first digit at contact 781, and at contact 782 reoperates relay 700. Relay 700, at contact 702, recloses the circuit to relay 710 before the same can release its contacts, thereby maintaining this relay in operated position. At contact 701 relay 700 closes a short-circuit around the upper winding of the second digit-counting relay 802 over a circuit apparent from the foregoing description. When pulse-generating relay 790 again energizes contacts 796 and 797 open the circuit to pulsing relay 780 which accordingly deenergizes and at contact 781 terminates the second pulse of the first digit. At contact 782 the short circuit around the upper winding of the second digit-counting relay 802 is removed with the result that relay 802 now energizes in its first step in series with relay 700 to close only its "X" contact 842. The closure of the "X" contact 842 of relay 802 completes a circuit through the lower winding of relay 802 to cause this relay to operate through its second step and operate its remaining contacts. This latter circuit is similar to that previously traced through the lower winding of relay 801 and in this case includes the contacts 853. At contact 822 relay 802 prepares a point in the circuit for the first digit-stop relay 960, at back contact 832 opens the circuit to fast relay 700, at front contact 832 prepares the circuit for the third counting relay 803, and at contact 852 opens the circuit of the first counting relay 801 to cause this relay to deenergize. Relay 700 very quickly restores its contact 701, thereby opening the circuit to the third counting relay 803 before this latter relay can operate. When counting relay 801 deenergizes the following circuit is completed for energizing the first digit-stop relay 960: from positive battery by way of back contact 880, conductor 716, front contact 762, conductor 715, back contacts 826 and 822, front contact 822, conductor 2 of cable 800, cross-connecting conductor 923, back contact 911, contacts 932 and 972, and through the upper operating winding of the first digit polarized stop-relay 960 to negative battery. The flow of current in the upper winding of this polarized relay is in the proper direction to operate this relay. After being operated, polar relay 960 maintains its contacts in operated position as long as the lower polarizing winding is energized. At contact 961 relay 960 prepares points in the circuit for relay 970, and at contact 962 opens the pulsing circuit to pulsing relay 780. At contact 962 relay 960 prepares circuits through the lower windings of the space-counting relays 811 and 812, and completes a circuit for energizing the transfer relay 876 as follows: from positive battery by way of 975, 963, 896, 892, and through the winding of transfer relay 876, to negative battery.

Transfer relay 876, upon energizing, at contacts 873 transfers the pulsing circuit from pulsing relay 780 directly to pulse-repeating relay 700, and at contact 874 transfers the pulse-counting circuit from the digit-counting relays 801 to 806, inclusive, to the space-counting relays 811 and 812. On the next release of weighted armature 792 relay 790 at springs 796 and 797 operates relay 700 over the following circuit: from positive battery by way of 864, 718, 798, 797, 752, front contact 873, 724, 745, and through the winding of relay 700 to negative battery. At contact 702 relay 700 maintains relay 710 in operated position, and at contact 701 prepares a circuit for the first space-counting relay 811, but this latter relay is short-circuited as follows: from positive battery through the upper winding of relay 811, back contacts 861 and 862, front contact 874, conductor 726, contact 701, conductor 725, front contact 873, conductor 719, front contact 752, pulse-generating springs 797 and 796, conductor 718, and contact 864 to positive battery.

When pulse-generating relay reoperates its weighted armature springs 796 and 797 are opened to remove the short-circuit from around the upper winding of relay 811, with the result that this relay now energizes in series with relay 700 to close only its "X" contact 871. The closure of contact X871 completes a circuit through the lower winding of relay 811 to cause this relay to operate its remaining contacts. This circuit may be traced as follows: from positive battery by way of 975, 963, 896, 882, X871, and through the lower winding of relay 811 to negative battery. At back contact 861 relay 811, upon operating through its second step, opens the circuit to relay 700 and at front contact 861 prepares the circuit for relay 812. At contact 881 relay 811 opens the holding circuit through the lower winding of the operated digit-counting relay to cause, in this case, digit-counting relay 802 to deenergize. Relay 700 very quickly deenergizes, and at contact 701 opens the circuit to the second space-counting relay 812 before this latter relay can operate.

Pulse-generating relay 790, upon the next closure of springs 796 and 797, causes the reenergization of relay 700. At contact 701 relay 700 prepares a circuit for the upper winding of counting relay 812, but this relay does not energize at this time because its upper winding is short-circuited through the pulse-generating springs 796 and 797. On the next energizing swing of the weighted armature 792 pulse-generating relay 790, at springs 796 and 797, opens the short-circuit around the upper winding of relay 812, whereupon this latter relay energizes in series with relay 700 to close only its "X" contact 872. This circuit is similar to that previously traced over relay 811 and includes the front contact 861. The closure of "X" contact 872 by relay 812 completes the circuit for energizing the lower winding of this relay, whereupon this relay is further energized to operate its remaining contacts. This circuit extends from positive battery by way of 975, 963, 896, "X" contact 872, and the lower winding of relay 812 to negative battery. At contact 858 relay 812 prepares a new pulsing circuit to pulsing relay 780, which is effective if relay 970 is not operated before the next pulse is generated by relay 790. At contact 862 relay 812 opens the circuit to relay 700, at contact 882 opens the circuit of relay 811 which deenergizes, at contact 892 opens the circuit of transfer relay 876 which likewise deenergizes, and at contact 859 completes the circuit for energizing relay 970 as follows: from positive battery by way of 859, 893, 961, normally closed springs controlled by contact 973, and through the winding of relay 970 to negative battery.

At contact 971 relay 970 prepares a point in the energizing circuit for the second digit polarized stop-relay 980, at contact 972 opens the operating circuit of polar relay 960 which, however, is now maintained in operated position through its lower polarized winding alone, at contact 973 completes a locking circuit for itself to conductor 737, at contact 974 reconnects conductors 894 and 895 to provide a pulsing circuit for relay 780, and at contact 975 opens the circuit of counting relay 812, which accordingly deenergizes.

Transfer relay 876, upon deenergizing, at contact 873 transfers the pulsing circuit from relay 700 to relay 780, and at contact 874 transfers the pulse-counting circuit from relays 811 and 812 to the digit counting relays 801 to 806, inclusive. Relay 812, upon deenergizing, at contact 880 connects positive battery to the contacts of the digit-counting relays, and at contact 858 opens the temporary closed pulsing circuit to relay 780. These last contacts were provided to complete a pulsing circuit for relay 780 in case the next pulse from relay 790 should be transmitted before relay 970 was operated. On the next releasing swing of weighted armature 792 relay 790 at contacts 796 and 797 completes the circuit for operating pulsing relay 780 over either contacts 858 or 974, dependent upon the speed of operation of relays 970, 812, and 790. This circuit may be traced as follows: from positive battery by way of contacts 864, 718, 796, 797, front contact 752, 719, back contact 873, conductor 898, and thence by way of contact 585 and conductor 717 or by way of conductor 895, 974, 982, 894, conductor 717, and the winding of pulsing relay 780 to negative battery.

Relay 780 at contact 781 transmits the first pulse of the second digit. Since relay 780 has been in deenergized position for two complete operations of the pulse generating relay 790 there is a pause between the first and second digits which is equal to the time of two pulse periods. At contact 782 relay 780 completes the circuit for energizing relay 700. Relay 700 at contact 702 maintains slow-to-release relay 710 in energized position, and at contact 701 prepares the circuit for the first digit-counting relay 801, but this relay is short-circuited as previously described. On the next energizing swing of weighted armature 792 the circuit to relay 780 is opened at contacts 796 and 797, whereupon the pulsing relay deenergizes and at contact 781 terminates the first pulse of the second digit. At contact 782 relay 780 removes the short circuit from around the upper winding of digit-counting relay 801, whereupon this relay operates in its first and then in its second step and causes the release of relay 700 as previously described.

Pulse-generating relay 790 continues to generate pulses in the same manner as previously described, operating relay 780, which in turn operates relay 700 and the digit-counting relays. Digit-counting relays 801 to 805 operate in succession, one for each impulse, the last operated relay opening the circuit of the preceding relay until relay 805 operates and opens the circuit of relay 804, which then deenergizes and completes the circuit for the second digit-stop polarized relay 980 as follows: from positive battery by way of 880, 716, 762, 715, 826, 821, 822, 823, 824, 825, conductor 5 of cable 800, cross-connecting conductor 924, back contacts 921, 941, 971, 999, 909, and through the upper operating winding of the second digit-polarized stop relay 980 to negative battery. Polar relay 980 operates and at contacts 981 prepares a circuit for relay 990. At contact 982 relay 980 opens the previously traced pulsing circuit to pulsing relay 780, and at contact 983 completes the circuit for operating the transfer relay 876 by way of conductor 896. Transfer relay 876, upon energizing, at contact 873 again transfers the pulsing circuit from relay 780 directly to relay 700, and at contact 874 again transfers the pulse-counting circuit from the digit-counting relays to the space-counting relays.

Since the second digit-stop relay 980 opens the pulsing circuit to pulsing relay 780 at this time, five pulses have been sent for the second digit, and relays 790 and 700 now cooperate with the space-counting relays 811 and 812 to separate the second and third digits as previously described. Pulse-generating relay 790 operates twice causing two operations of relay 700 and the operation of relay 811 for the first deenergization of relay 790 and the operation of relay 812 for the second deenergization of relay 790. Counting relay 811, upon energizing, at contact 881 opens the locking circuit of the operated digit-counting relay 805, which accordingly deenergizes. Relay 812, upon energizing, at contacts 880 prepares a circuit through the upper operating winding of the third digit-stop relay 878, at contact 858 prepares a new pulsing circuit for relay 780, at contact 862 opens the circuit of relay 700, at contact 882 opens the circuit of relay 811, at contact 892 opens the circuit of the transfer relay 876 which accordingly deenergizes, and at contact 859 completes the circuit for operating the connecting relay 990. Relay 812 is maintained in operated position after transmission of the second digit as long as the second digit-stop relay 980 is operated.

The circuit for operating connecting relay 990 may be traced as follows: from positive battery by way of 859, 893, 981, 944, and through the winding of relay 990 to negative battery. Relay 990 at its upper contacts 991 to 998, inclusive, connects the conductors R1 to R8, inclusive, of release cable RC to conductors 1 to 8, respectively, of cable 800 in order for the digit-counting relays to find the conductor marked by the operation of relays 9C and 9D. The marked conductor determines the number of pulses in the third digit. At contact 999 relay 990 opens a point in the operating circuit of relay 980 which, however, is now held in energized position through its lower polarizing winding alone, and at the same time removes the marking condition from cross-connecting conductor 924. At contact 913 relay 990 completes a locking circuit for itself by way of conductor 737, and at contact 914 connects conductor 894 to conductor 895. The release of transfer relay 876 again transfers the pulsing circuit from relay 700 to 780 and again connects up the digit-counting relays.

On the next deenergization of pulse-generating relay 790, pulsing relay 780 is reenergized over the previously traced circuit. At contact 781 relay 780 transmits the first pulse of the third digit, and at contact 782 operates relay 700. Relay 700 again at contact 701 completes the short circuit around the upper winding of the first digit-counting relay 801. Pulse-generating relay 790, upon operating, at contacts 796 and 797 again opens the circuit to pulsing relay 780, which at contact 781 terminates the first pulse of the digit. At contact 782 relay 780 removes the short circuit from around the upper winding of the first digit-counting relay 801, whereupon this latter relay operates in the same manner as previously described to cause the deenergization of relay 700. Pulse-generating relay 790, pulsing relay 780, and pulse-repeating relay 700 interact in the same manner as previously described to cause the operation of the digit-counting relays. Relays 801, 802, 803, 804, 805, and 806 operate in succession for the first six pulses, one for each impulse. Relays 802 to 806 each opens up the holding circuit of the immediately preceding relay to cause the deenergization of these relays. Since in this case the number of impulses to be transmitted is greater than six, then the digit-counting relays will be operated in a further cycle for additional impulses over six. This arrangement is similar to that previously described for the digit-counting relays in Fig. 6. When digit-counting relay 806 energizes, said relay at contact 826 connects the third digit-stop relay 878 to the number 6 conductor of cable 800. At back contact 836 relay 806 opens the circuit of relay 700 which quickly deenergizes and at front contact 836 prepares a new circuit for operating digit-counting relay 801 in response to the seventh impulse. At contact 856 relay 806 opens the circuit of relay 805 which accordingly deenergizes, and at contact 857 provides a new holding circuit for digit-counting relay 801 in case the same is operated in response to the seventh impulse.

In response to the seventh pulse transmitted to the digit-counting relays, relay 801 is operated by way of the front contact 836 and conductor 848. Relay 801 is now maintained energized from positive potential connected to conductor 867, and thence by way of 857, 850, and "X" contact 841. At contact 851 relay 801 prepares a new holding circuit for digit-counting relay 805 in case this relay is subsequently energized.

In case of fault, such as the failure of the digit-counting relays failing to find a marked conductor, the pulses continue to operate the digit-counting relays until relay 805 is operated. Relay 805 is accordingly operated in response to the eleventh pulse and at front contact 840 completes the circuit for operating the RLSE-STOP relay 874 by way of conductor 838. Relay 874, upon operating, at 869 completes a circuit through the upper operating winding of third digit stop relay 878 and conductor 868 for operating relay 878. Relay 878 causes the release of the field station coding unit in a manner to be apparent from the following description.

In case the coding apparatus operates properly, the circuit for energizing the third digit stop relay 878 is completed in response to the operation of relay 801 and may be traced as follows: from positive battery through the upper operating winding of relay 878, front contact 880, 716, 762, 715, front contacts 826, 837, front contact 827, back contacts 828, 829, 830, and 840, conductor 7 of cable 800, conductor 957, contact 997, to conductor R7 of Fig. 11, through contacts 1116 and 1106, through the resistance associated with relay 9C to negative battery. The third digit stop relay 878 after operation is maintained in operated position by positive battery potential connected to conductor 734 through its lower polarizing winding alone. At contact 863 relay 878 completes a short circuit around the winding of relay 9C, at contact 864 opens the pulsing circuit extending to the pulse-generating springs 796 and 797 to prevent further impulses being transmitted by the pulse-generating relay 790, and at contact 865 disconnects one of the positive battery potential connections to conductor 755.

Relay 9C is short circuited over the following path: from positive battery by way of contact 761, conductor 714, contact 863, and thence by way of conductor 715 through the contacts of the digit-counting relays to conductors R7 of cable RC as previously traced, and by way of contacts 1116, 1106, conductor 1121, through the winding of relay 9C, conductor 1120, front contact 1105, conductor 1119, to positive battery at either contacts 1109 or 1112. Relay 9C releases on account of the above-traced short circuit and at contact 1104 opens the original energizing circuit of relay 9R which relay, however, is maintained in operated position over its locking circuit, at contact 1106 removes the marking condition from conductor R7, and at contact 1107 disconnects positive battery from start conductor L1 to cause the deenergization of signal-start relay SST in Fig. 10.

Signal-start relay SST, upon deenergizing, at contact 1091 opens the circuit of relay 1060 which accordingly deenergizes. At contact 1061 relay 1060 opens the circuit to signal relay 940. Signal relay 940 deenergizes after an interval, and at contact 945 disconnects positive battery from conductor 738.

Returning now to the time when the third digit stop polarized relay 878 opened the pulsing circuit to prevent further operations of relays 780 and 700. These relays, therefore, are not again energized, and a predetermined time after relay 700 is deenergized slow-to-release relay 710 releases its contacts. At contact 712 relay 710 opens the circuit to slow-to-release relay 720, which accordingly releases its contacts after a predetermined time interval. At contact 721 relay 720, upon deenergizing, opens the circuit of relay 730, and at contact 722 opens the holding circuit to release any of the operated digit-counting relays. At contact 723 relay 720 opens the locking circuit of relays 750, 760, and 885 to cause the deenergization of these relays. At contact 751 relay 750, upon deenergizing, disconnects the resistance 706 from in bridge of the conductors 507 and 705, and again connects up the more distant field stations over conductors 507 and 707. Relay 760, upon deenergizing, at contact 761 disconnects positive battery from conductor 714 over which the relay 9C was short circuited, at contact 764 closes the circuit for holding pulse-generating relay 790 in energized position, and at contact 766 disconnects positive battery from conductor 737 to open the holding circuit of relays 960 and 980 and the locking circuit of relays 970 and 990. Slow-to-release relay 730 releases after an interval, and at contact 732 opens the circuit to relay 740, and at contact 733 opens the circuit through the polarizing winding of relay 878 to cause the latter relay to deenergize. Relays 960, 970, 980, 990, and 1070 release when positive battery is disconnected from conductor 737 by the deenergization of relay 760. At contact 983 relay 980 opens the circuit to counting relay 812 which accordingly deenergizes. Relay 990, at its upper contacts 991 and 998 disconnects the conductors of cable RC from cable 800. Relay 1070, upon deenergizing, at contact 1073 opens the circuit to relay 1080 which releases after an interval. All of the relays and apparatus at the field station except relays 9R and 9D, and certain relays in the track-interlock system are now restored to normal. From the foregoing description it will be seen that in response to the operation of track-interlock relay 9HP by the dispatcher the signal 9MS has been changed from red to green and that the field station has transmitted a return code by way of conductors 507 and 508 to the dispatcher's station which is indicative of the lighting of the green lamp 9MS at the field station.

The impulses transmitted from the field station over conductors 507 and 508 cause the dispatcher's line relay 503, Fig. 5, to deenergize for each pulse received. Since the field station has transmitted the return code comprising digits 2, 5, and 7, line relay 503 is deenergized twice for its first digit, after which it is held energized for a predetermined time, then deenergized five times for the second digit, and after another time interval is deenergized seven times for the third digit.

In response to the first deenergization of relay 503 for the first pulse of the first digit relay 503 at contact 504 completes the circuit for operating relay 440 as follows: from positive battery by way of contacts 562, 504, 426, back contact 411, and through the winding of relay 440 to negative battery. Relay 440, at contact 441, completes an obvious circuit for energizing relay 430, and at contact 442 completes the circuit for energizing relay 500 as follows: from positive battery by way of contact 442, conductor 429, and through the winding of relay 500 to negative battery. Relay 430, upon energizing, at contact 431 completes an obvious circuit for energizing relay 420, and at contact 432 completes the circuit for energizing relay 510 as follows: from positive battery by way of contact 432, conductor 419, and through the winding of relay 510 to negative battery. At contact 502 relay 500 completes a circuit for relay 510 and at contact 501 closes a short-circuit around the upper winding of the first digit-counting relay 601 as follows: from positive battery through the upper winding of relay 601, back contacts 631, 633, 634, 635, and 636, conductor 647, back contact 675, conductor 514, contact 501, conductor 429, to positive battery at contact 442. Relay 420, upon energizing, at contact 421 prepares a point in the circuit for operating relay 410 through contacts on the digit-counting relays and conductor 482 of cable 80. At contact 422 relay 420 connects the winding of relay 410 to the cross-connecting conductor 423 and conductor 482 of cable 80.

Relay 510, upon energizing, at contact 511 completes a circuit for operating relay 530, and the latter relay at contact 532 completes the circuit for operating relay 520. At contact 533 relay 530 completes the circuit for operating relay 540. Relay 540 at contact 542 connects positive battery to conductors 456 and 398 to provide the holding and locking circuits for the code-marking relays of Fig. 4, and to energize relay 360 of Fig. 3. At contact 543 relay 540 connects positive battery to conductor 527 to provide a holding circuit for the digit-counting relays. Relay 520, at contact 521, prepares a locking circuit for relay 410, and at contact 522 opens a point in the circuit to relay 560 to prevent its operation during this call. Relay 360 is energized over the following circuit in response to the operation of relay 540: from positive battery by way of 542, 456, 398, and relay 360 to negative battery. At contact 362 relay 360 opens the circuit to relay 370 to prevent its operation, and at contact 363 completes the circuit for operating relay 350. Relay 350 at contact 353 opens a point in the operating circuit of the first distributor relay 380, and at contacts 351 and 352 opens the circuit to relays 370 and 380 and 390 to prevent their operation in case one or more of the start relays such as 340 or 340' should be subsequently operated. The operation of relays 350 and 360 at this time, therefore, busies this equipment so that even if any of the start relays are subsequently operated these relays cannot interfere until the complete code has been transmitted and the coding quipment released.

At the termination of the first transmitted pulse relay 503 energizes and at contact 504 opens the circuit to relay 440 which accordingly deenergizes. At contact 441 relay 440 momentarily opens the circuit to slow-to-release relay 430, and at contact 442 removes the short circuit from around the upper winding of digit-counting relay 601, whereupon the latter relay energizes in series with relay 500 to close only its "X" contact 641 as follows: from positive battery through the upper winding of relay 601 and thence over the back contacts previously traced for the short-circuit of this winding to contact 501 and thence through the winding of relay 500 to negative battery. In response to the closure of "X" contacts 641 relay 601 is energized in its second step to operate its remaining contacts as follows: from positive battery by way of 543, 527, 681, 667, 652, X641, and through the lower winding of relay 601 to negative battery. At contact 621 prepares a circuit over conductor 481, at back contact 631 opens the circuit to relay 500, and at front contact 631 prepares the circuit for the second digit-counting relay 602. Relay 500 very quickly deenergizes when its circuit is opened at back contact 631, and at contact 501 opens the circuit through the second digit-counting relay 602 before this latter relay can operate.

In response to the second pulse of the first digit relay 503 deenergizes and at contact 504 again completes the circuit for energizing relay 440. Relay 440 at contact 441 again completes the circuit for slow-to-release relay 430 before this latter relay has had time to release its contacts, and at contact 442 again causes the energization of relay 500. Relay 500 at contact 501 closes a short circuit around the upper winding of the second digit-counting relay 602. On the termination of the second pulse of the first digit line relay 503 energizes, and at contact 504 opens the circuit of relay 440, which accordingly deenergizes. Relay 440, at contact 440, again opens the circuit to slow-to-release relay 430, and at contact 442 removes the short circuit from around the upper winding of relay 602. In a manner similar to that previously described the second digit-counting relay 602 energizes in series with relay 500 in its first step, and in its second step operation opens the circuit to relay 500, which accordingly deenergizes.

Since there is only two impulses in the first digit of this return code, line relay 503 is now held in energized position and relay 440 is maintained deenergized for a predetermined time. This predetermined time is of sufficient duration to cause the release of slow-to-release relay 430. Relay 430, upon deenergizing, at front contact 431 opens the circuit to slow-to-release relay 420, and at back contact 431 completes a circuit for operating relay 410 as follows: from positive battery by way of back contact 431, contact 421, conductor 425, back contact 561, conductor 512, back contact 626, back contact 621, from contact 622, conductor 482 in cable 80, cross-connecting conductor 433, contact 422, conductor 424, and through the winding of relay 410 to negative battery. Relay 410, upon energizing, at contact 411 transfers the pulsing circuit from relay 440 to the vertical magnet VM of the vertical and rotary step-by-step switch. At contact 412 relay 410 prepares a point in the circuit to the release magnet 400 of the step-by-step switch, and at contact 413 completes a locking circuit for itself as follows: from positive battery by way of contact 521, conductor 428, contact 413, and through the winding of relay 410 to negative battery. Slow-to-release relay 420 deenergizes shortly after relay 430, and at contact 421 opens the previously traced circuit through the contacts of the digit-counting relays, and at contact 422 opens a point in the original energizing circuit of relay 410 which is now held in operated position over its locking circuit. From the foregoing, it will be seen that in response to the first digit transmitted from the field station relay 410, which is cross-connected to conductor 482, is operated to transfer the remaining pulses to the vertical and rotary switch at the dispatcher's station.

In response to the first impulse of the second digit line relay 503 deenergizes and at contact 504 completes a circuit for operating the vertical series relay VS and the vertical magnet VM of the vertical and rotary switch as follows: from positive battery by way of contact 562, contact 504, conductor 426, front contact 411, conductor 414, normally closed springs controlled by vertical off-normal contact 408, conductor 415, conductor 416, through the winding of the vertical series relay VS and the winding of vertical magnet VM to negative battery. Vertical series relay VS, upon energizing, at back contact 405 opens a point in the circuit through the rotary magnet of the switch, at front contact 405 prepares a new circuit for itself and vertical magnet VM, and at contact 406 opens a point in the circuit to the release magnet 400. At contact 407 vertical series relay VS connects positive battery to conductor 419 to maintain slow-to-release relay 510 in operated position.

The vertical magnet VM, upon operating, steps its shaft and wiper 402 one vertical step in the well known manner opposite the first level of bank contacts. On the first vertical step of the shaft and wiper 402 the vertical off-normal springs 403 and 408 are operated. Vertical off-normal springs 403 prepare a point in the circuit to release magnet 400, and vertical off-normal contact 409 completes a new circuit for the vertical series relay and vertical magnet before the normally closed springs controlled by contact 408 is opened. The new circuit for vertical series relay VS and vertical magnet VM may be traced as follows: from positive battery, contact 562, contact 504, conductor 426, front contact 411, conductor 414, off-normal contact 409, conductor 417, front contact 405, conductor 416, and through the windings of the vertical series relay and the vertical magnet to negative battery.

At the end of the first pulse of the second digit line relay 503 reenergizes and opens the previously traced circuit to the vertical series relay VS and vertical magnet VM. Line relay 503 deenergizes in response to the second pulse, and at contact 504 recloses the circuit to operate the vertical series relay VS and the vertical magnet VM over the previously traced circuit. The vertical series relay VS is of the slow-to-release type and therefore holds its contacts in operated position during the pulsing period. In response to the second operation of the vertical magnet VM the shaft and wiper 402 is operated in its second step to position wiper 402 opposite the second level of bank contacts. In the same manner as just described, vertical magnet VM operates the wipers opposite the fifth level of bank contacts in response to the five pulses in the second digit transmitted from the field station. The vertical series relay VS is held in operated position during the impulsing period but now deenergizes before the third digit is received. Relay VS, upon deenergizing, at contact 405 transfers the pulsing circuit from itself and vertical magnet VM to the rotary series relay RS and rotary magnet RM. At contact 406 relay VS prepares a further point in the circuit to the release magnet 400 of the switch and at contact 407 momentarily opens the circuit through relay 510.

In response to the first impulse of the third digit transmitted from the field station line relay 503 deenergizes and at contact 504 operates the rotary series relay RS and the rotary magnet RM over the following circuit: from positive battery by way of contacts 562, 504, conductor 426, front contact 411, conductor 414, contact 409, conductor 417, back contact 405, and through the windings of the rotary series relay RS and rotary magnet RM to negative battery. Rotary series relay RS, upon energizing, at front contact 404 connects positive battery to conductor 419 to maintain slow-to-release relay 510 in energized position, and at back contact thereof disconnects positive battery from wiper 402. Rotary magnet RM, upon operating, rotates the shaft and wiper 402 one step into engagement with bank contact 51 in the fifth level in the well known manner. At the end of the first pulse of the third digit line relay 503 reenergizes and at contact 504 opens a circuit to the rotary series relay RS and rotary magnet RM, but the rotary series relay RS being of the slow-to-release type is held in operated position during the pulsing period. In the same manner as just described, the remaining impulses of the third digit operate the rotary magnet to step wiper 402 into engagement with the seventh bank contact 57 in the fifth level, since this third digit includes seven impulses.

Shortly after the termination of the last pulse of the third digit rotary series relay RS deenergizes. At front contact 404 relay RS opens the circuit to relay 510, and at back contact thereof connects positive battery to switch wiper 402 thereby completing a circuit for operating relay C9 as follows: from positive battery by way of back contact 404, contact 401, switch wiper 402, the seventh bank contact in the fifth level terminating conductor 57 of cable 50, and thence through the normally closed springs controlled by contact 154, through the winding of relay C9, conductor 177 and associated resistance, to negative battery.

Relay C9, upon energizing, at contact 151 opens a further point in the circuit to the red lamp of signal 9MSL, and at contact 152 lights the green lamp of signal 9MSL as follows: from positive battery via back contact 105, conductor 155, front contact 141, contact 152, back contact 165, and through the filament of the green lamp of signal 9MSL to negative battery. At contact 153 relay C9 maintains the circuit of relay A9 and at contact 154 closes its own locking circuit. The lighting of the green lamp of signal 9MSL now indicates to the dispatcher that the corresponding green light of the track signal 9MS on the semaphore is now set to proceed or green.

Shortly after the rotary series relay RS deenergizes and removes positive battery from conductor 419 slow-to-release relay 510 deenergizes and opens the circuit of relay 530 at contact 511. After an interval slow-to-release relay 530 deenergizes to open the circuit to relay 520 at contact 532, and at contact 533 opens the circuit to relay 540. At contact 531 relay 530 completes a circuit for operating the release magnet 400 of the vertical and rotary switch as follows: from positive battery by way of contact 531, conductor 427, contact 412, conductor 418, contact 406, vertical off-normal contact 403, and through the winding of release magnet 400 to negative battery. Release magnet 400, upon operating, at contact 401 disconnects positive battery from switch wiper 402, and restores the shaft and switch wiper 402 to normal position in the well known manner. Contacts 401 are operated to prevent the connection of positive battery to any of the conductors of cable 50 during the release of the switch wiper. In response to the switch returning to its normal position the off-normal springs 403 are returned to their normal position to open the circuit to the release magnet 400 and the off-normal springs 408 and 409 are restored to their normal position or to the position shown in the drawings.

Relay 540 deenergizes when its circuit is opened by relay 530 and at contact 542 opens the circuit to relay 560 which deenergizes and causes the release of relay 350, thereby rendering the distributor relays available for other calls. At contact 543 relay 540 opens the locking circuit of the operated counting relays. Relay 520 deenergizes shortly after the release of relay 530 and at contact 521 opens the locking circuit of relay 410 which likewise deenergizes. All of the apparatus is now returned to normal at the dispatcher's station excepting key—9, relays A9, B9, D9, and C9, and the distributor and the coding relays, the distributor relays, and the vertical and rotary switch may again be used on other codes.

From the foregoing description it will be seen that in response to the dispatcher operating key—9, a code 257 is transmitted to field station. The red lamp at signal 9MSL at the dispatcher's panel was extinguished when this code had been completely transmitted thereby leaving this signal dark. In response to the first two digits, 2 and 5, field station No. 25 is selected and in response to the third digit, digit 7 in this case, the red lamp of track signal 9MS is extinguished and the green lamp of this track signal is lighted. In response to the operation of relay 9HP at the field station, which changes the semaphore signal from red to green, the field station coding unit is operated to return a code comprising digits 2, 5, and 7 to the dispatcher's station. The first digit selects a particular one of the dispatcher's vertical and rotary switches, and the remaining digits 5 and 7 operate the wiper of this selector switch to a particular bank contact, in this case the seventh bank contact in the fifth level, to cause the green lamp of signal 9MSL at the dispatcher's panel to light. The lighting of this lamp indicates to the dispatcher that the corresponding track signal lamp at the field has been lighted.

Train signalling

Having described how the dispatcher may change the track signal 9MS from stop to proceed position, a description will now be given of the signalling operations which take place in response to a train travelling from left to right over track sections 9 and 8, track switch TS, and track section 6. When the train enters section 9 (Fig. 11), track relay 9T is short circuited and deenergizes to open the circuit to relay 10HP at contact 1165, and at contact 1167 completes a circuit for energizing track signal relay 9F as follows: from positive battery by way of contact 1167, conductor 1140, back contact 1130, conductor 1141, and through the winding of track-signal relay 9F to negative battery. Since track signal 9MS has been set to proceed position by the operation of relay 9HP, it will be remembered that relays 9NP and relay 9S are in deenergized position.

Track-signal relay 9F, upon energizing, at contact 1134 completes a locking circuit for itself by way of conductor 1143, at contact 1135 prepares an operating circuit for track-signal relay 9E, as well as marking conductor T8 of track-indicating cable TIC. At contact 1137 relay 9F completes the circuit for operating the train-start relay TST as follows: from positive battery by way of back contact 1133, conductor 1145, front contact 1137, common start conductor K1, and through the winding of train-start relay TST (Fig. 10) to negative battery. At contact 1096 train-start relay TST completes a circuit from positive battery for energizing relay 1060 over 1035, 1082, 1072, 1026, and 1028. At contact 1092 positive battery is connected to contact 1052 in order to reenergize relay 1060 when the second distributor relay 1002 is operated. At contact 1062 relay 1060, upon energizing, completes the circuit for operating the first distributor relay 1001 as previously described. Relay 1001 closes its "X" contact 1031 and operates through its second step to open the circuit to relay 1060 at contact 1021. Relay 1060 very quickly deenergizes before relay 940 can operate by way of contacts 1061 and 1011, and at contact 1062 closes its original energizing circuit. Relay 1060 again energizes and completes the circuit through the upper winding of the second distributor relay 1002 to cause this latter relay to operate its "X" contact 1032. The closure of "X" contact 1032 by relay 1002 completes a circuit through its lower winding as previously described for causing this relay to operate its remaining contacts. At contact 1022 relay 1002 opens the circuit to relay 1060 which very quickly deenergizes, and at contact 1052 completes a circuit for reenergizing relay 1060 as follows: from positive battery by way of contact 1092, 1052, conductors 1029 and 1028, and through the winding of relay 1060 to negative battery. Relay 1060 energizes over this circuit and at front contact 1062 short-circuits the upper winding of the third distributor relay 1003 to prevent its operation. At contact 1061 relay 1060 now completes the circuit for energizing the train code marking relay 950 as follows: from positive battery by way of contacts 1061 and 1012, conductor 918, contact 943, and through the winding of relay 950 to negative battery.

Relay 950, upon energizing, at contact 951 prepares a point in the operating circuit for the second digit stop relay 980, at contact 952 prepares a point in the circuit for the first digit-stop relay 960 by connecting the cross-connecting conductor 927 connected to conductor 965 to the operating winding of relay 960. At contact 953 relay 950 opens a point in the circuit to relay 940, at contact 954 prepares a point in the circuit to relay 900, and at contact 955 connects positive battery to conductor 738 to complete an energizing circuit by way of contact 741 through the winding of start-out relay 760 to negative battery.

Start-out relay 760, upon operating, at contact 764 opens the circuit to pulse-generating relay 790 to cause it to generate impulses as previously described, at contact 765 completes its own locking circuit, and at contact 766 completes the circuit for operating relay 1070 by connecting positive battery to conductor 737. Relay 1070 energizes and in turn at contact 1073 causes the energization of relay 1080 to prevent any other signal or train-start relay from interfering with this coding operation about to be described.

The operation from here on is the same as that previously described for transmitting a code signal from the field station coding unit with the exception that in this case the code to be transmitted is determined by the operated track-signal relay, in this case relay 9F. Pulse-generating relay 790 is operated in the same manner as previously described to generate pulses after its holding circuit is opened by the operation of the start-out relay 760. Relays 885, 750, 780, 700, 710, 720, 730, 740, and the digit-counting relays are operated as previously described until digit-counting relay 802 operates and completes the circuit for the polar first digit stop relay 960 as previously described. During this operation pulsing relay 780 has been operated twice, to transmit two impulses to the dispatcher's station over conductors 507 and 508. First digit-stop relay 960, upon energizing, at contact 963 operates the transfer relay 876 as before so that the next two operations of the pulse-generating relay 790 causes relay 700 and space-counting relays 811 and 812 to operate to separate the code digits by a certain time interval. Relay 812, upon operating in response to the second operation of pulse-generating relay 790, at contact 859 completes the circuit for operating relay 970, and at contact 892 releases the transfer relay 876 so that the next digit of the code may be transmitted.

Pulse-generating relay 790 operates pulsing relay 780 which in turn operates relay 700 and the digit-counting relays as previously described. When counting relay 806 is operated a circuit is completed for operating the second digit-stop relay 980 as follows: from positive battery by way of back contact 880, conductor 716, front contact 762, conductor 715, front contact 826, conductor 837, back contact 827, conductor 6 of cable 800, conductor 956, conductor 928, contacts 951, 971, 999, and 909, and through the upper operating winding of the second digit polarized stop relay 980 to negative battery. In the same manner as previously described relay 980 at contact 983 reoperates the transfer relay 876 so as to transfer the pulsing circuit to the space-counting relays 811 and 812 which in combination with relay 700 operates to separate the second and third digits. Space-counting relay 812 after this operation is held operated and at contact 859 now completes the circuit for operating connecting relay 900 as follows: from positive battery by way of 859, 893, 931, 929, 946, and through the winding of connecting relay 900 to negative battery. At its upper contacts 901 to 909, inclusive, relay 900 connects the conductors T1 to T8, inclusive, of track-indicating cable TIC to conductors 1 to 8, inclusive, of cable 800 to prepare a circuit for the third digit-stop relay 878 in accordance with the particular track signal relay operated. The deenergization of transfer relay 876 transfers the pulsing circuit back to pulsing relay 780 whereupon the third digit is transmitted over the dispatcher's line in the same manner as previously described. In this case the pulsing relay continues to operate until the third digit-stop relay 878 is energized over the circuit prepared by the operated track-signal relay 9F. Since the operated track-signal relay 9F prepared the circuit for track-signal relay 9E by marking conductor T8 of the track-indicating cable, then the third digit-stop relay 878 is not energized until it is connected to conductor 8 of cable 800 by the second operation of digit-counting relay 802. Since the digit-counting relay 802 was operated in response to the eighth pulse pulsing relay 790 has transmitted eight pulses over the dispatcher's line for the third digit. The circuit for operating the third digit-stop relay 878, upon the second operation of digit-counting relay 802, may be traced as follows: from positive battery through the upper operating winding of third digit-stop relay 878, front contact 899, conductor 716, front contact 762, conductor 715, front contact 826, conductor 837, front contacts 827 and 828 to conductor 8 of cable 800, and thence by way of conductor 958, contact 908, conductor T8 of track-indicating cable TIC, through contact 1135 (Fig. 11), conductor 1142, normally closed contacts controlled by contact 1131, conductor 1139, through the winding of track-signal relay 9E, conductor 1138, and the associated resistance to negative battery. After operation polar-stop relay 878 is maintained in operated position through its lower polarized winding alone, and at contact 863 connects positive battery at contact 761 by way of conductors 714 and 715 to conductor T8 over the circuit just traced for operating track-signal relay 9E. At contact 864 relay 878 again disconnects positive battery from the pulse-generating springs of relay 780 to prevent further generation of impulses in response to further operations of weighted armature 792.

Track-signal relay 9E, upon energizing, at contact 1133 transfers the locking circuit of relay 9F from the normally closed springs controlled by contact 1130 to positive battery now connected to contact 1167. At contact 1131 relay 980 completes an obvious locking circuit for itself, at contact 1132 prepares a point in its own release circuit, and at contact 1133 disconnects positive battery from common start conductor K1 to cause the deenergization of the train-start relay TST. Train-start relay TST deenergizes in response to the operation of track-signal relay 9E and at contact 1092 releases relay 1060. Relay 1060, upon releasing, at contact 1061 releases relay 950.

Returning now to the time when the third digit stop polarized relay 878 opens the pulsing circuit of relay 790, relays 780 and 700 are therefore maintained in deenergized position. A predetermined time after release of relay 700 relays 710, 720, 750, 760, 885, 730, 878, and 740 deenergize as previously described. Relays 960, 970, 980, 900, and 1070 release when positive battery is disconnected from conductor 737 at contact 766 by the deenergization of relay 760. Relay 1080 releases a short interval after the release of relay 1070, and space-counting relay 812 releases after the deenergization of relay 980. All of the apparatus at the field station used in this operation is now back to normal excepting track-signal relays 9E and 9F, which are held in operated position. From the foregoing it will be seen that as a result of a train entering section 9 a code comprising digits 268 has been transmitted from the field station to the dispatcher's station.

In the dispatcher's station and in response to the code comprising digits 268 transmitted thereto from the field station, the apparatus in the dispatcher's station is operated in the same manner as previously described. In response to the first digit 2 relay 410 is operated and in response to the second and third digits 6 and 8 the vertical magnet VM operates the switch to raise wiper 402 opposite the sixth level and the rotary magnet is operated to rotate the wiper into engagement with the eight bank contact in the sixth level. When rotary series relay RS releases after the last series of pulses track-indicating relay 9TIR is operated as follows: from positive battery by way of back contact 404, contact 401, switch wiper 402, the eighth bank contact in the sixth level terminating conductor 68 and thence by way of conductor 68 in cable 60 through the winding of track-indicating relay 9TIR, through the associated resistance to negative battery. Track-indicating relay 9TIR completes a circuit at contact 301 for lighting the train-pilot lamp 9TPL on the dispatcher's panel. At contact 302 relay 9TIR completes an obvious locking circuit for itself and at contact 303 prepares a point in its own release circuit.

The step-by-step switch and relays used in this operation all release, with the exception of the track-indicating relay 9TIR, in the same manner as previously described. From the foregoing it will be seen that a train entering track section 9 causes the code 268 to be transmitted from the field station to the dispatcher's station to light the corresponding track-pilot lamp 9TPL on the dispatcher's panel to indicate to the dispatcher that a train is in section 9.

Since the green lamp of the main track signal 9MS is lighted the train proceeds into track section 8 thereby short circuiting track relay 8T to cause this relay to deenergize. At contact 1287 track relay 8T opens the locking circuit of relay 8TS which accordingly deenergizes since the relay 9S is also in released position. At contacts 1289 track relay 8T completes a circuit for operating track signal relay 8F as follows: from positive battery, contact 1289, conductor 1240, back contact 1230, conductor 1241, and through the winding of track signal relay 8F to negative battery. Relay 8TS deenergizes when its locking circuit is opened by track relay 8T and at contact 1272 opens the previously traced circuit to relay 9HP and opens further points in the circuit of relays HWR, 6HP, and 7HP, to prevent their operations at this time.

The track-signal relays provided for each section of track are practically identical and operate in the same manner as previously described for the track-signal relays associated with track section 9. Track-signal relay 8F at contact 1234 completes a locking circuit for itself, at contact 1235 prepares a circuit for relay 8E and marks conductor T2, and at contact 1237 connects positive battery by way of back contact 1233 and conductors 1245 and 1246 to common start conductor K1 to operate the train-start relay TST. Train-start relay TST, upon energizing, at contacts 1096 and 1092 causes the operation of the distributing-unit relays 1060, 1001, and 1002 as previously described to cause the operation of train relay 950 in the code marking relay group. Relay 950, upon energizing, at contact 955 causes the operation of start-out relay 760 to cause the field station coding-unit relays to operate in the same manner as previously described and transmit a code in accordance with the track-signal relay just operated or, in this case the code comprising digits 262. The first two digits, 2 and 6, are transmitted in the same manner as previously described and cause the operation of digit-stop relays 960 and 980, and the third digit is terminated after the second pulse since the third digit-stop relay 878 is energized in series with relay 8E as a result of the operation of digit-counting relay 802 on its first operation. This circuit may be traced as follows: from positive battery through the upper operating winding of the third digit-stop relay 878 and over the previously traced circuit to back contact 826 and 821 and thence over front contact 822 to conductor 2 of cable 800, which at this time is connected to conductor T2 of track-indicating cable TIC by closed contact 902 of relay 900, contacts 1235, conductors 1242 and 1239, through the winding of relay 8E, conductor 1238 and associated resistance to negative battery. Track-signal relay 8E is fully operated when the third digit-stop relay 878 connects positive battery to conductor 715 at contact 863.

Shortly after track-relay 8T deenergizes and track-signal relay 8F is operated, slow-to-release relay 9HP deenergizes. At front contact 1157 relay 9HP extinguishes the green lamp of signal 9MS and at back contact 1157 completes the circuit for lighting the red lamp of signal 9MS to prevent a second train from proceeding into section 8 while a train is in such section. At contact 1158 relay 9HP completes a circuit for energizing relay 9NP as follows: from positive battery by way of back contact 1151, conductor 1196, contacts 1158 and 1153, and through the winding of relay 9NP to negative battery. At contact 1161 relay 9HP completes a short circuit for relay 9D as follows: from positive battery by way of back contact 1164, conductor 1129, back contact 1161, contact 1114, conductor 1126, winding of relay 9D, conductor 1127, and contact 1113 to positive battery. Relay 9NP, upon energizing over the above traced circuit, at contact 1168 completes a circuit for energizing relay 9S as follows: from positive battery by way of contact 1168, conductor 1185, contact 1273, conductor 1186, and through the winding of relay 9S to negative battery. Relay 9S, upon energizing, at contact 1173 completes its own stick circuit and at the remaining contacts prepares circuits to other of the interlocked relays. Relay 9D releases on account of its short circuit and performs no useful function at this time.

When track-signal relay 8E energizes in response to the operation of third digit stop relay 878 said relay at contact 1230 transfers the locking circuit of relay 8F to contact 1289 of track relay 8T, at contact 1231 completes its own locking circuit, at contact 1232 prepares a point in its own release circuit, and at contact 1233 opens the circuit to train-start relay TST which thereupon deenergizes. Train-start relay TST, upon deenergizing, and the operation of the third digit-stop relay 878 causes the release of the field station coding unit and apparatus as previously described.

In the dispatcher's station relay 410 and the vertical and rotary step-by-step switch are operated in the same manner as previously described to cause the switch wiper 402 to engage with the second bank contact in the sixth level in response to the code 262 transmitted from the field station. When the rotary series relay falls back after the last impulse of the third digit in the code track-indicating relay 8TIR is operated over the following circuit: from positive battery by way of back contact 404, contact 401, switch wiper 402 in engagement with the second bank contact in the sixth level terminating conductor 62 of cable 60, and thence through the winding of track-indicating relay 8TIR, and associated resistance to negative battery. At contact 311 track-indicating relay 8TIR completes a circuit for lighting the track-pilot lamp 8TPL corresponding to section 8 on the dispatcher's panel, at contact 312 completes a locking circuit for itself, and at contact 313 prepares a point in its own release circuit. At contact 314 track-indicating relay 8TIR completes the circuit for operating relay 8TR of Fig. 1 as follows: from positive battery, contact 314, conductor 107, through the winding of relay 8TR to negative battery. Relay 8TR upon energizing, at front contact 101 connects positive battery to conductor 108 to maintain the green lamp of signal 7SL, and at front contact 102 in a similar manner connects positive battery to conductor 118 to maintain the red lamp of signal 6SL lighted. At front contact 104 relay 8TR connects positive battery to conductor 148 to maintain the red lamp of signal 9SSL lighted, at back contact 105 extinguishes the previously traced circuit for lighting the green lamp of signal 9MSL, and at front contact 105 connects positive battery to conductor 150 to cause the red lamp of signal 9MSL to light. The red lamp of signal 9MSL is lighted at this time to conform with the corresponding signal in the field. The corresponding signal 9MS is red because of the train in section 8. Shortly after track-indicating relay 8TIR and relay 8TR are operated, the dispatcher's coding apparatus and the stepping switch are released in the same manner as previously described.

When the train leaves track section 9 track relay 9T energizes and at contact 1167 opens the locking circuit of relay 9F, which accordingly deenergizes. At contact 1136 relay 9F prepares a point in the release circuit of relay 9E and likewise marks conductor T7 with battery potential through the resistance associated with conductor 1138. At contact 1137 relay 9F connects positive battery at front contact 1133 to common start conductor K1 to cause the energization of the train-start relay TST. Train-start relay TST, upon energizing, at contacts 1096 and 1092 causes the operation of the distributor unit relays 1060, 1001, and 1002, as previously described. Train relay 950 in the code-marking relay group is energized in response to the operation of relays 1060 and 1002 to cause the field station coding apparatus to operate as previously described and transmit a code comprising digits 2, 6, and 7. The digit 7 is transmitted for the third digit in this case because the track-signal relay 9F has deenergized and marked conductor T7 of cable TIC. The first two digits 2 and 6 are transmitted as previously described and the third digit is terminated after the seventh pulse, since relay 878 is energized over the marked conductor T7 of the track-indicating cable TIC, as the result of the second operation of digit-counting relay 801. The circuit for operating the third digit-stop relay 878 may be traced as follows: from positive battery through the upper operating winding of the third digit-stop relay 878 and over the previously traced circuit to front contact 826, conductor 837, front contact 827, and thence over cable 800 which at this time is connected to conductor T7 by way of contact 907 of relay 900, and from thence over conductor T7 by way of contacts 1136 and 1132 through the associated resistance and negative battery. When third digit-stop relay 878 energizes and closes contact 836 positive battery is connected to conductor T7 over the previously traced circuit for relay 878 to short-circuit track-signal relay 9E and cause this latter relay to deenergize. At contact 1133 relay 9E, upon deenergizing, opens the circuit to the train-start relay TST which accordingly deenergizes to cause the release of the field station apparatus as previously described.

In the dispatcher's office, and in response to code 267 transmitted from the field station, switch wiper 402 of the vertical and rotary switch is operated to engage the seventh bank contact in the sixth level as previously described. When rotary series relay releases after the last digit and at back contact 404 completes a circuit for short-circuiting track-indicating relay 9TIR as follows: from back contact 404, contact 401, switch wiper 402 in engagement with the seventh bank contact of the sixth level terminating the conductor 67 of cable 60, and thence over this conductor through contact 303, the winding of relay 9TIR, to positive battery at contact 302. Track-indicating relay 9TIR accordingly deenergizes in response to this short circuit and at contact 301 extinguishes the train pilot lamp 9TPL for track-section 9 to indicate to the dispatcher that the train has left section 9. The dispatcher's apparatus is now released in the same manner as previously described.

When the train enters track section 6 track relay 6T deenergizes and at contact 1462 energizes track signal relay 6F over the following circuit: from positive battery, contact 1462, conductor 1440, back contact 1430, conductor 1441, through the winding of relay 6F to negative battery. At contact 1434 relay 6F locks itself over conductor 1443, at contact 1435 marks conductor T4 and prepares the circuit for relay 6E and at contact 1437 connects positive battery by way of conductors 1445 and 1446 to the common start conductor K1 to complete the circuit for energizing the train-start relay TST. Train-start relay TST, upon energizing, causes the operation of the distributor unit relays, the code-marking relays, and the relays in the coding unit as previously described to transmit a code 264 to the dispatcher's station. The first two digits 2 and 6 are transmitted as before, and the third digit is terminated when digit-counting relay 804 completes the circuit for energizing the third digit-stop relay 878 in series with relay 6E over the marked conductor T4. This circuit may be traced as follows: from positive battery through the upper operating winding of the third digit-stop relay 878, over the previously traced circuit conductor 715, back contacts 826, 821, 822, and 823, front contact 824, conductor 4 of cable 800 now connected to conductor T4 of cable TIC by the closed contacts 904 of the operated relay 900, and thence over conductor T4, contact 1435, conductors 1442 and 1439, through the winding of relay 6E, conductor 1438, and the associated resistance to negative battery. Relay 6E energizes over this circuit as soon as the third digit stop relay 878 operates its contact 863 to connect positive battery to conductor T4. At contact 1430 relay 6E transfers the locking circuit of relay 6F directly to contacts 1462 of track relay 6T, at contact 1431 completes an obvious locking circuit for itself, at contact 1432 prepares a point in its own release circuit, and at contact 1433 opens the circuit to the train-start relay TST whereupon this latter relay deenergizes, and the field station coding apparatus is released in the same manner as previously described.

In the dispatcher's office and in response to the receipt of code 264, the switch wiper 402 of the vertical and rotary step-by-step switch is operated to engage the fourth bank contact in the sixth level as previously described. When the rotary series relay RS deenergizes track-indicating relay 6TIR is energized over the following circuit: from positive battery, back contact 404, contact 401, switch wiper 402 in engagement with the fourth bank contact in the sixth level, conductor 64 terminating this bank contact and through the winding of relay 6TIR through the associated resistance to negative battery. At contact 331 track-indicating relay 6TIR completes the circuit for lighting the track pilot lamp 6TPL on the dispatcher's panel corresponding to track section 6. At contact 332 relay 6TIR completes a locking circuit for itself, and at contact 333 prepares a point in its own release circuit. The dispatcher's apparatus now releases in the same manner as previously described.

When the train leaves section 8 track relay 8T energizes, and at contact 1287 completes the circuit for operating relay 8TS as follows: from positive battery through the dual control contacts marked DUAL-CO, contacts 1287, conductor 1360, contact 1450, conductor 1177, contact 1171, conductor 1176, and through the winding of relay 8TS to negative battery. At contact 1249 track relay 8T completes the circuit for operating the polar neutral relay 10HP as follows: from negative battery by way of back contact 1160, conductor 1189, contact 1453, conductor 1364, contact 1249, conductor 1188, contact 1165, and through the winding of relay 10HD to common battery C. At contact 1289 the energization of track relay 8T opens the locking circuit of relay 8F which accordingly deenergizes. Relay 8TS, upon operating, at contact 1271 completes its own locking circuit by way of contact 1287 and at contact 1272 completes the circuit for operating relay 9HP as follows: from positive battery by way of contact 1272, contact 1278 of the time element relay 8TER, conductor 1361, contact 1452, conductor 1179, contact 1102, conductor 1180, contacts 1281 and 1282, conductor 1187, contact 1156, and through the winding of relay 9HP to negative battery. At back contact 1157 relay 9HP extinguishes the red lamp of main track signal 9MS and at front contact thereof lights the green or yellow lamp of signal 9MS in accordance with the operated condition of the polar neutral relay 9HD. In standard practice relay 9HD has operated its polar neutral contacts 1154 to cause the yellow lamp to light in the well known manner. Since this arrangement is well known and is not part of this invention the same is not fully shown or described. At contact 1158 relay 9HP opens the circuit to relay 9NP and at contacts 1159 and 1160 reverses battery connection to relay 10HD to cause this latter polarized neutral relay to operate its polar contact 1250 to the dotted position. At contact 1161 relay 9HP again completes the circuit for operating relay 9D over the previously traced circuit. Relay 9NP, upon releasing, at contact 1168 causes the release of relay 9S and the latter relay deenergizes to open the circuit to certain of the interlock relays to prevent their operation at this time. Relay 9D, upon energizing at this time, locks in the same manner as previously described but does not send a code because neither of the relays 9C or 9B are energized.

Relay 8F deenergizes in response to the operation of track relay 8T and at contact 1236 marks conductor T1 of the track indicating cable TIC and prepares a point in the release circuit of relay 8E. At contact 1237 relay 8F connects positive battery by way of conductors 1244 and 1246 to common start conductor K1 to energize the train-start relay TST as previously described. The operation of train-start relay TST causes the field station coding unit to transmit the code 261 to the dispatcher's station. The first and second digit-stop relays 960 and 980 terminate the first and second digits of this code in the same manner as previously described. The third digit-stop relay 878 is energized to terminate the third digit when digit counting relay 891 is energized in response to the first pulse of the third digit as follows: from positive battery, upper operating winding of the third digit-stop relay 878, and thence over the previously traced circuit to front contact 821, conductor 1 of cable 890, which at this time is connected to conductor T1 of track-indicating cable TIC, and thence by way of contacts 1236 and 1232 through the resistance and negative battery associated with relay 8E. Relay 8E is short-circuited when the third digit-stop relay 878 at contact 863 connects positive battery to conductor T1 in a manner apparent from the foregoing description. Relay 8E accordingly deenergizes and at contact 1233 opens the circuit to the train-start relay TST whereupon the field station coding apparatus is released in the same manner as previously described.

In the dispatcher's office and in response to the receipt of code 261 the vertical and rotary switch operates its wiper 402 to engage the first bank contact in the sixth level in the same manner as previously described. When rotary series relay RS deenergizes track-indicating relay 8TIR is short circuited over the following circuit: from positive battery, back contact 404, contact 401, switch wiper 402 in engagement with the first bank contact in the sixth level terminating conductor 61 and thence by way of contact 313 and the winding of relay 8TIR, contacts 312 to positive battery. At contact 311, the deenergization of relay 8TIR extinguishes the track pilot lamp 8TPL of the dispatcher's panel to indicate to the dispatcher that the train has left section 8. At contact 314 relay 8TIR opens the circuit of relay 8TR, whereupon the latter relay deenergizes. Relay 8TR deenergizes and at back contacts 101, 102, and 104 maintains the red lamp of signals 7SL, 6SL, and 9SL lighted over their previously traced normally closed circuits. At contact 105 relay 8TR extinguishes the red lamp of signal 9MSL and at back contact thereof lights the green lamp of signal 9MSL over the previously traced circuit. The dispatcher knows that the train has left section 8 when track-pilot lamp 8TPL is extinguished and also knows that as long as the train is in section 6 or as long as the track-pilot lamp 6TPL is lighted, the yellow lamp of signal 9MS in the field station is lighted in accordance with the usual practice, although at the dispatcher's panel the green lamp of corresponding signal 9MSL is green.

When the train enters the track section beyond track section 6 and leaves section 6, track relay 6T is energized and causes the polar-neutral relay 9HD to operate to the position shown in the drawings in the well-known manner to extinguish the yellow lamp and light the green lamp of signal 9MS. At contact 1462 track relay 6T opens the locking circuit of relay 6F which accordingly deenergizes. The deenergization of relay 6F, in the same manner as described for the other track signal relays, marks conductor T3 and causes the operation of the train-start relay TST. Train-start relay TST causes the field station apparatus to transmit the code 263 to the dispatcher's station as previously described. The third digit-stop relay 878 is energized at the end of the third pulse because the conductor T3 is marked by the release of relay 6F. The third digit-stop relay 878, upon operating in a manner similar to that previously described, causes the release of relay 6E and the latter relay causes the release of the train-start relay TST, which likewise deenergizes and causes the release of the field station apparatus as previously described.

In the dispatcher's station in response to code 263 the vertical and rotary step-by-step switch rotates its wiper 402 into engagement with the third bank contact in the sixth level at which point the circuit is closed for short-circuiting relay 6TIR at the end of the pulsing period in a manner apparent from the foregoing description. The deenergization of track-indicating relay 6TIR at contact 331 extinguishes the track-pilot lamp 6TPL to indicate to the dispatcher that the train has left track section 6. The release of the dispatcher's apparatus is the same as previously described.

*Release of key—9*

Any time after the train leaves section 8 the dispatcher may restore key—9 so as to extinguish the distant green lamp and light the red lamp of the track signal 9MS. For this purpose it will now be assumed that the dispatcher restores key—9 after the train leaves section 6. The restoration of key—9 opens the circuit of relay B9 which accordingly deenergizes. At contact 131 one of the multiple positive battery connections to relay A9 is removed and at contact 134 relay B9 connects negative battery potential to conductor 8 of cable 70 to mark this conductor and to prepare the release circuit for relay D9. At back contact 136 relay B9 connects positive battery to the common start conductor 200 by way of front contact 147 to energize start relay 340. Relay 340 operates relay 370 and the latter relay operates relay 380 which causes the operation of relay 450 in the same manner as previously described. Relay 450 energizes and prepares a point in the pulsing circuit to relay 570 at contact 451, at contact 452 prepares a circuit for the first digit-stop relay 460, and at contact 462 operates the outgoing start relay 560 as previously described. The operation of relay 560 causes the operation of relay 570, 500, 550, 552, 580, 510, 530, 540, and 520, in the same manner as previously described. Relay 540 causes the operation of relay 360 which in turn operates relay 350 to busy the dispatcher's coding unit to other units of the dispatcher's panels.

In response to the operation of the pulse-generating relay 552 the relays in the dispatcher's coding unit are operated in the same manner as previously described to transmit the code 258 to the distant field station. The first digit-stop relay 460 is operated to terminate the first digit after two pulses have been transmitted and the second digit-stop relay 480 is operated to terminate the second digit after five pulses have been transmitted as previously described. Relay 490 operates after the transmission of the second digit to connect the conductors of cable 70 to the conductors of cable 80, whereby the third digit-stop relay 678 is energized to terminate the third digit after the eighth pulse in response to the second operation of the second digit-counting relay 602. The circuit for operating the third digit-stop relay 678 may be traced as follows: from positive battery through the upper operating winding of third digit polarized stop relay 678, front contact 660, conductor 513, front contact 561, conductor 512, front contact 626, conductor 637, front contacts 627 and 628, conductor 488 now connected to conductor 8 of cable 70 by way of operated contact 498, and thence by way of conductor 8 of cable 70, contacts 134 and 145, through the resistance associated with relay D9 to negative battery. The third digit-stop relay 678 is energized over this circuit and at contact 694 connects positive battery to conductor 512 and thence over the previously traced circuit to short circuit relay D9 by way of conductor 198 and contact 146 to positive battery. Relay D9 accordingly deenergizes and at contact 141 extinguishes the green lamp of signal 9MSL thereby leaving this signal dark. The dispatcher's apparatus now releases in the same manner as previously described.

In the field station, and in response to code 258 transmitted thereto, line relay 703 follows the impulses transmitted. In response to the first pulse line relay 703 deenergizes and causes the operation of relays 700, 710, 720, 730, and 740 as previously described. Since the first pulse of the code transmitted from the dispatcher's station is a prolonged pulse slow-to-release relay 770 momentarily deenergizes and operates the incoming start relay 887 which in turn operates relay 910 in the manner previously described. At the termination of the first pulse of the first digit line relay 703 is reenergized causing the operation of relay 770 and the operation of the first digit counting relay 801. Relays 703, 700, and the digit counting relays operate in accordance with the second pulse of the first digit as previously described. Slow-to-release relays 710 and 720 momentarily deenergize after the first digit to cause the operation of the first digit relay 920 and the release of the operated digit-counting relay 802 as previously described.

In response to the five pulses of the second transmitted digit, relays 703 and 700 operate as previously described to cause the operation of the fifth digit counting relay, or relay 805. Relays 710 and 720 again momentarily fall back after the second digit to cause the operation of second digit relay 930 and the release of digit-counting relay 805. The second digit relay 930 connects the conductors of cable 800 to the conductors of operate cable OC in order to prepare an operate circuit for the desired position control relay.

In response to the eight pulses of the third digit relays 703 and 700 operate as previously described to cause the second operation of digit-counting relay 802. When relay 710 deenergizes and before the remaining relays deenergize, relay 710 at contact 711 completes a circuit for operating relay 9B as follows: from positive battery, contact 711, conductor 708, back contact 762, conductor 715, front contacts 826, 827, and 828, conductor 8 of cable 800 now connected to conductor O8 of operate cable OC by operated contacts 938 of the second digit relay 930 and thence by way of conductor O8, Fig. 11, through the normally closed springs controlled by contact 1108, conductor 1124, winding of relay 9B, conductor 1125, and through the associated resistance of negative battery. After transmission of the third digit relays 710, 720, 730, 740, 887, 910, 920, and 930 release in the same manner as previously described.

Relay 9B, upon energizing, at contact 1108 opens the locking circuit of relay 9R to cause the release of this latter relay. At front contact 1109 relay 9B completes an obvious locking circuit for itself and at contact 1110 prepares a point in its own release circuit. Relay 9R releases and at contact 1102 opens the circuit of relay 9HP to cause this latter relay to deenergize. Relay 9HP, upon deenergizing, at contact 1157 extinguishes the green lamp and lights the red lamp of signal 9MS, at contact 1158 prepares a point in the circuit to relay 9NP, at contacts 1159 and 1160 reverses battery connections to the polar-neutral relay 10HD, and at contact 1161 closes the previously traced short circuit around relay 9D. Polar-neutral relay 10HD operates its contacts 1150 and 1151 to the position shown in the drawings to complete the circuit for energizing relay 9NP. Relay 9NP is now energized over its previously traced circuit and at contact 1168 prepares a point in the circuit to relay 9S which circuit, however, is opened at contacts 1273 and 1279. At contact 1169 relay 9NP completes a circuit for operating the time-element relay 8TER as follows: from positive battery, contact 1456, conductor 1190 to Fig. 11, contact 1169 and 1174, conductor 1192, contact 1274, and through the winding of the time-element relay 8TER to negative battery. The time element relay 8TER energizes at this time to introduce a delay of sufficient time to permit a train to proceed over track-switch relay TS before such switch can be operated by the dispatcher. A relay of this type is old and well known and need not therefore be further described. Time element relay 8TER, upon energizing, at contact 1278 opens a point in the circuit to relays 6HP, 7HP, 9HP, C9H, and HWR to prevent their operation for a predetermined time. At contact 1279 relay 8TER completes the circuit for operating relay 9S as follows: from positive battery by way of contact 1168, conductor 1185, contact 1279, conductor 1186, and through the winding of relay 9S to negative battery. Relay 9S, upon energizing, locks and prepares circuits for the different track-interlock relays, and at contact 1174 opens the circuit to the time-element relay 8TER. Time-element relay 8TER releases in the well known manner and after a predetermined time closes contacts 1278 to reestablish control over the various interlock relays which control the track signals and track switch TS.

When position-control relay 9D releases as a result of the deenergization of relay 9HP, relay 9D at contact 1115 marks conductor R8 and prepares a point in the release circuit to relay 9B. At contact 1117 relay 9D connects positive battery by way of contact 1111 and conductor 1123 to the common start conductor L1 to cause the operation of the signal-start relay SST of Fig. 10. The signal-start relay SST energizes and at contact 1095 operates relay 1060 which in turn operates relay 1001 as previously described. Relay 1060 and relay 1001 completes the circuit for operating signal relay 940 over the previously traced circuit.

Relay 940 at contact 945 completes the circuit for energizing the start-out relay 760, and the latter relay causes the operation of the pulse-generating relay 790 and relays 1070 and 1080 as previously described. Pulse-generating relay 790, first, operates outgoing start relay 885, then relay 750, and pulsing relay 780, as previously described. Pulsing relay 780 transmits pulses over the dispatcher's line loop and operates relay 700 which in turn causes the operation of relays 710, 720, 730, and 740, as previously described. Relays 790, 780, and 700 then interact with the digit-counting relays 801 to 806, inclusive, the transfer relay 876, and the space-counting relays 811 and 812, as previously described, to transmit the code comprising digits 2, 5, and 8 to the dispatcher's office. The first digit-stop relay 960 is energized to terminate the first digit after the second pulse, and the second digit-stop relay 980 is energized after the fifth pulse to terminate the second digit in the same manner as previously described. After the transmission of the second digit relay 990 is operated to connect the conductors of cable RC to the conductors of cable 800. When digit-counting relay 802 is operated after the transmission of the eighth impulse the third digit-stop relay 878 is energized to stop further transmission of impulses. The circuit for operating third digit-stop relay 878 may be traced as follows: from positive battery through the upper operating winding of third digit-stop relay 878, front contact 880, conductor 716, front contact 762, conductor 715, front contacts 826, 827, and 828, conductor 8 of cable 800 now connected to conductor R8 of cable RC by way of operated contacts 998 and by way of conductor R8, Fig. 11, contacts 1115, 1110, the resistance associated with relay 9B and negative battery. At contact 863 relay 878 connects positive battery at contact 761 to conductor 715, and thence to conductor R8 over the circuit just traced to short circuit relay 9B. Relay 9B accordingly deenergizes and at contact 1111 opens the circuit to signal-start relay SST, whereupon this relay and the field station coding apparatus are released as previously described.

In the dispatcher's station in response to code 258 transmitted from the field station line relay 503 follows the impulses and operates relay 440 causing the operation of relays 500 and 510, as previously described. Relay 510 operates relays 530, 540, 520, 360, and 350, as previously described.

Relays 503, 440, 500, and the digit-counting relays 601 and 602 interact as previously described for the first digit, and slow-to-release relay 430 deenergizes after this digit to complete the circuit for relay 410. Relay 410 transfers the pulsing circuit from relay 440 to the vertical and rotary step-by step switch so that the next two digits operate the switch to engage the eighth bank contact in the fifth level in a manner similar to that previously described.

When the rotary series relay RS deenergizes after the last pulse of the third digit, a circuit is completed for short-circuiting relay C9 as follows: from back contact 404, contact 401, switch wiper 402 in engagement with the eighth bank contact in the fifth level, and then by way of conductor 58 of cable 50 to Fig. 1 over conductor 177 through the winding of relay C9 to positive battery at contact 154. Relay C9 accordingly deenergizes and at contact 151 completes the circuit for lighting the red lamp of signal 9MSL as follows: from back contact 105, conductor 155, back contact 141, contact 151, back contact 164, and through the filament of the red lamp of signal 9MSL to negative battery. At contact 153 relay C9 opens the circuit to relay A9, which accordingly deenergizes. Relay A9, upon deenergizing, at contact 121 prepares a point in the circuit to permit the operation of relay B7 in response to the operation of key 7, at contact 122 prepares a point in the circuit to relay B6 so that this latter relay may operate in response to the operation of key 6, and at contact 123 prepares a point in the circuit to relay B8 so that this latter relay may operate if key 8 is operated. After transmission of the third digit, line relay 503 is maintained energized to cause the release of the dispatcher's apparatus and switch as previously described. All of the apparatus at both the field station and dispatcher's station are now in normal or in the position shown in the drawings.

It will now be assumed that for some reason the key 9 will be restored before the full operate code 257 has been transmitted to the field station. When key 9 is first operated relays B9 and A9 operate, causing the dispatcher's coding unit to send the code in the same manner as previously described. Assuming now the key 9 is restored any time before the last digit has been transmitted, then relay B9 will deenergize before relay D9 is operated. The release of relay B9 at contact 131 opens the circuit of relay A9, and at contact 135 opens the operating circuit to relay D9, thereby removing the marking condition from conductor 7 of cable 70 over which the number of pulses in the third digit is determined, since the digit-counting relays are operated until one of these marked conductors is connected with to cause the operation of the third digit-stop relay. At contact 136 relay B9 opens the circuit to start relay 340 which accordingly deenergizes to in turn cause the deenergization of relays 370 and 450. Relay 450 opens the circuit to the first digit-stop relay 460 in case the key 9 is restored before the first digit is sent. It will be remembered that relays 500, 552, and 570 and the digit-counting relays operate until stopped by the operation of first digit-stop relay 460 for the first digit, second digit-stop relay 480 for the second digit, and the third digit-stop relay 678 for the third digit. Therefore, whenever one of the stop circuits to either the first digit-stop relay 460, the second digit-stop relay 480, or the third digit-stop relay 678 is opened the above-mentioned relays continue to interact until eleven pulses have been sent. The digit-counting relays 606, 601, and 605 on the eleventh pulse complete a circuit for the release-stop relay 674 over one of two different circuits, dependent upon the number of digits which have been transmitted. In case only one or two digits have been transmitted, then release-stop relay is energized over the following circuit: from positive battery by way of back contact 660, conductor 513, front contact 561, conductor 512, front contacts 626 and 627, back contacts 628, 629, and 630, and front contact 640, through the winding of release-stop relay 674 to negative battery. In case the first and second digits have been transmitted, then release-stop relay 674 is energized in series with relay 678 as follows: from positive battery through the operating winding of the third digit stop relay 678, front contact 660 and thence over the previously traced circuit to relay 674. Release-stop relay 674, upon energizing, at contact 669 completes a circuit for energizing third digit relay 678 by way of conductor 668. Third digit-stop relay 678, upon energizing, stops further pulsing and releases the apparatus as previously described.

In the various field stations, the line relays 703 follow the impulses causing the operation of the digit-counting relays. When eleven pulses are received the digit-counting relays cause the operation of release-stop relay 874 as follows: from positive battery by way of contact 711, conductor 708, back contact 762, conductor 715, front contacts 826 and 827, back contacts 828, 829, and 830, front contact 840, conductor 833, and through the winding of release-stop relay 874 to negative battery. At contact 869 relay 874 completes a circuit by way of conductor 868 for energizing the upper operate winding of third digit-stop relay 878. The operation of third digit-stop relay 878 is ineffective at this time since the code is being transmitted from the dispatcher's station. The operation of this relay, however, is effective when the field station is transmitting to stop further transmission on account of trouble, such as failure to complete a stop circuit for any of the stop relays such as relays 960, 980, or 878 on account of open circuits or other conditions.

In case the key 9 is released after complete transmission of code 257 to the field station but before the receipt of the return code from the field station, it will be remembered that relays B9 and A9 operate in response to the operation of key 9, and relay D9 is operated at the end of the code to the field station. Now if the key 9 is released before C9 is operated by the return code, then with key 9 released relay B9 releases and at contact 131 opens the original circuit of relay A9, which is now held in operated position by contact 142. At back contact 133, relay B9 completes the circuit for energizing relay C9 as follows: from positive battery, back contact 133, contact 144, through the normally closed springs controlled by contact 154, through the winding of relay C, conductor 177 and associated resistance to negative battery. At contact 134 relay B9 marks conductor 8 and prepares a short circuit for relay D9, and at contact 136 connects positive battery to the common start conductor 200 to cause the operation of relay 340. Relay C9, upon operating, at contact 152 lights the green lamp of signal 9MSL by way of operated contacts 141 and 152 and back contact 105, at contact 153 maintains relay A9 operated and at contact 154 locks itself in operated position. Relay 340 is energized as previously described and in case the field station is, at this time, transmitting back the return code, then such code causes the operation of the vertical and rotary switch as previously described, after which the apparatus is released. In this case relay C9 is already operated and the return code performs its function. When the apparatus is restored, the operated start relay 340 then causes the dispatcher's coding unit to transmit the release code 258 to the field station and causes the release of relay D9 at the end of the code transmission as previously described. The apparatus at the field station now operates in response to the code 258 in the same manner as previously described, to operate relay 9B thereby releasing relays 9R, 9HP, operating relays 9NP, 9S, and releasing relay 9D to send the return code 258 at the end of which relay 9B is released as previously described. In the dispatcher's office relays C9 and A9 release as previously described in response to the receipt of the return code 258 transmitted from the field station.

As long as key 9 is maintained operated, relays B9, D9, and C9 remain in operated position in the dispatcher's office to maintain the green lamp 9MSL lighted, while at the field station relay 9R maintains the circuit of relay 9HP which lights the green lamp of track signal 9MS provided there are no conflicting track conditions. With this arrangement any number of trains may proceed through sections 9 to 6, and beyond. However, if so desired, the dispatcher can by operating the associated stick key, such as key 9S associated with key 9, alter the circuit so that it is necessary to reoperate key 9 before a second train is allowed to proceed from section 9 to section 6. Therefore, when the dispatcher wants only one train to pass section 9 at a time, the key 9 and key 9S are operated. Key 9 operates relay B9, and relay B9 operates relay A9. Relay B9 operates start relay 340 to cause the dispatcher's coding unit to transmit code 257 to the field station as previously described. In response to the operation of key 9S relay S9 is energized over the following circuit: from positive battery connected to key 9, contact 137, conductor 157, contact 203, conductor 205, contact 234, conductor 158, contact 112 of key 9S, and through the winding of relay S9 to negative battery. At contact 111 relay S9 completes the following locking circuit for relay B9: from positive battery, contact 106, conductor 169, contact 132, conductor 168, front contact 111, conductor 167, and through the winding of relay B9 to negative battery. From the foregoing description it will be remembered that relay D9 at the dispatcher's panel is energized at the end of code transmission and that relays 9C, 9R, and 9HP in the field station are energized in response to this code. Relay 9D energizes to start the return code from the field station, and relay 9C is released at the end of the code, while at the dispatcher's station relay C9 is energized in response to this return code as previously described. The first train to enter track section 9 from the left causes the release of track relay 9T and causes track signal relays 9F and 9E to transmit the code 268 to the dispatcher's office. In response to this code the track-indicating relay 9TIR is operated to light the track-pilot lamp 9TPL as previously described. When the train enters section 8 track relay T8 deenergizes causing the track-signal relays 8F and 8E to transmit the code 262 to the dispatcher's office which causes the track-indicating relay 8TIR to operate and light the track-pilot lamp 8TPL. The operation of track-indicating relay 8TIR also causes the operation of relay 8TR as previously described.

The operation performed by relay 8TR is now somewhat different because relay S9 is operated. At contact 106 relay 8TR opens the locking circuit of relay B9 which accordingly deenergizes. Relay B9, upon deenergizing, at contact 134 marks conductor 8 of cable 70 and prepares the release circuit for relay D9. At contact 136 relay B9 connects positive battery to common start conductor 200 to operate start relay 340 to cause the dispatcher's coding unit to transmit the release code 258 to the field station. At the termination of the transmission of the release code to the field station, relay D9 is short circuited and releases to open the circuit to the signal lamp 9MSL so that this signal now remains dark.

In the field station, and in response to the release code 258, relay 9B energizes, relays 9R and 9HP deenergize, relay 9D energizes to transmit the return code 258 back to the dispatcher's office, and relay 9B deenergizes at the end of this code, as previously described. The release of relay 9HP completes the circuit for lighting the red lamp of signal 9MS.

In the dispatcher's office relays C9 and A9 release in response to this return code from the field station to light the red lamp 9MSL as previously described.

When the train leaves section 8 relay 8TR is released in the same manner as previously described, and at back contact 105 maintains the red lamp 9MSL lighted since at this time relays D9 and C9 are released. Relay B9 cannot reoperate on the deenergization of relay 8TR even though key 9 is operated because S9 is maintaining the circuit to relay B9 open at contact 111. The track signal 9MS at the field station and the corresponding signal 9MSL at the dispatcher's panel are maintained red thereby permitting only one train to pass track section 9 from left to right. Before another train may proceed from section 9 to section 8 it is necessary for the dispatcher to release key 9S which causes the release of relay S9. With relay S9 in deenergized position and by the operation of key 9 the circuit to relay B9 can again be completed.

*Take siding*

It will now be assumed that the dispatcher desires to send the next train to arrive at track section 9 over the track switch TS to section 7. Before the dispatcher can transmit a code to cause the operation of track switch TS there must be no conflicting signal conditions. For example, if the dispatcher's key 9 is operated then relays A9, D9, and C9 at the dispatcher's panel are also operated and therefore the operation of any conflicting key, such as key 8, key 7, or key 6, is ineffective because relay A9 has opened the circuits controlled by these keys. It is therefore necessary for the dispatcher to release the conflicting key, as per example key 9, to return all of the signals at both the field station and the panel in the dispatcher's office to red or stop position before a code can be sent to the field station to operate track switch TS.

In accordance with the usual well known track-governing conditions in the field, the track-interlock relays are arranged so that the track switch TS can only be operated by the dispatcher in case there are no conflicting track conditions in the field. That is, the track switch TS can only be operated by the dispatcher at a time when relays 6S, 9S, and 8TS are in operated position, and the time-element relay 8TER is in normal or released position. This arrangement is old and well known and will not be described further at this time. Assuming now that key 8 is operated by the dispatcher at a time when there are no conflicting signals or track conditions. Key 8 at contact 177 causes the operation of relay B8 over the following circuit: from positive battery, contact 177 of key 8, conductor 126, back contact 103, conductor 125, contact 123, conductor 120, contact 241, conductor 204, contact 201, conductor 127, and through the winding of relay B8 to negative battery. At contact 171 relay B8 completes a locking circuit for itself by way of operated key contact 177, and at contact 172 completes the circuit for operating relay A8 over conductors 179 and 180. At contact 175 relay B8 marks conductor 1 of cable 70 in order to terminate the third digit to be transmitted and prepares the circuit for relay D8. At contact 176 relay B8 connects positive battery by way of back contact 188 to common start conductor 200 to energize start relay 340. At contact 161 relay 8A prepares a point in the circuit to relay B7 so that the dispatcher may route a train from section 7 over the track switch TS to section 9 only at a time when the track switch TS is operated in its siding position, and at contact 162 opens the circuit to relay B6 to prevent its operation in case key 6 should be operated at this time. At back contact 163 relay A8 opens the circuit to the red lamp of signal 9SSL to extinguish this lamp and at front contact 163 completes a circuit by way of conductor 149 and back contact 104 for maintaining the red lamp of signal 9MSL lighted. At back contact 164 relay A9 opens a point in the original circuit to the red lamp 9MSL now maintained lighted over front contact 163 and at front contact 164 completes a new circuit for lighting the red lamp 9SSL by way of back contact 151, 141, and 105, and conductor 155. At front contact 165 relay A8 prepares a point in the circuit for the yellow lamp Y of signal 9SSL, and at contact 166 prepares a point in its own locking circuit.

Start relay 340 energizes in response to the operation of relay B8 and causes the dispatcher's coding unit relays to transmit the code 251 to the field station in a manner apparent from the foregoing description. In the dispatcher's office the first digit-stop relay 460, the second digit-stop relay 480, and relay 490 are operated as previously described to send the first two digits, and to connect the conductors of cable 70 to the contacts of the digit-counting relays by way of cable 80. The third digit-stop relay 678 is energized over the marked conductor of cable 70 to stop further transmission of impulses in the third digit after one impulse has been transmitted. Third digit-stop relay 678 energizes in series with relay D8 over the following circuit: from positive battery through the upper operating winding of relay 678, 660, 513, 561, 512, 626, 639, front contact 621, conductor 481 of cable 80, contact 491 to conductor 1 of cable 70, contact 175, through the normally closed springs of contact 187, to the winding of relay D8, conductor 189, and associated resistance to negative battery. Third digit stop relay 678, at contact 694 connects positive battery to this circuit to insure the operation of relay D8. At contact 181 relay D8 operates relay F over the following circuit: from positive battery, front contact 181, conductor 139, back contact 191, conductor 138, and through the winding of relay F to negative battery. At front contact 182 relay D8 extinguishes the green lamp of the combined key and signal 8SL to indicate that the code has been transmitted to the field station, at contact 183 maintains relay A8 in operated position, at contact 185 prepares a point in the circuit to relay C8, at contact 186 prepares a point in its own release circuit, at contact 187 completes its own locking circuit, and at contact 188 opens the circuit to start relay 340 to cause this latter relay to release, whereupon the dispatcher's coding apparatus releases in the same manner as previously described. The operation of relay F at this time prepares a circuit for relay G at contact 282.

In the field stations line relays 703 follow the impulses transmitted thereto and operate the field station coding units in the same manner as previously described. In field station 25 relays 920 and 930 are operated in response to the first and second digits and relay 8C is operated after the third digit by the deenergization of relay 710 as follows: from positive battery, contact 711, conductor 708, back contact 762, conductor 715, back contact 826, front contact 821, conductor 1 of cable 800, operated contact 931 of second digit relay 930 to conductor O1 of operate cable OC, and thence to Fig. 12, over the normally closed springs of contact 1205 through the winding of relay 8C, conductor 1221 and associated resistance to negative battery. At contact 1204 relay 8C completes a circuit by way of conductor 1218 for operating relay 8R and at contacts 1205 completes a locking circuit for itself by way of conductor 1219 and back contact 1209. At contact 1251 relay 8C prepares a circuit for relay 8H but this relay is prevented from operating due to the normally closed short circuit around its winding as follows: from positive battery by way of contact 1285, polar-neutral contact 1286, conductors 1229 and 1268, back contact 1263 and conductor 1267 through the winding of relay 8H to positive battery. Relay 8R, upon energizing, at contacts 1201 and 1202 reverses battery connections to relay 8WR to cause this latter relay to operate in case there are no conflicting track conditions. The circuit for operating relay 8WR to its reversed position may be traced as follows: from positive pole of battery by way of contact 1272, contact 1278, conductor 1361, contact 1451, conductor 1178, contact 1170, conductor 1175, front contact 1202, conductors 1291 and 1290, through the winding of relay 8WR, conductor 1292, and front contact 1201 to negative battery. Relay 8WR operates over the above-traced circuit and at its contact 1270 completes the circuit for operating the track-switch motor SM to move the track switch TS from its main line position to its siding position. As soon as motor SM starts to move the track switch TS, the track switch contacts 1276 and 1277 are moved from their full line position. As soon as these contacts are moved off of their full line positions, the circuit to relay 8KR is opened, whereupon this relay deenergizes to release its neutral contacts 1281, 1283, and 1285. At contacts 1281 relay 8KR opens points in the circuits to either relays 9HP or C9H to prevent their operation until the track switch TS is fully operated, and at contact 1283 opens a point in the circuits for relay 6HP and 7HP to prevent their operation until the track switch TS is also fully operated. At contact 1285 relay 8KR removes the short circuit from around the winding of relay 8H whereupon the latter relay is energized over the following circuit: from positive battery through the winding of relay 8H, conductor 1267, contact 1251, and through the associated resistance to negative battery. At contact 1256 relay 8H connects relay 8G to stop conductor R4 to mark this conductor for the third digit of the return code, and at contact 1257 connects positive battery by way of contact 1254 and conductors 1260 and 1258, to the common start conductor L1 to cause the energization of the signal-start relay SST.

In the same manner as previously described, the signal-start relay SST operates the field station coding apparatus to transmit the code 254, since stop conductor R4 is now marked. The relays 780, 700, 790, and the digit-counting relays operate as before to operate stop-relays 960 and 980 for the first and second digits, after which connecting relay 980 is operated to connect the conductors of cable RC to the conductors of cable 800 and the contacts of the digit-counting relays. The digit-counting relays operate for the third digit as previously described, until digit-counting relay 804 is operated, at which time four impulses have been transmitted for the third digit and the third digit-stop relay 878 is operated in series with relay 8G. This circuit may be traced as follows: from positive battery through the upper operating winding of the third digit-stop relay 878, front contact 880, conductor 716, front contact 762, conductor 715, back contacts 826, 822, and 823, front contact 824, conductor 4 of cable 800 now connected to conductor R4 of cable RC by way of operated contact 994, and over conductor R4 to front contact 1256 in Fig. 12, conductor 1264, through the normally closed springs of contact 1253, conductor 1265, and through the winding of relay 8G to negative battery. At contact 863 relay 874 connects positive battery at contact 761 to this circuit to insure the operation of relay 8G. Relay 8G at contact 1253 completes a locking circuit for itself from contact 1255, and at contact 1254 opens the circuit through the signal-start relay SST, whereupon the field station coding apparatus releases as previously described. The field station has accordingly transmitted the code 254 to the dispatcher's station.

In the dispatcher's office and in response to the code 254, the vertical and rotary step-by-step switch is operated to complete a circuit for energizing relay G as follows: from positive battery, back contact 404, 401, wiper 402 in engagement with the four bank contact in the fifth level, conductor 54 of cable 50, front contact 282, and through the winding of relay G to negative battery. At contact 291 relay G operates interrupter relay K by way of conductors 248 and 249 and contacts 296, and at contact 292 prepares the circuit for lighting the red lamp of signal 8SL. At contact 293 relay G completes a locking circuit for itself from contact 281. Relay K, upon operating, at contact 295 operates relay 8, which in turn at contact 296 opens the circuit of relay K. At contact 297 relay H completes the circuit for operating the red lamp of signal 8SL as follows: from positive battery, contact 297, conductor 247, contact 292, conductor 159, and through the filament of the red lamp R of signal 8SL to negative battery. Slow-to-release relay K deenergizes after an interval, and at contact 295 opens the circuit to relay H. Relay H deenergizes after an interval to reclose the circuit to relay K at contact 296, and at contact 297 opens the circuit to the red lamp of signal 8SL. Relays K and H continue to intermittently operate to flash the red lamp of signal 8SL as long as the track switch TS has not completed its full movement. By observing the flashing of the signal 8SL the dispatcher knows that the track-switch TS has started to move, but has not completed its movement.

As soon as the track switch TS in Fig. 12 has completed its full movement contacts 1276 and 1277 are moved to their dotted position in the drawing in which position positive battery is reversed to relay 8KR to cause relay 8KR to operate its polar contacts to their reversed position, in which position the polar contacts 1282, 1284, and 1286 are operated to the dotted line position. Relay 8KR, upon energizing, at contacts 1281 and 1282 prepares a point in the circuit to relay C9H and opens the circuit to relay 9HP. At neutral contacts 1283 and polar contact 1284 relay 8KR opens a point in the circuit to relay 6HP to prevent its operation at a time when the track switch TS is in siding position and prepares a point in the circuit to relay 7HP. At contacts 1285 and 1286 relay 8KR completes a circuit for operating relay 8D as follows: from positive battery, neutral contact 1285, polar contact 1286 in dotted position, conductor 1228, normally closed springs of contact 1213, conductor 1227, through the winding of relay 8D, conductor 1226, and through the associated resistance, to negative battery. At contact 1212 relay 8D completes a locking circuit for relay 8R by way of contacts 1208 and 1203, and at contact 1248 completes a locking circuit for relay 8C independent of contact 1209 of relay 8B. At contact 1263 relay 8D closes the following short-circuit around the winding of relay 8H: positive battery through the winding of relay 8H, conductor 1267, front contact 1263, conductor 1228, polar contact 1286, and neutral contact 1285 to positive battery. At contact 1213 relay 8D completes an obvious locking circuit for itself, and at contact 1214 prepares a point in its own release circuit. At contact 1216 relay 8D marks the stop conductor R1 and prepares a point in the release circuit for relay 8C. At contact 1217 relay 8D completes the circuit for energizing the signal-start relay SST by way of conductor 1262, contact 1207, conductors 1260 and 1258 and common start control L1. Relay 8H deenergizes in response to the short circuit closed around its winding and at contact 1256 switches the stop conductor R4 back to relay 6B by way of conductor 1269.

The operation of the signal-start relay SST causes the field station coding apparatus to transmit the return code 251 to the dispatcher's station as previously described. Relays 960 and 980 are energized to terminate the first and second digits of this code, and relay 990 connects the counting relay contacts of the coding unit to conductors of cable RC as previously described. Relay 878 energizes when digit-counting relay 801 is operated to terminate the third digit, which in this case comprises only one impulse since the conductor R1 has been marked as the stop conductor due to the operation of relay 8D. The third digit-stop relay 878 is operated over a circuit similar to that previously described and includes the front contact of digit-counting relay 801, conductor 1 of cable 800 which is connected to conductor R1 of cable RC and then by way of contact 1216 and 1206 to the resistance associated with relay 8C to negative battery. At contact 863 relay 878 connects positive battery directly to conductor 1221 over the circuit just traced to short circuit relay 8C and cause its deenergization. Relay 8C deenergizes in response to this short circuit and at contacts 1255 opens the locking circuit of relay 8G, which accordingly deenergizes. At contact 1204 relay 8C opens the original energizing circuit of relay 8R but this relay is now held in operated position over its locking circuit including contacts 1203, 1208, and 1212. At contact 1207 relay 8C opens the circuit to the signal-start relay SST whereupon the field station coding apparatus releases in the same manner as previously described.

In the dispatcher's station and in response to receipt of code 251, the dispatcher's step-by-step switch is operated to its first bank contact in the fifth level where the circuit is completed for operating relay C8 when the rotary series relay RS deenergizes after the last pulse of the third digit. The circuit for operating relay C8 may be traced as follows: from back contact 404, contact 401, switch wiper 402 in engagement with the first bank contact in the fifth level, conductor 51 of cable 50, through the normally closed springs controlled by contact 195, through the winding of relay C8, conductor 197, and the associated resistance to negative battery. At contact 191 relay C8 opens the circuit to relay F, and at contact 193 completes a circuit for steadily lighting the red lamp of signal 8SL as follows: from positive battery by way of front contact 192, contact 193 and through the lamp R of signal 8SL to negative battery. At contact 194 relay C8 connects positive pattery to conductor 178 to lock relay 8A in operated position by way of front contact 166 and conductor 180, and at contact 195 completes an obvious locking circuit for itself. Relay F deenergizes in response to the operation of relay C8 and at contact 281 opens the locking circuit of relay G to cause this latter relay to deenergize. At contact 282 relay F transfers the conductor 54 back to relay C6 and at contact 283 prepares a point in the circuit to relay C6. Relay G deenergizes in response to the deenergization of relay F, and at contact 291 opens the circuit to relay K. At contact 292 opens a point in the flashing circuit to the red lamp of signal 8SL which lamp is now steadily lighted. Relay K, upon deenergizing, at contact 295 opens the circuit of relay H which likewise deenergizes. The relays K and H are now restored to open the flashing circuit to the red lamp of signal 8SL and the operation of relay C8 has caused this particular lamp to light steadily to inform the dispatcher that the track switch TS at the field station has been fully operated to its siding position.

In case the motor SM operates the track switch TS to its siding position very quickly, the above-described flashing condition of the red signal 8SL on the dispatcher's panel may not take place. This may be accomplished in the following manner. As soon as the track switch TS starts to move relay 8KR deenergizes and relay 8H energizes, as previously described, to start the transmission of code 254. Now, if the track switch TS is completely operated before the code is completely sent, then relay 8KR is energized to operate relay 8D and deenergize relay 8H as previously described. Under this condition, with relay 8D energized and relay 8H deenergized, the marking of conductor R4 has been removed and in place thereof conductor R1 is marked with battery potential through the resistance associated with relay 8C by way of front contact 1206 and contact 1216. Therefore, the code transmitted instead of being 254 will be 251 which causes the red signal 8SL to light steadily as previously described.

At this time it may be advisable to explain that, if for some reason, track switch TS fails to start moving due to circuit fault or track conditions in the field after the dispatcher has transmitted the track switch operate code 251, the signal 8SL remains dark, thereby indicating to the dispatcher that the track switch TS has not started to operate. Signal 8SL remains dark because no return code is transmitted from the field station. Signal 8SL is flashed in case the track switch has started, and burns steadily when the track switch has been completely operated to its siding position as described.

It will now be assumed that for some reason the track switch TS fails to fully operate in which case relay 8KR is not reenergized to its reverse position, with the result that the dispatcher's signal 8SL continues to flash indicating to the dispatcher that the track switch TS is not fully operated. Ordinarily the dispatcher will release key 8 and reoperate a number of times to cause the track switch TS to start and return to normal a number of times in order to clear whatever obstruction, such as snow, ice, gravel, or other particles, which is preventing the complete operation of this track switch. The dispatcher will accordingly release the key 8 to cause the release of relay 8B in case the signal 8SL continues to flash. Relay 8B accordingly deenergizes and at contact 172 opens the original energizing circuit of relay A8 which is now held in operated position by way of contact 183. At contact 173 relay B8 completes a circuit by way of contact 185 and normally closed springs controlled by contact 195 for energizing relay C8. At contact 174 relay B8 marks conductor 2 of cable 70 and prepares a point in the release circuit for relay D8. At contact 176 relay B8 connects positive battery via front contact 188 to common start conductor 200 to energize start relay 340. Relay C8 energizes and at contact 191 opens the circuit to relay F which accordingly deenergizes, at contact 193 completes the circuit for lighting the red lamp R of signal 8SL by way of front contact 182, and at contact 194 completes the locking circuit for relay 8A and at contact 195 completes its own locking circuit. Relay F deenergizes in response to the operation of relay C8 and causes the release of relays G, H, and K as previously described, to open the flashing circuit to the red lamp of signal 8SL.

In response to the operation of start relay 340 the dispatcher's coding unit transmits the release code 252 to the field station in the same manner as previously described. Relays 460, 480, and 678 operate to terminate the first, second, and third digits. The circuit for operating third digit-stop relay 678 may be traced as follows: from positive battery through the upper operating winding of relay 678, over the previously traced circuit to front contact 622 of relay 602, conductor 482 of cable 80, contact 492, conductor 2 of cable 70, and thence through contacts 174, 186, conductor 190 and associated resistance to negative battery. At contact 694 relay 678 connects positive battery to this circuit to short circuit relay D8 by way of conductor 189 and front contact 187. Relay D8 accordingly deenergizes in response to this short circuit and at back contact 181 recloses the circuit to relay F, and at contact 182 opens the circuit to the red lamp of signal 8SL, whereby this signal now remains dark. At contact 188 relay D8 opens the circuit to stop relay 340 to cause the release of the dispatcher's coding apparatus as previously described. The operation of relay F in response to the deenergization of relay D8 is without effect at this time, since relay G does not reoperate.

In the field station and in response to the receipt of code 252 transmitted thereto from the dispatcher's station relays 920, 930, and 8B operate for the first, second, and third digits in a manner similar to that previously described. Relay 8B is operated in response to the third digit over the following circuit: from positive battery, contact 711, conductor 708, back contact 762, conductor 715, back contacts 826 and 821, front contact 822, conductor 2 of cable 800, contact 932, conductor O2 of cable OC, normally closed springs controlled by contact 1209, through the winding of relay 8B, conductor 1225, and associated resistance to negative battery. At contact 1252 relay 8B maintains relay 8H in energized position, at back contact 1209 opens the locking circuit of relay 8C to cause this latter relay to deenergize, and at front contact 1209 completes its own locking circuit. At contact 1210 relay 8B marks conductor R2 and prepares a short circuit around relay 8B and at contact 1211 connects positive battery at back contact 1217 to common start conductor L1 by way of conductors 1260 and 1258 to operate the signal-start relay SST. Relay 8C deenergizes and at contacts 1255 opens the locking circuit of relay 8G, which accordingly deenergizes. At contact 1204 relay 8G opens the circuit of relay 8R which likewise deenergizes, and at contact 1251 opens the circuit to relay 8H which is now held operated over contacts 1252. Relay 8G deenergizes, and at contact 1254 closes an additional circuit for signal-start relay SST by way of contact 1257. Relay 8R deenergizes in response to the release of relay 8C and at contacts 1201 and 1202 reverses the battery connection to relay 8WR to operate this relay to its normal position or the position shown in the drawings. Relay 8WR therefore in the well known manner at contact 1270 operates the motor SM to cause the track switch TS to be returned to its normal position. When the track switch TS reaches its normal position switch contacts 1276 and 1277 are operated to their full line position to cause the operation of relay 8KR. Relay 8KR operates its contacts to the positions shown in the drawings. At contacts 1285 and 1286 relay 8KR completes the previously traced short circuit around the winding of relay 8H to cause the deenergization of this relay.

In response to the operation of the signal-start relay SST the field station coding apparatus transmits the release code 252 to the dispatcher's station whereby relays 960, 980, 990, and 878 operate to terminate the first, second, and third digits as previously described. Third digit-stop relay 878 is operated over a circuit including the stop conductor R2, contacts 1215 and 1210, and the resistance associated with relay 8B to negative to battery. At contact 863 relay 878 connects positive battery to the winding of relay 8B to close a short circuit around this relay and cause its deenergization. Relay 8B accordingly deenergizes and at contact 1211 opens the circuit to the signal start relay SST whereupon the field station coding apparatus is restored to normal as previously described. In response to this return code all of the posiiton control relays associated with the track switch TS are now in normal posiiton.

In the dispatcher's office, and in response to code 252 transmitted thereto from the field station, the vertical and rotary step-by-step switch wiper 402 is rotated to the second bank contact in the fifth level to complete a circuit for short circuiting relay C8 in a manner similar to that previously described. This short circuit may be traced as follows: from positive battery, back contact 404, contact 401, switch wiper 402 in engagement with the second bank contact in the fifth level, conductor 52 of cable 50, conductor 197 through the winding of relay C8 to positive battery at front contact 195. Relay C8 accordingly deenergizes and at contact 191 opens the circuit to relay F which likewise deenergizes. At contact 192 relay C8 lights the green lamp of signal 8SL and at contact 194 opens the locking circuit of relay A8 which accordingly deenergizes. The release of relay A8 restores the circuit at the dispatcher's panel to normal.

All of the apparatus at both the dispatcher's station and the field station are now back to normal, and if key 8 is again operated and the signal 8SL again flashes because the track switch TS is not fully operated, the dispatcher will again release key 8 to cause the apparatus to again restore. The dispatcher may continue to operate and release key 8 until such time as the obstruction is removed or falls away and the track switch TS is fully operated which is indicated by the steady lighting of the red lamp 8SL as previously described. In case the dispatcher fails to ultimately operate track switch TS then such dispatcher will take the necessary steps in accordance with the usual practice to have this trouble remedied.

Assuming now that the track switch TS has moved to siding position and that the dispatcher desires to route a train from track section 9 to section 7 over the operated track switch TS. In the dispatcher's station, it will be remembered that relays B8, A8, C8, and D8 are in operated position and that signal 8SL shows red in its operated position, while in the field station relays 8R and 8D are in operated position, relay 8KR is in reversed position, and track switch TS is in its siding position.

In order to permit a train to proceed from section 9 over track switch TS to section 7, the dispatcher operated the key 9 after the track switch TS has been operated. In response to the operation of key 9 relays B9 and A9 are operated in the same manner as previously described. At contact 136 relay B9 operates the start relay 340 to cause the dispatcher's coding apparatus to send the code 257 and operate relay D9 as previously described. Relay D9, upon energizing, at contact 141 extinguishes the red lamp of signal 9SSL and prepares a point in the circuit for lighting the yellow lamp Y of signal 9SSL. At contact 137 relay D9 opens the circuit to start relay 340 whereupon the dispatcher's coding apparatus is released as previously described.

In the selected field station and in response to code 257 relays 9C and 9R are operated as previously described. The operation of relay 9R, at this time since the track switch TS is in its siding position, completes a circuit for operating relay C9H as follows: from positive battery, contacts, 1272, 1278, 1361, 1452, 1179, 1102, 1180, 1281, polar contact 1282 in dotted position, conductor 1147, and through the winding of relay C9H to negative battery. At back contact 1162 relay C9H extinguishes the red lamp of signal 9SS and at front contacts thereof completes the circuit for lighting the yellow lamp of signal 9SS. At contact 1163 relay C9H opens the circuit of relay 9NP and at contact 1164 completes a circuit by way of conductor 1128 for operating relay 9D. Relay 9NP releases in response to the operation of relay C9H and at contact 1168 opens the locking circuit of relay 9S which accordingly deenergizes. Relay 9S deenergizes and opens the circuit to certain of the interlock relays to prevent conflicting operations at that time. Relay D9, upon energizing, at contact 1117 completes the previously traced circuit for signal-start relay SST whereupon the field station coding apparatus sends the return code 257, causes the release of relay 9C, and causes the operation of relay C9 in the dispatcher's office in the same manner as previously described.

Since relay A8, Fig. 1, is operated at this time the operation of relay C9 now completes the circuit for lighting the yellow lamp of signal 9SSL as follows: from positive battery, back contact 105, conductor 155, front contact 141, contact 152, front contact 165, and through the yellow lamp Y to negative battery. The siding signal 9SS in the field station is now set to allow a train to proceed over track switch TS to section 7 and the corresponding signal 9SSL at the dispatcher's panel is set correspondingly with the yellow lamp illuminated, while at the same time the combination key and signal 8SL is shown in operated position with the red light burning to indicate that the track switch TS is in siding position.

The signalling operations which take place as the train proceeds from section 9 through section 8 over the track switch TS to section 7 is similar to that previously described and will thereupon only be briefly described in the following. When a train enters section 9 track relay 9T deenergizes to operate track signal relay 9F which causes the field station to transmit the code 268 after which the track signal relay 9E is operated. In the dispatcher's station and in response to the code 268 the track indicating relay 9TIR operates to light the track pilot lamp 9TPL to indicate to the dispatcher the arrival of a train in section 9. When a train enters section 8 track relay 8T deenergizes causing the operation of track-signal relay 8F which causes the operation of the field station coding apparatus to send the code 262 to the dispatcher's station after which relay 8E is operated. In the dispatcher's station track indicating relay 8TIR and relay 8TR are operated in response to receipt of code 262. Track indicating relay 8TIR lights the track pilot lamp 8TPL as before to indicate to the dispatcher the arrival of the train in section 8. In the field station the deenergization of track relay 8T causes the release of relay 8TS and the latter relay at contact 1272 opens the circuit to relay C9H. Relay C9H, upon deenergization, at contact 1162 changes the track-signal 9SS from yellow to red to prevent a second train from entering section 8 at this time. At contact 1163 relay C9H reoperates relay 9NP and at contacts 1164 short circuits relay 9D which accordingly deenergizes. The short circuit around relay 9D may be traced as follows: from positive battery, back contact 1164, conductor 1129, back contact 1161, contact 1114, conductor 1126, through the winding of relay 9D, conductor 1127, to positive battery at contact 1113. Relay 9NP energizes in response to the release of relay C9H to cause the reoperation of relay 9S which accordingly locks itself in operated position.

In the dispatcher's panel and in response to the operation of relay 8TR front contact 104 completes a circuit by way of conductor 148 for lighting the red lamp of signal 9SSL, and at back contact 105 extinguishes the yellow lamp of signal 9SSL. The dispatcher's signal 9SSL is therefore set to correspond with the signal 9SS in the field.

When the train leaves track section 9, track relay 9T reenergizes to release relay 9F and send the code 267 to the dispatcher's station at which time relay 9E deenergizes and relay 9TIR at the dispatcher's station is released to extinguish the track-pilot lamp 9TPL as previously described.

When the train enters section 7, track relay 7T deenergizes and at contact 1359 operates track signal relay 7F by way of conductors 1340 and 1341 and back contact 1330. At contact 1334 relay 7F locks itself, at contact 1335 marks conductor T6 and prepares the circuit for 7E, and at front contact 1337 connects positive battery by way of back contact 1333 and conductors 1345 and 1346 to the common start conductor KI for operating the train start relay TST. The train-start relay TST causes the field station coding apparatus to send the code 266 in a manner similar to that previously described, after which relay 7E is operated to terminate the third digit of the code. Relay 7E operates over the following circuit: from positive battery by way of contact 761, conductor 714, contact 863, conductor 715, front contact 826, conductor 837, to conductor 7 of cable 800, which is connected to conductor T6 of cable TIC by way of operated contacts 906 and thence by way of contact 1335, conductor 1342, normally closed springs of contact 1331, conductor 1339, through the winding of relay 7E, conductor 1338 and associated resistance to negative battery in response to the operation of the third digit-stop relay 878. At contact 1330 relay 7E transfers the locking circuit of relay 7F to contact 1359, at contact 1331 completes its own locking circuit, and at contact 1333 opens the circuit to the train-start relay TST, whereupon the field station coding apparatus is released in the same manner as previously described.

In the dispatcher's office and in response to the receipt of code 266 the dispatcher's step-by-step switch is operated to the sixth bank contact in the sixth level to complete a circuit for energizing track-indicating relay 7TIR as follows: from positive battery, back contact 404, contact 401, switch wiper 402 in engagement with the sixth bank contact in the sixth level, conductor 66, and through the winding of relay 7TIR and the associated resistance to negative battery. At contact 321 relay 7TIR completes the circuit for lighting the train pilot lamp 7TPL on the dispatcher's panel, at contact 322 completes an obvious locking circuit for itself, and at contact 323 prepares a point in its own release circuit.

When the train leaves track section 8 track relay 8T reenergizes, and at contact 1287 completes the previously traced circuit for energizing relay 8TS. At contact 1249 relay 8T opens the circuit to polar relay 10HD and at contact 1289 opens the locking circuit of relay 8F. Relay 8TS, upon energizing, at contact 1271 completes its own locking circuit and at contact 1272 operates relay C9H over the previously traced circuit. Relay 10HD energizes in response to the closure of contacts 1249, and at contacts 1150 and 1151 maintains the circuit of relay 9NP. Relay C9H reenergizes in response to the operation of relay 8TS, and at contact 1162 extinguishes the red lamp and lights the yellow lamp of signal 9SS. At contact 1163 relay C9H opens the circuit to relay 9NP and at contact 1164 operates relay 9D over the previously traced circuit. Relay 9NP deenergizes and at contact 1168 opens the circuit to relay 9S which likewise deenergizes. Relay 9D energizes and at contact 1113 completes a locking circuit for itself but does not send a code at this time because neither relays 9C or 9B are energized. Train-start relay TST is energized when relay 8F deenergizes to cause the field station coding apparatus to transmit the code 261 to the dispatcher's station after which relay 8E is released as previously described.

In the dispatcher's station and in response to the receipt of code 261 the dispatcher's coding apparatus and switch cause the release of track-indicating relay 8TIR and relay 8TR as previously described. When relay 8TR deenergizes this relay at contact 105 extinguishes the red lamp and lights the yellow lamp of signal 9SSL on the dispatcher's panel. This circuit includes the back contact 105, conductor 155, and contacts 141, 152, and 165.

When the train leaves track section 7 track relay 7T reenergizes and at contact 1359 opens the locking circuit of relay 7F. Relay 7F deenergizes and at contact 1336 marks conductor T5 and prepares a point in the release circuit for relay 7E. At contact 1337 relay 7F completes the circuit for operating train-start relay TST by way of front contact 1333, conductor 1344, back contact 1337, conductor 1346 and common conductor KI. Train-start relay TST, upon energizing, causes the field station coding apparatus to transmit the code 265 to the dispatcher's office and causes the release of relay 7E in response to the operation of the third digit-stop relay 878. Third digit-stop relay 878 is energized over the following circuit: from positive battery, through the upper operating winding of relay 878, front contact 880, conductor 716, front contact 762, conductor 715, back contacts 826, 821, 822, 823, and 824, front contact 825, conductor 5 of cable 800 which is connected to cable T5 of cable TIC over operated contact 905, contacts 1336 and 1332, and through the associated resistance to negative battery. Relay 7R deenergizes when the third digit stop relay at contact 863 connects positive battery at contact 761 to this circuit. The short circuit for relay 7E continues by way of conductors 1338 and 1339 and contact 1441. Relay 7E, upon deenergizing, at contact 1333 opens the circuit to the train-start relay TST whereupon the field station coding apparatus is released in the same manner as previously described.

In the dispatcher's station and in response to the receipt of code 265 the dispatcher's coding apparatus and switch operate in the same manner as previously described to short circuit relay 7TIR. The dispatcher's switch is operated into engagement with the fifth bank contact in the sixth level and completes a circuit over conductor 65 of cable 60 to short circuit track-indicating relay 7TIR to cause this relay to deenergize. At contact 321 relay 7TIR opens the circuit to the track-pilot lamp 7TPL on the dispatcher's panel.

In case the dispatcher desires only one train to pass from track section 9 to track section 7, then the dispatcher will operate the stick key 9S at the time key 9 is operated. The operation of stick key 9S causes the operation of relay S9, so that relay B9 is placed under control of relay TR as previously described. Relay 8TR, as will be remembered, is operated when a train enters section 8 and the operation of this relay releases relay B9 which cannot again energize since relay S9 is held operated by key 9. The release of relay B9 send the release code 258 to the field station, thereby causing relays 9R and C9H to deenergize and the siding signal 9SS is set in stop position in a manner apparent from the foregoing description. In the dispatcher's office the return code transmitted from the field station causes the release of relays C9 and A9 whereby the corresponding signal 9SSL on the panel has its red lamp illuminated. Only one train can therefore pass from track section 9 to section 7 since the siding signal 9SS at the field station is now red and the corresponding signal 9SSL at the dispatcher's panel is also red.

Having described the operation of the apparatus and circuits in connecting with routing trains from left to right, a description will now be given of the operations necessary for routing trains from right to left. For this purpose it will be assumed that all of the apparatus are in their normal positions or the positions shown in the drawings, and that the dispatcher desires to route a train from track section 6 to track section 9. The dispatcher accordingly operates K6 provided there are no conflicting conditions. In response to the operation of key 6 relay B6 is operated over the following circuit: from positive battery by way of contact 244 of key 6, conductor 115, contact 122, conductor 116, contact 162, conductor 117, and through the winding of relay B6 to negative battery. At contact 251 relay B6 completes the circuit for operating relay A6 over conductor 218, at contact 253 prepares the circuit for relay B6 and marks conductor 3 of cable 70, and at front contact 254 connects positive battery by way of conductor 245 and back contact 267 to the common start conductor 200 to operate the start relay 340. In the same manner as previously described the operation of start relay 340 causes the dispatcher's coding apparatus to transmit the code 253 to the field stations since at this time the No. 3 conductor of cable 70 is the conductor marked by the operation of relay B6. Relay D6 is operated over conductor 3, contact 253, the normally closed springs controlled by contact 266, the winding of relay D6, and the associated resistance to negative battery in response to the operation of the third digit-stop relay 678 at a time when the third counting relay 603 is in operated position in a manner which is apparent from the foregoing description. At back contact 261 relay D6 extinguishes the red lamp of signal 6SL, at contact 262 holds relay A6 in operated position, at contact 265 prepares a point in its own release circuit, at contact 266 locks itself, and at contact 267 opens the previously traced circuit to start relay 340 whereupon the dispatcher's coding apparatus releases in the same manner as previously described.

In the field stations and responsive to code 253 the field station coding apparatus of field station No. 25 is operated as previously described to operate relay 6C as follows: from positive battery at contact 711, Fig. 7, over 708, 762, 715, 826, 821, 822, 823, conductor 3 of cable 800, now connected to cable O3 by way of operated contacts 933, through the normally closed springs controlled by contact 1405, conductor 1420, through the winding of relay 6E, conductor 1421, and associated resistance to negative battery. Relay 6E, upon energizing, at contact 1404 operates relay 6R over conductor 1418, and at contact 1405 completes its own locking circuit by way of back contact 1409. Relay 6R energizes and at contact 1403 completes a locking circuit for itself by way of contacts 1408 and 1409. At contact 1407 relay 6R completes the circuit for energizing relay 6HP if there are no conflicting track conditions. This circuit may be traced as follows: from positive battery, contacts 1272 and 1278, 1361, 1373, 1354, 1183, 1172, 1283, 1284, 1362, 1402, and through the winding of relay 6HP to negative battery. At back contact 1458 relay 6HP extinguishes the red lamp of signal 6S and at front contact 1458 completes a circuit by way of conductor 1368 and contacts 1353 and 1352 for lighting the green lamp of signal 6S. At contact 1459 relay 6HP opens the circuit of 6NP, whereupon the latter relay deenergizes. At contact 1460 relay 6HP operates relay 6D over the following circuit: from positive battery, front contact 1460, conductor 1428, through the winding of relay 6D, conductor 1426, and associated resistance to negative battery. Relay 6NP deenergizes and at contact 1457 opens the locking circuit of relay 6S, which accordingly deenergizes. Relay 6S deenergizes and at contact 1451 opens a point in the circuit to relay 8WR to prevent its operation. At contact 1452 relay 6S likewise opens the circuit to relays 9HP or C9H to prevent their operation, and at contacts 1453 opens a point in the circuit to relay 10HD. The deenergization of relay 10HD at this time is without effect since contact 1151 maintains the circuit of relay 9NP. Relay 6D, upon energizing, at contact 1412 prepares a new locking circuit for relay 6C, at contact 1413 completes its own locking circuit, at contact 1414 prepares a point in its own release circuit, at contact 1416 marks stop conductor R3 and prepares the release circuit for relay 6C, and at contact 1417 completes a circuit by way of contact 1407 and conductor 1422 over the common start lead L1 for operating the signal-start relay SST. In response to the operation of the signal-start relay SST, the field station coding apparatus transmits the code 253, since the stop conductor R3 is marked by the operation of relay 6D. The third digit-stop relay 878 of the coding apparatus operates over a circuit similar to that previously traced when the third counting relay 803 is operated. This circuit includes stop conductor R3, contacts 1416 and 1406, through the resistance associated with relay 6C and negative battery. Relay 6C is released in response to the third digit-stop relay 878 connecting positive battery to this circuit, thereby short-circuiting relay 6C in a manner apparent from the foregoing description. At contact 1404 relay 6C, upon deenergizing, opens the original circuit of relay 6R but this latter relay is now held in operated position over contacts 1403, 1408, and 1409. At contact 1407 the release of relay 6C opens the circuit to the signal-start relay SST whereupon the field station coding apparatus releases as previously described.

In the dispatcher's station and in response to code 253 the wiper of the dispatcher's vertical and rotary step-by-step switch is operated to the third bank contact in the fifth level to operate relay C6 over the following circuit: from back contact 104, contact 401, wiper 402 in engagement with the third bank contact in the fifth level, conductor 53 of cable 70, contact 283, conductor 229, normally closed springs controlled by contact 274, through the winding of relay C6 and the associated resistance to negative battery. Relay C6 energizes and at contact 272 completes the circuit for lighting the green lamp of signal 6SL as follows: from positive battery, back contact 102, conductor 119, front contacts 261 and 272, and through the green lamp of signal 6SL to negative battery. At contact 273 relay 6B closes another holding circuit for relay A6 and at contact 274 completes its own locking circuit.

From the foregoing it will be seen that in response to the operation of key 6 the corresponding track signal S6 in the field is operated to proceed (green) position and the corresponding signal 6SL at the dispatcher's panel is correspondingly operated.

When the train enters section 6 the deenergization of track relay 6T causes the coding apparatus to operate track indicating relay 6TIR to light the track pilot lamp 6TPL on the dispatcher's panel as previously described.

When a train enters section 8 track relay 8T deenergizes to cause the track-indicating relay 8TIR and relay 8TR to operate and light the track-pilot lamp 8TPL, as previously described. The deenergization of track relay 8T also causes the deenergization of relay 8TS as previously described and the latter relay at contact 1272 opens the circuit to relay 6HP. Relay 6HP, upon deenergizing, at contact 1458 extinguishes the green lamp and lights the red lamp of signal 6S, at contact 1459 closes the circuit for operating relay 6NP, and at contact 1460 short circuits relay 6D by way of conductor 1429 and contact 1414. Relay 6NP operates over its normally closed circuit and at contact 1457 completes the circuit for operating relay 6S which reenergizes and locks itself at contact 1455. The circuit for operating relay 6S may be traced as follows: from positive battery, contact 1457, conductor 1366, contact 1275, conductor 1365, conductor 1470, and through the winding of relay 6S to negative battery.

In the dispatcher's office relay 8TR at contact 102 extinguishes the green lamp and lights the red lamp of signal 6SL over conductor 118. In accordance with the usual procedure the track signal 6S in the field has its red lamp lighted as long as there is a train in section 8 and the corresponding signal 6SL at the dispatcher's panel is correspondingly operated.

When the train leaves track section 6 track relay 6T energizes, track signal relays 6F and 6E release, and the field station coding apparatus transmits the code 263 to the dispatcher's station causing the deenergization of track indicating relay 6TIR to extinguish the track pilot lamp 6TPL as previously described. When the train enters section 9 track pilot lamp 9TPL at the dispatcher's panel is lighted in the same manner as previously described. In a similar manner when the train leaves section 8 track relay 8T energizes and causes the track pilot lamp 8TPL at the dispatcher's panel to be extinguished and causes the release of relay 8TR. The release of relay 8TR extinguishes the red lamp and lights the green lamp of signal 6SL as previously described.

Relay 8TS operates in response to the operation of relay 8T and at contact 1271 locks itself in operated position and at contact 1272 reoperates relay 6HP over the previously traced circuit. At front contact 1458 relay 6HP completes the circuit for green or yellow lamp of signal 6S dependent upon the operated condition of relay 6—1HD which relay is operated in the usual manner in accordance with track conditions beyond section 9. At contact 1459 relay 6HP opens the circuit of relay 6NP which accordingly deenergizes. At front contact 1460 relay 6HP causes the reenergization of relay 6D. The operation of relay 6D at this time does not send a code because relay 6C is not operated. Relay 6NP deenergizes in response to the operation of relay 6HP and at contact 1457 opens the circuit of relay 6S which accordingly deenergizes, thereby leaving the interlock relays and apparatus the same as before the train entered section 6.

In the dispatcher's station the deenergization of relay 8TR at contacts 102 changes the signal 6SL from red to green. Although the green lamp of the dispatcher's signal 8SL is lighted, the dispatcher knows that the distant track signal 6S is operated to caution, or the yellow lamp is lighted, as long as the train is in section 9, which is indicated to the dispatcher by the track-pilot lamp 9TPL.

When the train leaves section 9 the field station coding apparatus transmits the code 267 to extinguish the track-pilot lamp 9TPL as previously described. Relay 6—1HD is also controlled in the well known manner from the circuit associated with the more distant track sections to extinguish the yellow lamp and light the green lamp of signal 6S. All of the apparatus is now set to allow a second train to proceed from section 6 to section 9. If desired a stick key and associated relay may be provided, similar to key 9S and relay S9, for key 6 to allow only one train to proceed through signal 6S as described for section 9.

In order to restore the distant signal 6S to red, or stop position, the dispatcher will release key 6 on the panel. The operations which take place in response to the release of key 6 are similar to those described for the release of key 9. When key 6 is restored the circuit to relay B6 is opened, whereupon the latter relay deenergizes. At contact 255 relay B6 marks stop conductor 4 of cable 70, and prepares the release circuit for relay D6. At contact 254 relay B6 connects positive battery through front contact 267 to common start conductor 200 to energize start relay 340. In the same manner as previously described the energization of start relay 340 causes the dispatcher's coding apparatus to send the code 254 to the field station. The last digit in this case is the digit 4 because due to the release of relay B6 the conductor 4 of cable 70 is marked with negative battery by way of contacts 255 and 265. In response to the operation of digit-counting relay 804, stop conductor 4 completes the circuit for stop relay 678 and the latter relay at contact 694 connects positive battery to conductor 4 of cable 70 to short-circuit relay D6 in a manner apparent from the foregoing description. At contact 261, relay D6 upon deenergizing, opens the circuit of the green lamp of signal 6SL, thereby leaving this signal dark. At contact 267 relay D6 opens the circuit to start relay 340, whereupon the dispatcher's coding apparatus is released in the manner previously described.

In the field station No. 25 and in response to code 254 transmitted thereto, relay 6B is operated over the following circuit: from positive battery by way of contacts 711, Fig. 7, 708, 762, 715, 826, 821, 822, 823, 824, conductor 4 of cable 800, operated contact 934, conductor O4 of cable OC to Fig. 14, through the normally closed springs controlled by contact 1409, conductor 1424, winding of relay 6B, conductor 1425, and through the associated resistance to negative battery. At contact 1408 relay 6B opens the circuit of relay 6R which accordingly deenergizes, and at contact 1409 completed an obvious locking circuit for itself. Relay 6R deenergizes, and at contact 1402 opens the circuit of relay 6HP which likewise deenergizes. At back contact 1458 relay 6HP lights the red lamp of signal 6S, thereby setting this signal to stop position. At contact 1459 relay 6HP closes the circuit for operating relay 6NP and at contact 1460 completes a short circuit for relay 6D by way of conductor 1429 and contact 1414. Relay 6NP, upon energizing, and at contact 1456 completes the circuit for operating the time element relay 8TER as follows: from positive battery, contact 1456 by way of 1190, 1169, 1191, 1454, 1192, 1274, and through the winding of time element relay 8TER to negative battery.

Relay 6D deenergizes in response to the short circuit closed around its winding by the deenergization of relay 6HP and at contact 1415 marks conductor R4, and prepares the release circuit for relay 6B. At contact 1417 relay 6D completes a circuit by way of contact 1411, conductor 1423, and the common start lead L1 for operating the signal-start relay SST. In response to the operation of the signal-start relay SST, the field station coding apparatus transmits the code 254 since the conductor R4 was marked by the deenergization of relay 6D. At the end of code transmission and in response to the operation of the third digit-stop relay 878, as previously described, relay 6B is short circuited as follows: from positive battery by way of 761, 714, 863, 715, 826, 821, 822, 823, 824, conductor 4 of cable 800, operated contact 994, conductor R4 at cable RC, back contact 1256, conductor 1269, contacts 1415 and 1410, conductor 1425, winding of relay 6B, conductor 1424, and through the front contact 1409 to positive battery. Relay 6B accordingly deenergizes and at contact 1411 opens the circuit to the signal-start relay SST whereupon the field station coding apparatus releases in the same manner as previously described.

The time-element relay 8TER operates in the well known manner in response to the operation of relay 6NP, and at contact 1278 opens the operating circuit as previously described to prevent the changing of signals or the operation of track switch TS. At contact 1280 time element relay 8TER completes the circuit for operating relay 6S as follows: from positive battery, contact 1457, conductor 1366, contact 1280, conductor 1365, conductor 1470, and through the winding of relay 6S to negative battery. Relay 6S accordingly reenergizes and at contact 1451 prepares a point in the circuit to relay 8WR which circuit is now opened at contact 1278 of the time-element relay. At contact 1452 relay 6S prepares points in the circuit to relays 9HP or C9H also including contact 1278 on the time-element relay and at contact 1453 operates relay 10HD to maintain relay 9NP in operated position. At contact 1454 relay 6S opens the circuit of time element relay 8TER and at contact 1455 completes its own locking circuit to contact 1357. Time-element relay 8TER releases its operated contacts in the well known manner, and contact 1278 prepares various operating circuits for certain of the interlock relays. Contact 1280 opens the original energizing circuit of relay 6S but the latter relay is now locked in operated position over its locking contact 1566. All of the circuits and apparatus at the field station are now in normal position.

In the dispatcher's office and in response to code 254 transmitted thereto the switch wiper of the vertical and rotary step-by-step switch is operated into engagement with the fourth contact in the fifth level to complete a short circuit around the winding of relay 6C. This circuit may be traced as follows: from positive battery, back contact 404, contact 401, switch wiper 402 in engagement with the fourth back contact in the fifth level, conductor 54 of cable 50, back contact 282, conductor 220, through the winding of relay 6C to front contact 214 and positive battery. At contact 271 relay 6C, upon deenergizing, again completes the normally closed circuit for lighting the red lamp for signal 6SL, and at contact 273 opens the circuit of relay A6 which accordingly deenergizes. Relay A6, upon deenergizing, at contacts 241 and 243 prepares points in the circuits for operating relays B8 and B9. All of the apparatus at the dispatcher's station is now in normal position and may be used as desired.

In order for the dispatcher to allow trains to proceed from track section 7 to track section 9 over the track switch TS, the dispatcher must first operate key 8 to set track switch TS to its siding position before the operation of key 7 is effective. In response to the operation of key 8 relays B8, A8, and C8 in the dispatcher's station are operated and relays 8R, 8WR, 8KR, 8D, and the track switch TS in the field station are operated as previously described. After the above operation has taken place the dispatcher may operate key 7 to cause the operation of relay B7 over the following circuit: from positive battery by way of contact 216 of key 7, conductor 110, contact 121, conductor 113, contact 161, conductor 114, and through the winding of relay B7 to negative battery. At contact 211 relay B7 completes the circuit for operating A7 by way of conductor 206, at contact 214 marks stop conductor 5 and prepares the circuit for relay D7, and at contact 215 completes a circuit by way of conductor 216, back contact 227, and common start conductor 200 for operating start relay 340. At contact 202 relay A7 maintains relay B8 in operated position over conductor 126 and contact 171 independent of the operated condition of key 8, and at contact 203 opens the circuit to relay B9 to render the operation of key 9 ineffective.

In a manner similar to that previously described the operation of the start relay 340 causes the dispatcher's coding apparatus to transmit the code 255 to the field stations. The last digit of this code is digit 5 because due to the operation of relay B7 the No. 5 conductor of cable 70 has been marked as the stop conductor. Third digit stop relay 678 and relay D7 energize to terminate the third digit in a manner apparent from the foregoing description. Relay D7, upon energizing, at contact 221 opens the circuit to the red lamp of signal 7SL, at contact 222 holds relay A7 in operated position, at contact 226 completes its own locking circuit, and at contact 227 opens the circuit of start relay 340, whereupon the dispatcher's coding apparatus is released in the same manner as previously described.

In a manner similar to that previously described the coding apparatus in the selected field station responds to code 255 to energize relay 7C over the following circuit: from positive battery by way of 711, 708, 762, 715, 826, 821, 822, 823, 824, 825, conductor 5 of cable 800, operated contact 935, conductor O5 of operate cable OC, through the normally closed springs controlled by contact 1305, conductor 1320, winding of relay 7C, conductor 1321 and the associated resistance to negative battery. At contact 1304 relay 7C completes the circuit for operating relay 7R by way of conductor 1318, and at contact 1305 completes its own locking circuit to positive battery at contact 1309. Relay 7R energizes and at contact 1303 completes a locking circuit for itself by way of back contacts 1309, 1308. At contact 1302 relay 7R completes the following circuit for operating relay 7HP: from positive battery, contacts 1272 and 1278, 1361, 1373, 1354, 1183, 1172, 1184, neutral contact 1283, polar contact 1284 in dotted position, conductor 1363, contact 1302, conductor 1374, and through the winding of relay 7HP to negative battery. At back contact 1355 relay 7HP opens the circuit to the red lamp of signal 7S, and at front contact 1355 completes the circuit for lighting the yellow lamp of signal 7S by way of contacts 1351 and 1350. At contact 1356 relay 7HP opens the normally closed circuit of relay 6NP, and at contact 1357 completes the following circuit for operating relay 7D: from positive battery, front contact 1367, conductor 1328, through the winding of relay D, conductor 1326, and associated resistance to negative battery. Relay 6NP deenergizes and opens the circuit of relay 6S at contact 1457, and the latter relay deenergizes to accomplish the same functions as previously described. Relay 7D, upon energizing over the above-traced circuit, at contact 1312 completes a new holding circuit for relay 7C, at contact 1313 completes its own locking circuit, at contact 1314 prepares its own release circuit, at contact 1316 marks the stop conductor R5 and prepares a short circuit for relay 7C, and at contact 1317 completes a circuit by way of contact 1307, conductor 1322, common start conductor L1 to energize the signal-start relay SST.

In a manner similar to that previously described, the operation of the signal-start relay SST causes the field station coding apparatus to transmit the return code 255 to the dispatcher's station and to release relay 7C. The circuit for releasing circuit 7C includes positive battery connected to release conductor R5 through contacts of the fifth digit-counting relay 805 and the third digit-stop relay 878. Positive battery connected to conductor R5 short circuits relay 7C by way of contacts 1316 and 1306, conductor 1321, winding of relay 7C, conductor 1320, front contact 1305, conductor 1319, and by way of back contact 1309 to positive battery. Relay 7C accordingly deenergizes, and at contact 1304 opens the original energizing circuit of relay 7R now held in operated position over its locking circuit, and at contact 1307 opens the circuit to the signal-start relay SST which deenergizes and releases the field station coding apparatus as previously described.

In the dispatcher's station and in response to the return code 255, the dispatcher's vertical and rotary step-by-step switch is operated into engagement with the fifth bank contact in the fifth level to complete a circuit for energizing relay C7 when the rotary series relay RS of the dispatcher's switch deenergizes. This circuit may be traced as follows: from positive battery, back contact 404, contact 401, switch wiper 402 in engagement with the fifth bank contact in the fifth level, conductor 55 of cable 50, the normally closed springs controlled by contact 234, and through the winding of relay C7 and associated resistance to negative battery. At contact 232 relay C7 completes the circuit for lighting the yellow lamp of signal 7SL as follows: from positive battery, bank contact 101, conductor 109, front contacts 221 and 232, and through lamp Y of signal 7SL to negative battery. At contact 233 relay C7 maintains relay A7 in operated position and at contact 234 completes its own locking circuit. From the foregoing it will be seen that in response to the operation of key 7 the code 255 has been transmitted to the field station to change the track signal 7S to light the yellow lamp and in response thereto the return code 255 has been transmitted back to the dispatcher's station to cause the corresponding signal 7SL to light its yellow lamp. When the yellow lamp of signal 7SL lights the dispatcher knows that the corresponding signal in the field has been set to proceed position.

When the train enters section 7 track relay 7T deenergizes and operates track signal relay 7F, which completes the circuit for the train-start relay TST to cause the field station coding apparatus to transmit the code 266 to the dispatcher's office after which relay 7E is operated in a manner similar to that previously described.

In the dispatcher's station and in response to the code 266 the dispatcher's vertical and rotary step-by-step switch is operated to the sixth bank contact in the sixth level to complete a circuit over conductor 66 of cable 60 for operating track-indicating relay 7TIR, to light the track pilot lamp 7TPL in the same manner as previously described.

When the train enters section 8 track relay 8T deenergizes and causes the field station coding apparatus to transmit the code 262 as before to cause the operation of track-indicating relay 8TIR and light track pilot lamp 8TPL. Relay 8TR, Fig. 1, also operates and at contact 101 extinguishes the yellow lamp and lights the red lamp of signal 7SL by way of conductor 108. In the same manner as previously described the deenergization of track relay 8T opens the circuit of relay 8TS which deenergizes and opens the circuit to relay 7HP at contact 1272. Relay 7HP, upon deenergizing, at contact 1355 lights the red lamp of signal 7S, at contact 1356 completes the circuit for operating relay 6NP, and at contact 1357 short-circuits relay 7D by way of conductor 1329 and contact 1314 to cause this latter relay to deenergize. In the same manner as previously described relay 6NP energizes and at contact 1457 completes a circuit by way of closed contact 1275 of relay 8TS for operating relay 6S, which relay operates and locks in the same manner as previously described.

When the train leaves section 7, track relay 7T energizes and opens the locking circuit of relay 7F, which accordingly deenergizes. Relay 7F marks the stop conductor T5 and completes the circuit for operating train start relay TST as previously described. In response to the operation of train-start relay TST the code 265 is transmitted to the dispatcher's station from this field station and at the end of this code relay 7E releases and opens the circuit of train-start relay TST to cause the release of the field station coding apparatus as previously described.

In the dispatcher's station and in response to receipt of code 265 track-indicating relay 7TIR is short-circuited in the same manner as previously described to extinguish the track-pilot lamp 7TPL.

In the same manner as previously described, when the train enters track section 9 track relay 9T deenergizes and causes the field station to transmit the code 268 to the dispatcher's station to cause track-pilot lamp 9TPL to light.

In the same manner as previously described, when the train leaves track-section 8 track relay 8T energizes to cause the field station coding apparatus to transmit the code 261 to the dispatcher's station to cause the deenergization of relays 8TIR and 8TR and to extinguish the track pilot lamp 8TPL. Relay 8TR, upon deenergizing, at contact 101 extinguishes the red lamp and lights the yellow lamp of signal 7SL, as previously described. Relay 8TS reenergizes as previously described in response to the operation of track relay 8T, and at contact 1272 completes the previously traced circuit for operating relay 7HP.

Relay 7HP, upon operating, at contact 1355 extinguishes the red lamp and lights the yellow lamp of signal 7S, at contact 1356 opens the circuit of relay 6NP, and at contact 1357 short circuits relay 7D, which accordingly deenergizes. Relay 6NP deenergizes and at contact 1457 opens the locking circuit of relay 6S, which likewise deenergizes.

When the train leaves section 9 the field station coding apparatus transmits a code to the dispatcher's station to extinguish track pilot lamp 9TPL in the same manner as previously described. The track signal 7S is now again set in the position to permit a train to proceed from section 7 to section 9. Another train may therefore proceed from section 7 to section 9.

In case the dispatcher desires to set signal 7S to stop position the dispatcher will accordingly release key 7 thereby opening the circuit to relay B7. Relay B7 accordingly deenergizes and at contact 213 marks stop conductor 6 of cable 70 and at the same time prepares a short circuit for relay D7. At contact 215 relay B7 completes a circuit by way of conductor 217 and front contact 227 for connecting positive battery to common start conductor 200 to cause the operation of start relay 340. In response to the operation of start relay 340 the dispatcher's coding apparatus transmits the code 256 in a manner similar to that previously described. The last digit of this code is 6 because conductor 6 of cable 70 has been marked as the stop conductor in response to the deenergization of relay B7. In a manner similar to that previously described relay D7 is short circuited at the end of the third digit by the connection of positive battery to stop conductor 6. The connection of positive battery to stop conductor 6 at this time completes a short circuit for relay D7 by way of contacts 213 and 225, conductor 209, and front contact 226. Relay D7 accordingly deenergizes and at contact 221 opens the circuit to the yellow lamp of signal 7SL, whereupon this signal is now dark. At contact 227 relay D7 opens the circuit to start relay 340, whereupon the dispatcher's coding apparatus releases in the same manner as previously described.

In a manner similar to that previously described the field station coding apparatus is operated in response to code 256 to connect positive battery to the operate conductor O6 of operate cable OC. When positive battery is connected to conductor O6 relay 7B is operated by way of the normally closed springs controlled by contacts 1309, conductor 1324, through the winding of relay 7B, conductor 1325, and through the associated resistance to negative battery. Relay 7B, upon energizing, at contact 1308 opens the locking circuit of relay 7R which accordingly deenergizes and at contact 1309 completes a locking circuit for itself. Relay 7R deenergizes and at contact 1302 opens the circuit of relay 7HP which likewise deenergizes. At back contact 1355 relay 7HP, upon deenergizing, completes the circuit for lighting the red lamp of signal 7S, at contact 1356 completes the circuit for operating relay 6NP, and at contact 1357 short circuits relay 7D to cause the latter relay to deenergize. The energization of relay 6NP at this time completes the following circuit for operating the time-element relay 8TER: from positive battery, contact 1456, conductor 1190, contact 1169, conductor 1191, contact 1454, conductor 1192, contact 1274, and through the winding of time-element relay 8TER to negative battery.

Time-element relay 8TER in the well known manner operates its contacts to remove the control of the other track signals and track switch TS, and at contact 1280 completes the circuit for operating relay 6S. This circuit may be traced as follows: from contact 1457, conductor 1366, contact 1280, conductor 1365, conductor 1470, and through the winding of relay 6S to battery. In the same manner as previously described relay 6S energizes to complete its locking circuit at contact 1455, and at contact 1454 opens the circuit to the time-element relay 8TER. The time-element relay is returned to its normal position in the usual manner.

When relay 7D deenergizes in response to the short circuit placed around it by the deenergization of relay 7HP relay 7D at contact 1315 marks release conductor R6 and prepares a short circuit for relay 7B. At contact 1317 relay 7D completes a circuit by way of contact 1311 and conductor 1323 for connecting positive battery to common start conductor L1 for operating signal-start relay SST. In a manner similar to that previously described, the operation of signal-start relay SST causes the field station coding apparatus to transmit the code 265 to the dispatcher's station. The last digit of this code is digit 6 because, in response to the deenergization of relay 7D, the conductor R6 has been marked as the stop conductor. At the end of the code the operation of the third digit stop relay in the field station coding apparatus connects positive battery to conductor R6 in a manner similar to that previously described, to short circuit relay 7B. This short circuit may be traced from positive battery connected to release conductor R6, contacts 1315 and 1310, conductor 1325, through the winding of relay 7B, conductor 1324, and through the front contact 1309 to positive battery. Relay 7B accordingly deenergizes to open the circuit to signal start relay SST whereupon the field station coding apparatus releases in the same manner as previously described.

In a manner similar to that previously described, the dispatcher's coding apparatus responds to code 256 transmitted thereto to cause the vertical and rotary step-by-step switch to engage the sixth bank contact in the fifth level to complete a short circuit for relay C7 over conductor 56 of cable 50. This short circuit is completed in the same manner as previously described by connecting positive battery to conductor 56, and thence by way of conductor 208 through the winding of relay C7 to front contact 234 and positive battery. Relay C7 deenergizes in response to this short circuit and at contact 231 completes the previously traced circuit for lighting the red lamp of signal 7SL. At contact 233 relay C7 opens the circuit to relay A7 which accordingly deenergizes. Relay A7, upon deenergizing, at contact 201 restores the original energizing circuit of relay B8, at contact 202 opens a point in the locking circuit of relay B8, and at contact 203 restores the circuit of relay B9. The apparatus at the dispatcher's station is now restored to the same position it was before the key was operated.

*Manual operation of track switch TS*

As is the usual practice, the track switch TS in Fig. 12 is arranged to be manually operated by a train man to provide the necessary switching facilities. However, before the train man will operate the track switch TS, such train man first gets permission from the dispatcher. It will now be assumed that the train man desires to manually operate track-switch TS in order to make certain switching operations, and after getting permission from the dispatcher the train man will operate the dual control indicated by the two circles labeled DUAL—CO in Fig. 12. In response to this operation the locking circuit extending by way of conductor 1295 and contact 1271 for relay 8TS is opened. Relay 8TS accordingly deenergizes, and in a manner similar to that previously described, opens the control circuit for the different track signals and switches at contact 1272. When the track switch TS is moved by the train man switch contacts 1276 and 1277 are operated to open the circuit to relay 8KR which accordingly deenergizes and operates to its reversed position when the track switch TS has been completely removed to its reverse position. When relay 8KR is operated to its reverse position, contacts 1285 and 1286 complete the previously traced circuit for energizing relay 8D. Relay 8D at contact 1212 completes a circuit for energizing the signal-start relay SST, from positive battery through contact 1212, contact 1208, back contact 1203, conductor 1259, conductor 1258, common start conductor L1, and through the winding of signal start relay SST to negative battery. At contact 1213 relay 8D locks itself in operated position, and at contact 1216 marks stop conductor R1. In the same manner as previously described the operation of the signal start relay SST transmits the code 251 to the dispatcher's office and connects positive battery to stop conductor R1. The third digit of this code is the digit 1 because by the operation of relay 8D negative battery potential has been connected to stop conductor R1 through the winding of relay 8B, over normally closed contact controlled by contact 1209, conductor 1261, contacts 1250, 1206, and 1216. The connection of positive battery to stop conductor R1 by the field station coding apparatus completes the circuit just traced for causing the operation of relay 8B. Relay 8B, upon energizing, at contact 1208, opens the previously traced circuit for the signal start relay SST, and at contact 1209 completes its own locking circuit. Signal start relay SST accordingly deenergizes whereupon the field station coding apparatus is released, as previously described.

In the dispatcher's station and in response to code 251 the vertical and rotary switch is operated into engagement with the first bank contact in the fifth level, and connects positive battery to conductor 51 of cable 50 to cause the energization of relay C8 over the circuit previously traced. At contact 191 relay C8 completes the circuit for relay F, but the operation of this relay is without effect at this time. At contact 192 relay C8 opens the circuit to the green lamp of signal 8SL, and at contacts 193 and 194 completes a circuit for lighting the red lamp of signal 8SL as follows: from positive battery, contact 194, conductor 178, back contact 166, conductor 160, contact 193, and through the red lamp of signal 8SL to negative battery. At contact 195 relay C8 completes its own locking circuit. When the signal 8SL is changed from green to red, such change indicates to the dispatcher that the train man has operated the track switch TS to its reverse or siding position. The dispatcher therefore knows that as long as this signal remains red the track switch TS is in its operated or siding position.

After the train has finished its desired switching operation the train man will close the dual control indicated DUAL—CO to complete the circuit of relay 8TS which accordingly energizes and locks in operated position as previously described. The operation of contact 1272 of relay 8TS again restores the control circuits by means of which the dispatcher may operate the various track circuits or signals. When the train man moves the track switch to its main position the switch contacts 1276 and 1277 open the circuit to relay 8KR, releasing the operated neutral contacts 1281, 1283, and 1285. At contact 1285 the short circuit around relay 8H is opened, whereupon this latter relay energizes over the following circuit: from positive battery, through the winding of relay 8H, conductor 1267, and by way of contact 1252 and through the associated resistance to negative battery. At contact 1257 relay 8H connects positive battery by way of contact 1254 and conductors 1260 and 1258 to common start conductor L1 to energize the signal start relay SST. When the train man has completely moved the track switch TS to its main track position then relay 8KR is operated and operates its contacts to the positions shown in Fig. 12. At contacts 1285 and 1286 relay 8KR completes the previously traced short circuit for relay 8D whereupon this relay now deenergizes. At back contact 1217 and contact 1211 relay 8D maintains the circuit to signal-start relay SST closed, at contact 1215 marks the stop conductor R2 and prepares a point in the release circuit for relay 8B, and at contact 1263 completes the previously traced short circuit for relay 8H. Relay 8H accordingly deenergizes and at contact 1257 opens the initial energizing circuit of signal-start relay which is without effect at this time since the circuit to signal-start relay SST is now maintained at back contact 1217.

In a manner similar to that previously described, the operation of signal-start relay SST causes the field station coding apparatus to transmit the code 252 to the dispatcher's station. The last digit in this code is the digit 2, because at contact 1215 conductor R2 is marked with negative battery potential in response to the deenergization of relay 8D. In a manner similar to that previously described relay 8B is short circuited at the end of the code by the field station coding apparatus by connecting positive battery to conductor R2. At contact 1211 relay 8B, upon releasing, opens the circuit to the signal-start relay SST which accordingly releases and causes the release of the field station coding apparatus.

In the dispatcher's station and in response to the receipt of code 252, the dispatcher's vertical and rotary step-by-step switch is operated to the second bank contact in the fifth level where a short circuit around relay C8 is completed by way of conductor 52 of cable 50 in a manner similar to that previously described. Relay C8 accordingly deenergizes and at contact 191 opens the circuit to relay F which likewise deenergizes. At contacts 193 and 194 relay C8 opens the circuit through the red lamp of signal 8SL, and at contact 192 completes the circuit for lighting the green lamp of signal 8SL by way of back contact 182. The dispatcher is informed by the lighting of the green lamp of signal 8SL that the train man has returned the distant track switch TS back to its main line position.

What is claimed is:

1. In a centralized traffic controlling system for railroads, a control panel having lines therein representing railroad tracks, a miniature track switch rotatably mounted on the panel at a point corresponding to the location of the corresponding track switch in the field, circuit controlling means supported on the back of said panel controlled by said miniature switch for governing the operation of the track switch in the field, a raised transparent portion provided on said miniature track switch for enabling manual rotation of the same to simulate the different positions assumed by the corresponding track switch in the field, different colored lamps mounted directly behind the raised transparent portion for visually illuminating said raised transparent portion, and circuits for lighting said lamps controlled by said circuit controlling means in accordance with the operated condition of the track switch in the field.

2. In a centralized traffic controlling system for railroads, a dispatcher's control panel, a distant track switch, a combined key and signal on said panel corresponding to the distant track switch, different colored lamps behind said signal, means for illuminating the colored lamp corresponding to the occupied position of said track switch, means responsive to the manual operation of said combined key and signal for transmitting a code in accordance therewith, means for extinguishing the illuminated lamp in response to the transmission of said code, means for operating said track switch from its last occupied position in response to said code, means responsive to the starting operation of said track switch for transmitting a code, means responsive to this last code for flashing one of said lamps, means responsive to the complete operation of said track switch for transmitting another code; and means responsive to said other code for illuminating said one lamp steadily to indicate the position now occupied by said track switch.

3. In a centralized traffic controlling system for railroads, a distant track switch, a combined key and signal corresponding to said track switch, means for illuminating said combined key and signal in accordance with the occupied position of said track switch, means responsive to the manual operation of said combined key and signal for extinguishing the same and for starting the operation of said track switch, means for flashing said combined key and signal in response to the starting operation of said track switch, and means for steadily illuminating said combined key and signal in response to the completed operation of said track switch.

4. In a centralized traffic controlling system for railroads, a dispatcher's control panel, track signals associated with railroad track sections for governing traffic thereover, corresponding signals on said panel illuminated in accordance with the operated condition of said track signals, means for transmitting a code to change the operated condition of one of said track signals, means responsive to the complete transmission of said code for extinguishing the corresponding panel signal, means for operating the corresponding track signal in accordance with the transmitted code, means responsive to the operation of said last means for transmitting a return code, and means responsive to said return code for illuminating the panel signal in accordance with the operated condition of the corresponding track signal.

JOHN WICKS.